(12) United States Patent
Yu

(10) Patent No.: US 11,292,517 B2
(45) Date of Patent: Apr. 5, 2022

(54) TILTING CAR FRAME

(71) Applicant: DAEPOONG EV MOTORS CO., LTD, Jeollanam-do (KR)

(72) Inventor: Je Woo Yu, Seoul (KR)

(73) Assignee: DAEPOONG EV MOTORS CO., LTD, Jeollanam-do (KR)

( * ) Notice: Subject to any disclaimer, the term of this patent is extended or adjusted under 35 U.S.C. 154(b) by 0 days.

(21) Appl. No.: 17/012,846

(22) Filed: Sep. 4, 2020

(65) Prior Publication Data
US 2020/0398892 A1 Dec. 24, 2020

Related U.S. Application Data

(63) Continuation of application No. PCT/KR2018/011442, filed on Sep. 27, 2018.

(30) Foreign Application Priority Data

| Mar. 6, 2018 | (KR) | .................. 10-2018-0026342 |
| Aug. 20, 2018 | (KR) | .................. 10-2018-0096466 |
| Sep. 27, 2018 | (KR) | .................. 10-2018-0114642 |

(51) Int. Cl.
*B60G 21/00* (2006.01)
*B62D 9/02* (2006.01)
*B62K 5/10* (2013.01)

(52) U.S. Cl.
CPC ............ *B62D 9/02* (2013.01); *B60G 21/007* (2013.01); *B60G 2200/18* (2013.01);
(Continued)

(58) Field of Classification Search
CPC .......... B60G 2206/111; B60G 2800/24; B60G 2204/4192; B60G 2200/18; B60G 21/007; B62K 5/10; B62D 9/02
See application file for complete search history.

(56) References Cited

U.S. PATENT DOCUMENTS

| 4,650,213 A | * | 3/1987 | Fujita | .................. B62D 9/02 |
| | | | | 280/124.103 |
| 2005/0206101 A1 | | 9/2005 | Bouton | |
| 2010/0072721 A1 | | 3/2010 | Plumley | |

FOREIGN PATENT DOCUMENTS

| KR | 20070117289 A | 12/2007 |
| KR | 20110034642 A | 4/2011 |

(Continued)

OTHER PUBLICATIONS

Machine translation of KR 20110034642 A from espacenet.com September (Year: 2021).*

(Continued)

*Primary Examiner* — Paul N Dickson
*Assistant Examiner* — Maxwell L Meshaka
(74) *Attorney, Agent, or Firm* — Avek IP, LLC

(57) ABSTRACT

A tilting car frame comprising a lower center frame including a horizontal member, a first support member, a second support member, and first and second horizontal link members each having a vertical link. A rotation center axis support extends from a center of the horizontal member. A first variable length lever link is slidably connected to the first support member and is facing the rotation center axis support, and a second variable length lever link is slidably connected to an end of the second support member that is facing the rotation center axis support. A rotating member having first and second extension members is rotatably connected to the rotation center axis support, wherein the first extension member is hinged to an end of a first variable length link member, and the second extension member is hinged to an end of a second variable length link member.

12 Claims, 25 Drawing Sheets

(52) U.S. Cl.
CPC .. *B60G 2204/4192* (2013.01); *B60G 2800/24* (2013.01); *B62K 5/10* (2013.01)

(56) References Cited

FOREIGN PATENT DOCUMENTS

KR       20140078226 A     6/2014
WO     WO-2007126294 A1 * 11/2007  ............... B60G 9/00

OTHER PUBLICATIONS

International Search Report, dated Jan. 24, 2019, 2 pages, issued in Application No. PCT/KR2018/011442.

* cited by examiner (a)

(b)

(c)

(a)

(b)

Tilting Car Frame

CROSS REFERENCE TO RELATED APPLICATIONS

This application is a continuation of, and claims priority to, International Application No. PCT/KR2018/011442, filed on Sep. 27, 2018, which claims priority to Korean Patent Application No. 10-2018-0026342, filed Mar. 6, 2018, Korean Patent Application No. 10-2018-0096466, filed Aug. 20, 2018, and Korean Patent Application No. 10-2018-0114642, filed Sep. 27, 2018, the disclosures of which are incorporated by reference herein in their entireties.

FIELD OF THE DISCLOSURE

The present disclosure relates to a tilting car frame. Specifically, the present disclosure relates to a tilting car frame in which a vehicle body is inclined toward the center of a turning radius when the vehicle turns.

BACKGROUND

When a car makes a turn, the centrifugal force exerted on the car can overturn the car. In addition, in the case of a high-speed train as well as a car, the same problem may occur when turning at a high speed. In particular, in a small car, it is very important to solve the problem of vehicle rollover caused by centrifugal force generated during turning.

In order to solve this problem, when a car or a high-speed train turns, a technology that makes it inclined toward the center of a turning radius like a motorcycle is being developed. However, a very large force is required to incline a car or train running at a high speed toward the center of the turning radius. A large and heavy drive motor must be used to obtain a large force enough to tilt a vehicle body turning at a high speed, but such a drive motor not only reduces the space inside the vehicle, but also consumes a lot of power and increases the weight of the vehicle, thereby deteriorating energy efficiency of the vehicle.

A technical problem of a tilting car frame according to an embodiment of the technology disclosed in the present specification is to provide an efficient tilting car frame capable of operating with a small force using a lever principle.

The technical problem to be achieved by the tilting car frame according to the technical idea of the technology disclosed in the present specification is not limited to the above-mentioned problems, and another technical problem not mentioned will be clearly understood by those skilled in the art from the following description.

SUMMARY

A tilting car frame according to an embodiment of the technology disclosed in the present specification may comprise a lower center frame including a horizontal member having a first end and a second end, and including a first support member extending in one direction from the first end and a second support member extending in the one direction from the second end; a first horizontal link member hinged to the first end of the lower center frame; a second horizontal link member hinged to the second end of the lower center frame; a first vertical link member hinged to an end of the first horizontal link member; a second vertical link member hinged to an end of the second horizontal link member; a rotation center axis support member extending in the one direction from a center of the horizontal member of the lower center frame; a first variable length lever link member hinged to an end of the first vertical link member and an end of the first support member of the lower center frame, wherein the first variable length link member is slidably connected to an end of the first variable length lever link member facing the rotation center axis support member; a second variable length lever link member hinged to an end of the second vertical link member and an end of the second support member of the lower center frame, wherein the second variable length link member is slidably connected to an end of the second variable length lever link member facing the rotation center axis support member; and a rotating member, wherein a central part of the rotating member is connected to the rotation center axis support member so as to be rotatable about the rotation center axis of the rotation center axis support member, wherein an end of the first extension member of the rotating member, extending in the direction of the first variable length link member, is hinged to an end of the first variable length link member, and an end of the second extension member of the rotating member, extending in the direction of the second variable length link member, is hinged to an end of the second variable length link member.

The tilting car frame may further comprise a rotary shaft drive motor for rotating the rotating member.

The tilting car frame may further comprise a first wheel connected to the first vertical link member; and a second wheel connected to the second vertical link member.

The tilting car frame may further comprise a first shock absorbing device connected to the first vertical link member and the first support member; and a second shock absorbing device connected to the second vertical link member and the second support member.

As the rotating member rotates in one direction, the first variable length link member and the second variable length link member may come out of the inside of the first variable length lever link member and the second variable length lever link member, respectively.

The first variable length lever link member and the second variable length lever link member may be straight members.

The first variable length lever link member may comprise a straight member connecting a hinge axis connected to the first vertical link member and a hinge axis connected to the first support member of the lower center frame; and a member connecting a hinge axis connected to the first support member of the lower center frame and a hinge axis of the first variable length link member, wherein the member may have a shape bent at least once between the hinge axis connected to the first support member of the lower center frame and the hinge axis of the first variable length link member, and wherein the second variable length lever link member may comprise a straight member connecting a hinge axis connected to the second vertical link member and a hinge axis connected to the second support member of the lower center frame; and a member connecting a hinge axis connected to the second support member of the lower center frame and a hinge axis of the second variable length link member, wherein the member may have a shape bent at least once between the hinge axis connected to the second support member of the lower center frame and the hinge axis of the second variable length link member.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a worm gear engaged with the teeth of the third extension member; and a lower drive motor for rotating the worm gear, wherein when the lower drive motor rotates the worm gear, the rotating member connected to the third extension member engaged with the worm gear may rotate about the rotation center axis.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a worm gear; a lower drive motor for rotating the worm gear; and a ball screw nut surrounding the worm gear along the axial direction of the worm gear, wherein balls rotatably located on an inner circumferential surface of the ball screw nut may be located between teeth of the worm gear, so that the ball screw nut moves linearly along the axial direction of the worm gear according to rotation of the worm gear, and wherein the teeth formed on one surface of the ball screw nut may be engaged with the teeth of the third extension member, and wherein when the lower drive motor rotates the worm gear, a ball screw nut that performs linear motion by rotation of the worm gear may rotate the third extension member, and the rotating member connected to the third extension member may rotate about the rotation center axis.

The rotating member may comprise a third extension member extending in the direction of the horizontal member; and a rotating member auxiliary link member hinged to the third extension member, wherein the tilting car frame may further comprise a worm gear; a lower drive motor for rotating the worm gear; and a ball screw nut surrounding the worm gear along the axial direction of the worm gear, wherein balls rotatably located on an inner circumferential surface of the ball screw nut may be located between teeth of the worm gear, so that the ball screw nut moves linearly along the axial direction of the worm gear according to rotation of the worm gear; and a rotating member auxiliary link member insertion part formed on one surface of the ball screw nut, wherein the rotating member auxiliary link member may be inserted into the rotating member auxiliary link member insertion part, and balls may be rotatably positioned on an inner surface of the rotating member auxiliary link member insertion part so that the rotating member auxiliary link member in contact with the balls is capable of performing linear motion in the longitudinal direction, wherein when the lower drive motor rotates the worm gear, the rotating member auxiliary link member insertion part may make a linear motion by the ball screw nut that performs a linear motion by rotation of the worm gear, and according to the linear motion of the rotating member auxiliary link member insertion part, the rotating member auxiliary link member may come out of the rotating member auxiliary link member insertion part or enter the rotating member auxiliary link member insertion part, and the rotating member may rotate about the rotation center axis.

The rotating member may comprise a third extension member extending in the direction of the horizontal member; and a rotating member auxiliary link member hinged to the third extension member, wherein the tilting car frame may further comprise a pinion gear; a lower drive motor for rotating the pinion gear; a rack gear that engages with the pinion gear and performs linear motion in the left and right directions; and a rotating member auxiliary link member insertion part formed on one surface of the rack gear, wherein the rotating member auxiliary link member may be inserted into the rotating member auxiliary link member insertion part, and balls may be rotatably positioned on an inner surface of the rotating member auxiliary link member insertion part so that the rotating member auxiliary link member in contact with the balls is capable of performing linear motion in the longitudinal direction, wherein when the lower drive motor rotates the pinion gear, the rotating member auxiliary link member insertion part may move linearly by the rack gear that moves linearly by rotation of the pinion gear, and according to the linear motion of the rotating member auxiliary link member insertion part, the rotating member auxiliary link member may come out of the rotating member auxiliary link member insertion part or enter the rotating member auxiliary link member insertion part, and the rotating member may rotate about the rotation center axis.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a circular gear engaged with the teeth of the third extension member; and a lower drive motor for rotating the circular gear, wherein when the lower drive motor rotates the circular gear, the rotating member connected to the third extension member engaged with the circular gear may rotate about the rotation center axis.

A tilting car frame according to an embodiment of the technology disclosed in the present specification may comprise a lower center frame including a horizontal member having a first end and a second end, and including a first support member extending in one direction from the first end and a second support member extending in the one direction from the second end; a first horizontal link member hinged to the first end of the lower center frame; a second horizontal link member hinged to the second end of the lower center frame; a first vertical link member hinged to an end of the first horizontal link member; a second vertical link member hinged to an end of the second horizontal link member; a rotation center axis support member extending in the one direction from a center of the horizontal member of the lower center frame; a first variable length lever link member hinged to an end of the first vertical link member and an end of the first support member of the lower center frame, wherein the first variable length link member is slidably connected to an end of the first variable length lever link member facing the rotation center axis support member; a second variable length lever link member hinged to an end of the second vertical link member and an end of the second support member of the lower center frame, wherein the second variable length link member is slidably connected to an end of the second variable length lever link member facing the rotation center axis support member; a rotating member, wherein a central part of the rotating member is connected to the rotation center axis support member so as to be rotatable about the rotation center axis of the rotation center axis support member, wherein an end of the first extension member of the rotating member, extending in the direction of the first variable length link member, is hinged to an end of the first variable length link member, and an end of the second extension member of the rotating member, extending in the direction of the second variable length link member, is hinged to an end of the second variable length link member, and wherein the rotating member includes a third extension member extending from the central part in the direction of the first end and a fourth extension member extending from the central part in the direction of the second end; a third extension member driving device hinged to the horizontal member, wherein a third variable length link member hinged to the third extension member is inserted into the third extension member driving device, and the third extension member driving device is capable of linearly reciprocating the third variable length link member along the length direction of the third variable length link member; a fourth extension member driving device hinged to the horizontal member, wherein a fourth variable length link member hinged to the fourth extension member is inserted into the fourth extension member driving device, and the fourth extension member driving device is capable of linearly reciprocating the fourth variable length link member along the length direction of the fourth variable length link member; and an extension member driving part located in the lower center frame to operate the third extension member driving device and the fourth extension member driving device.

The third extension member driving device and the fourth extension member driving device may be hydraulic cylinders, and the extension member driving part may be a hydraulic pump that supplies fluid to the third extension member driving device and the fourth extension member driving device and discharges fluid therefrom.

The tilting car frame may further comprises a first wheel connected to the first vertical link member; and a second wheel connected to the second vertical link member.

When the third variable length link member enters the inside of the third extension member driving device and the fourth variable length link member comes out from the inside of the fourth extension member driving device, the rotating member may rotate in one direction, and wherein as the rotating member rotates in the one direction, the first variable length link member and the second variable length link member may come out of the insides of the first variable length lever link member and the second variable length lever link member, respectively.

A tilting car frame according to an embodiment of the technology disclosed in the present specification may comprises a lower center frame including a first support member extending in one direction from a first end and a second support member extending in the one direction from a second end; a first horizontal link member hinged to the first end of the lower center frame; a second horizontal link member hinged to the second end of the lower center frame; a first vertical link member hinged to an end of the first horizontal link member; a second vertical link member hinged to an end of the second horizontal link member; a first fixed length lever link member hinged to an end of the first vertical link member and an end of the first support member of the lower center frame; a second fixed length lever link member hinged to an end of the second vertical link member and an end of the second support member of the lower center frame; a first additional connecting link member hinged to an end of the first fixed length lever link member; a second additional connecting link member hinged to an end of the second fixed length lever link member; a rotation center axis support member extending in the one direction from the center of the lower center frame; and a rotating member, wherein a central part of the rotating member is connected to the rotation center axis support member so as to be rotatable about the rotation center axis of the rotation center axis support member, wherein an end of the first extension member of the rotating member, extending in the direction of the first additional connecting link member, is hinged to an end of the first additional connecting link member, and an end of the second extension member of the rotating member, extending in the direction of the second additional connecting link member, is hinged to an end of the second additional connecting link member.

The tilting car frame of claim 17 may further comprises a first wheel connected to the first vertical link member; and a second wheel connected to the second vertical link member.

The tilting car frame may further comprises a rotary shaft drive motor for rotating the rotating member.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a worm gear engaged with the teeth of the third extension member; and a lower drive motor for rotating the worm gear, wherein when the lower drive motor rotates the worm gear, the rotating member connected to the third extension member engaged with the worm gear may rotate about the rotation center axis.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a worm gear; a lower drive motor for rotating the worm gear; and a ball screw nut surrounding the worm gear along the axial direction of the worm gear, wherein balls rotatably located on an inner circumferential surface of the ball screw nut are located between teeth of the worm gear, so that the ball screw nut moves linearly along the axial direction of the worm gear according to rotation of the worm gear, and wherein the teeth formed on one surface of the ball screw nut may be engaged with the teeth of the third extension member, and wherein when the lower drive motor rotates the worm gear, a ball screw nut that performs linear motion by rotation of the worm gear may rotate the third extension member, and the rotating member connected to the third extension member may rotate about the rotation center axis.

The rotating member may comprise a third extension member extending in the direction of the horizontal member; and a rotating member auxiliary link member hinged to the third extension member, wherein the tilting car frame may further comprise a worm gear; a lower drive motor for rotating the worm gear; and a ball screw nut surrounding the worm gear along the axial direction of the worm gear, wherein balls rotatably located on an inner circumferential surface of the ball screw nut may be located between teeth of the worm gear, so that the ball screw nut moves linearly along the axial direction of the worm gear according to rotation of the worm gear; and a rotating member auxiliary link member insertion part formed on one surface of the ball screw nut, wherein the rotating member auxiliary link member may be inserted into the rotating member auxiliary link member insertion part, and balls may be rotatably positioned on an inner surface of the rotating member auxiliary link member insertion part so that the rotating member auxiliary link member in contact with the balls is capable of performing linear motion in the longitudinal direction, wherein when the lower drive motor rotates the worm gear, the rotating member auxiliary link member insertion part may make a linear motion by the ball screw nut that performs a linear motion by rotation of the worm gear, and according to the linear motion of the rotating member auxiliary link member insertion part, the rotating member auxiliary link member may come out of the rotating member auxiliary link member insertion part or enter the rotating member auxiliary link member insertion part, and the rotating member may rotate about the rotation center axis.

The rotating member may comprise a third extension member extending in the direction of the horizontal member; and a rotating member auxiliary link member hinged to the third extension member, wherein the tilting car frame may further comprise a pinion gear; a lower drive motor for rotating the pinion gear; a rack gear that engages with the pinion gear and performs linear motion in the left and right directions; and a rotating member auxiliary link member insertion part formed on one surface of the rack gear, wherein the rotating member auxiliary link member may be inserted into the rotating member auxiliary link member insertion part, and balls may be rotatably positioned on an inner surface of the rotating member auxiliary link member insertion part so that the rotating member auxiliary link member in contact with the balls is capable of performing linear motion in the longitudinal direction, wherein when the lower drive motor rotates the pinion gear, the rotating member auxiliary link member insertion part may move linearly by the rack gear that moves linearly by rotation of the pinion gear, and according to the linear motion of the rotating member auxiliary link member insertion part, the rotating member auxiliary link member may come out of the rotating member auxiliary link member insertion part or enter the rotating member auxiliary link member insertion part, and the rotating member may rotate about the rotation center axis.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a circular gear engaged with the teeth of the third extension member; and a lower drive motor for rotating the circular gear, wherein when the lower drive motor rotates the circular gear, the rotating member connected to the third extension member engaged with the circular gear may rotate about the rotation center axis.

A tilting car frame according to an embodiment of the technology disclosed in the present specification may comprise a lower center frame; a first support link member hinged to a first end of the lower center frame; a second support link member hinged to a second end of the lower center frame; a first horizontal link member hinged to the first end of the lower center frame; a second horizontal link member hinged to the second end of the lower center frame; a first vertical link member hinged to an end of the first horizontal link member; a second vertical link member hinged to an end of the second horizontal link member; a first fixed length lever link member hinged to an end of the first vertical link member and an end of the first support link member; a second fixed length lever link member hinged to an end of the second vertical link member and an end of the second support link member; a rotation center axis support member extending in one direction from the center of the lower center frame; and a rotating member, wherein a central part of the rotating member is connected to the rotation center axis support member so as to be rotatable about the rotation center axis of the rotation center axis support member, wherein an end of the first extension member of the rotating member, extending in the direction of the first fixed length lever link member, may be hinged to an end of the first fixed length lever link member, and an end of the second extension member of the rotating member, extending in the direction of the second fixed length lever link member, may be hinged to an end of the second fixed length lever link member.

The tilting car frame may further comprise a first wheel connected to the first vertical link member; and a second wheel connected to the second vertical link member.

The first fixed length lever link member may comprise a straight member connecting a hinge axis connected to the first vertical link member and a hinge axis connected to the first support link member; and a member connecting a hinge axis connected to the first support link member and a hinge axis connected to the first extension member, wherein the member may have a shape bent at least once between the hinge axis connected to the first support link member and the hinge axis connected to the first extension member, and wherein the second fixed length lever link member may comprise a straight member connecting a hinge axis connected to the second vertical link member and a hinge axis connected to the second support link member; and a member connecting a hinge axis connected to the second support link member and a hinge axis connected to the second extension member, wherein the member may have a shape bent at least once between the hinge axis connected to the second support link member and the hinge axis connected to the second extension member.

The tilting car frame may further comprise a rotary shaft drive motor for rotating the rotating member.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a worm gear engaged with the teeth of the third extension member; and a lower drive motor for rotating the worm gear, wherein when the lower drive motor rotates the worm gear, the rotating member connected to the third extension member engaged with the worm gear may rotate about the rotation center axis.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a worm gear; a lower drive motor for rotating the worm gear; and a ball screw nut surrounding the worm gear along the axial direction of the worm gear, wherein balls rotatably located on an inner circumferential surface of the ball screw nut may be located between teeth of the worm gear, so that the ball screw nut moves linearly along the axial direction of the worm gear according to rotation of the worm gear, and wherein the teeth formed on one surface of the ball screw nut may be engaged with the teeth of the third extension member, and wherein when the lower drive motor rotates the worm gear, a ball screw nut that performs linear motion by rotation of the worm gear may rotate the third extension member, and the rotating member connected to the third extension member may rotate about the rotation center axis.

The rotating member may comprise a third extension member extending in the direction of the horizontal member; and a rotating member auxiliary link member hinged to the third extension member, wherein the tilting car frame may further comprise a worm gear; a lower drive motor for rotating the worm gear; and a ball screw nut surrounding the worm gear along the axial direction of the worm gear, wherein balls rotatably located on an inner circumferential surface of the ball screw nut may be located between teeth of the worm gear, so that the ball screw nut moves linearly along the axial direction of the worm gear according to rotation of the worm gear; and a rotating member auxiliary link member insertion part formed on one surface of the ball screw nut, wherein the rotating member auxiliary link member may be inserted into the rotating member auxiliary link member insertion part, and balls may be rotatably positioned on an inner surface of the rotating member auxiliary link member insertion part so that the rotating member auxiliary link member in contact with the balls is capable of performing linear motion in the longitudinal direction, wherein when the lower drive motor rotates the worm gear, the rotating member auxiliary link member insertion part may make a linear motion by the ball screw nut that performs a linear motion by rotation of the worm gear, and according to the linear motion of the rotating member auxiliary link member insertion part, the rotating member auxiliary link member may come out of the rotating member auxiliary link member insertion part or enter the rotating member auxiliary link member insertion part, and the rotating member may rotate about the rotation center axis.

The rotating member may comprise a third extension member extending in the direction of the horizontal member; and a rotating member auxiliary link member hinged to the third extension member, wherein the tilting car frame may further comprise a pinion gear; a lower drive motor for rotating the pinion gear; a rack gear that engages with the pinion gear and performs linear motion in the left and right directions; and a rotating member auxiliary link member insertion part formed on one surface of the rack gear, wherein the rotating member auxiliary link member may be inserted into the rotating member auxiliary link member insertion part, and balls may be rotatably positioned on an inner surface of the rotating member auxiliary link member insertion part so that the rotating member auxiliary link member in contact with the balls is capable of performing linear motion in the longitudinal direction, wherein when the lower drive motor rotates the pinion gear, the rotating member auxiliary link member insertion part may move linearly by the rack gear that moves linearly by rotation of the pinion gear, and according to the linear motion of the rotating member auxiliary link member insertion part, the rotating member auxiliary link member may come out of the rotating member auxiliary link member insertion part or enter the rotating member auxiliary link member insertion part, and the rotating member may rotate about the rotation center axis.

The rotating member may comprise a third extension member extending in the direction of the horizontal member, wherein the third extension member may have a curved surface having a predetermined curvature in its longitudinal section, and teeth may be formed on the curved surface, and wherein the tilting car frame may further comprise a circular gear engaged with the teeth of the third extension member; and a lower drive motor for rotating the circular gear, wherein when the lower drive motor rotates the circular gear, the rotating member connected to the third extension member engaged with the circular gear may rotate about the rotation center axis.

BRIEF DESCRIPTION OF THE SEVERAL VIEWS OF THE DRAWINGS

Illustrative embodiments of the present disclosure are described in detail below with reference to the attached drawings figures and wherein.

DETAILED DESCRIPTION

Figure 1:
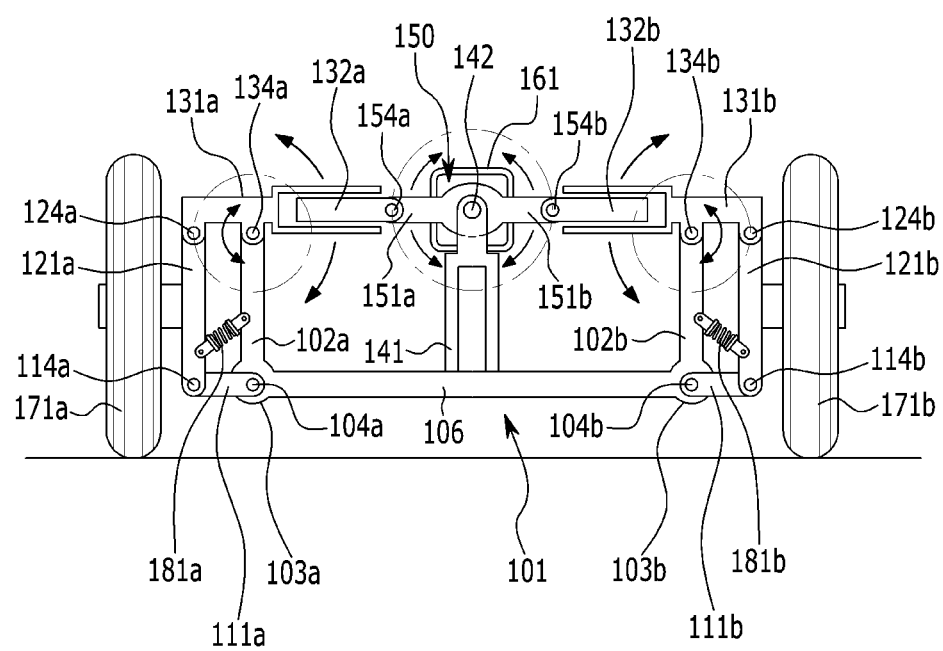
FIG. 1 is a schematic diagram of a tilting car frame according to a first embodiment of the technology disclosed in the present specification.

The technology disclosed in the present specification may be variously changed and may have various embodiments, and specific embodiments are illustrated in the drawings, and will be described in detail through the detailed description. However, this is not intended to limit the technology disclosed in the present specification to a specific embodiment, and it is to be understood that the technology disclosed in the present specification includes all changes, equivalents, and substitutes included in the spirit and scope of the technology disclosed in the present specification.

In describing the technology disclosed in the present specification, if it is determined that a detailed description of a related known technology may unnecessarily obscure the subject matter of the technology disclosed in the present specification, the detailed description thereof will be omitted. In addition, numbers (e.g., first, second, etc.) used in the description of the present specification are merely identification symbols for distinguishing one component from another component.

In addition, in the present specification, when one component is referred to as being "connected" or "coupled" with another component, or when one component is referred to as being "hinged" to another component, it should be understood that the one component may be directly connected/coupled with or directly hinged to the another component, but unless there is a particularly opposite description, the one component may be connected/coupled with or hinged to the another component via another component in the middle.

In addition, in the present specification, a component expressed as "part" may be one component formed by combining two or more components or may be subdivided into two or more components for each function. In addition, each of the components to be described below may further perform some or all of the functions of other components in addition to its own main function, and some of the main functions of each component may be performed by other components.

Expressions such as "first" and "second" used in various embodiments indicate various components regardless of order and/or importance, and do not limit the corresponding components. For example, without departing from the scope of the technology disclosed in the present specification, a first component may be referred to as a second component, and similarly, a second component may be renamed to a first component.

Hereinafter, embodiments of the technology disclosed in the present specification will be sequentially described in detail.

FIG. 1 is a schematic diagram of a tilting car frame according to a first embodiment of the technology disclosed in the present specification.

The tilting car frame according to the first embodiment may include a lower center frame 101, a first horizontal link member 111a, a second horizontal link member 111b, a first vertical link member 121a, a second vertical link member 121b, a first variable length lever link member 131a, a second variable length lever link member 131b, a rotation center axis support member 141, a rotating member 150 and a rotary shaft drive motor 161.

The lower center frame 101 may include a first end 103a located on the left and a second end 103b located on the right with reference to FIG. 1, and may include a horizontal member 106 that is elongated in the left and right direction. A first support member 102a extending upward from the first end 103a may be formed at the first end 103a, and a second support member 102b extending upward from the second end 103b may be formed at the second end 103b.

The right end of the first horizontal link member 111a may be hinged to the first end 103a. A through-hole may be formed at the first end 103a, and a through-hole may also be formed at the right end of the first horizontal link member 111a, and the first end 103a and the first horizontal link member 111a may be hingedly connected by a hinge shaft 104a passing through the through-hole of the first end 103a and the through-hole of the first horizontal link member 111a. Accordingly, the first horizontal link member 111a and the lower center frame 101 can be rotated about the hinge shaft 104a.

The left end of the second horizontal link member 111b may be hinged to the second end 103b. A through-hole may be formed at the second end 103b, and a through-hole may also be formed at the left end of the second horizontal link member 111b, and the second end 103b and the second horizontal link member 111b may be hingedly connected by a hinge shaft 104b passing through the through-hole of the second end 103b and the through-hole of the second horizontal link member 111b. Accordingly, the second horizontal link member 111b and the lower center frame 101 can be rotated about the hinge shaft 104b.

The lower end of the first vertical link member 121a may be hinged to the left end of the first horizontal link member 111a. A through-hole may be formed at the left end of the first horizontal link member 111a, and a through-hole may also be formed at the lower end of the first vertical link member 121a, and the first horizontal link member 111a and the first vertical link member 121a may be hingedly connected by the hinge shaft 114a passing through the through-hole of the first horizontal link member 111a and the through-hole of the first vertical link member 121a. Accordingly, the first vertical link member 121a and the first horizontal link member 111a can rotate around the hinge shaft 114a.

A first wheel 171a may be connected to the first vertical link member 121a, and the first wheel 171a and the first vertical link member 121a may be directly connected, and an intermediate configuration may exist between the first wheel 171a and the first vertical link member 121a.

A first shock absorbing device 181a may be hingedly connected between the first vertical link member 121a and the first support member 102a to absorb vibration or shock transmitted from the ground.

The lower end of the second vertical link member 121b may be hinged to the right end of the second horizontal link member 111b. A through-hole may be formed at the right end of the second horizontal link member 111b, and a through-hole may also be formed at the lower end of the second vertical link member 121b, and the second horizontal link member 111b and the second vertical link member 121b may be hingedly connected by the hinge shaft 114b passing through the through-hole of the second horizontal link member 111b and the through-hole of the second vertical link member 121b. Accordingly, the second vertical link member 121b and the second horizontal link member 111b can rotate around the hinge shaft 114b.

A second wheel 171b may be connected to the second vertical link member 121b, and the second wheel 171b and the second vertical link member 121b may be directly connected, and an intermediate configuration may exist between the second wheel 171b and the second vertical link member 121b.

A second shock absorbing device 181b may be hingedly connected between the second vertical link member 121b and the second support member 102b to absorb vibration or shock transmitted from the ground.

The rotation center axis support member 141 may be a member extending upward from the center of the lower center frame 101. A rotating member 150 may be rotatably connected to the upper end of the rotation center axis support member 141.

The first variable length link member 132a may be connected to the right end of the first variable length lever link member 131a to be slidable along the length direction of the first variable length lever link member 131a. An outer through-hole may be formed at the left end of the first variable length lever link member 131a, and an inner through-hole may be formed at the right end of the first variable length link member 132a slidably connected to the first variable length lever link member 131a, and a central through-hole may be formed between the outer through-hole and the inner through-hole. The distance between the outer through-hole and the center through-hole may be the same as the distance between the hinge shaft 104a and the hinge shaft 114a.

The first variable length lever link member 131a may be hinged to the upper end of the first vertical link member 121a and the upper end of the first support member 102a. Through-holes may be formed at the upper end of the first vertical link member 121a and the upper end of the first support member 102a, respectively. the first variable length lever link member 131a and the first vertical link member 121a may be hingedly connected by the hinge shaft 124a passing through the outer through-hole of the first variable length lever link member 131a and the through-hole formed at the upper end of the first vertical link member 121a. In addition, the first variable length lever link member 131a and the first support member 102a may be hingedly connected by the hinge shaft 134a passing through the central through-hole of the first variable length lever link member 131a and the through-hole formed at an upper end of the first support member 102a. Accordingly, the first variable length lever link member 131a and the first vertical link member 121a can be rotated around the hinge shaft 124a, and the first variable length lever link member 131a and the first support member 102a can be rotated around the hinge shaft 134a.

The second variable length link member 132b may be connected to the left end of the second variable length lever link member 131b to be slidable along the length direction of the second variable length lever link member 131b. An outer through-hole may be formed at the right end of the second variable length lever link member 131b, and an inner through-hole may be formed at the left end of the second variable length link member 132b slidably connected to the second variable length lever link member 131b, and a central through-hole may be formed between the outer through-hole and the inner through-hole. The distance between the outer through-hole and the center through-hole may be the same as the distance between the hinge shaft 104b and the hinge shaft 114b.

The second variable length lever link member 131b may be hinged to the upper end of the second vertical link member 121b and the upper end of the second support member 102b. Through-holes may be formed at the upper end of the second vertical link member 121b and the upper end of the second support member 102b, respectively. the second variable length lever link member 131b and the second vertical link member 121b may be hingedly connected by the hinge shaft 124b passing through the outer through-hole of the second variable length lever link member 131b and the through-hole formed at the upper end of the second vertical link member 121b. In addition, the second variable length lever link member 131b and the second support member 102b may be hingedly connected by the hinge shaft 134b passing through the central through-hole of the second variable length lever link member 131b and the through-hole formed at an upper end of the second support member 102b. Accordingly, the second variable length lever link member 131b and the second vertical link member 121b can be rotated around the hinge shaft 124b, and the second variable length lever link member 131b and the second support member 102b can be rotated around the hinge shaft 134b.

The rotating member 150 may be connected to be rotatable about the rotation center axis 142 of the rotation center axis support member 141. The rotation center axis 142 may be fixedly coupled to the central portion of the rotating member 150 to rotate together with the rotating member 150, and alternatively, the rotation center axis 142 may be fixedly coupled to the rotation center axis support member 141 and the rotating member 150 may be hingedly connected to the rotation center axis 142.

The rotating member 150 may include a first extension member 151a extending to the left and a second extension member 151b extending to the right. The first extension member 151a may be hinged to the end of the first variable length link member 132a, and the second extension member 151b may be hinged to the end of the second variable length link member 132b.

A through-hole may be formed at the end of the first extension member 151a, and the first variable length link member 132a and the first extension member 151a may be hingedly connected by the hinge shaft 154a passing through the inner through-hole of the first variable length link member 132a and the through-hole formed at the end of the first extension member 151a. Accordingly, the first variable length link member 132a and the first extension member 151a can be rotated around the hinge shaft 154a.

A through-hole may be formed at the end of the second extension member 151b, and the second variable length link member 132b and the second extension member 151b may be hingedly connected by the hinge shaft 154b passing through the inner through-hole of the second variable length link member 132b and the through-hole formed at the end of the second extension member 151b. Accordingly, the second variable length link member 132b and the second extension member 151b can be rotated around the hinge shaft 154b.

The rotary shaft drive motor 161 may be installed on the rotation center axis support member 141, and the rotating member 150 may be rotated by rotating the rotation center axis 142 fixedly coupled to the central portion of the rotating member 150.

Figure 2:
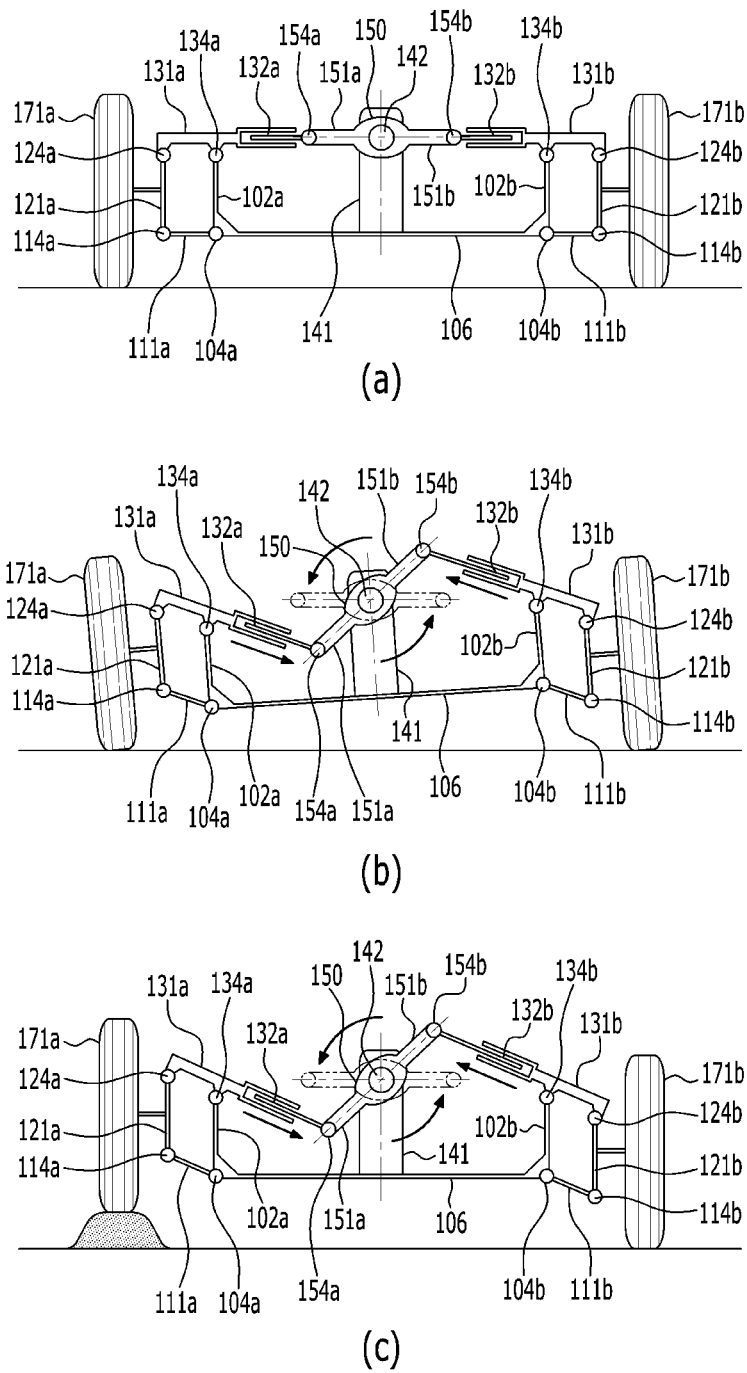
FIG. 2 is a diagram schematically illustrating a tilting state of the tilting car frame according to the first embodiment of the technology disclosed in the present specification.
Figure 3:
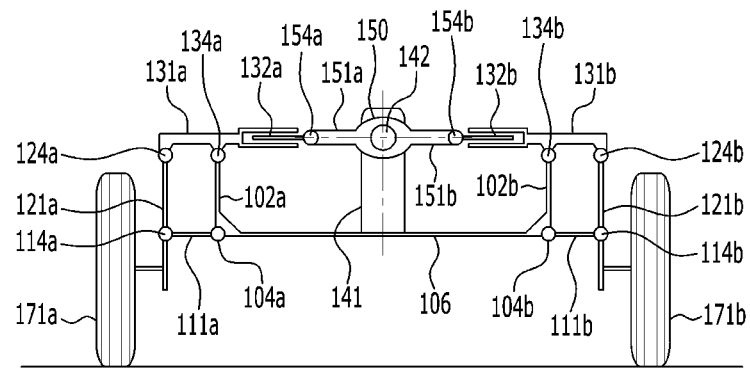
FIG. 3 shows a configuration in which a vertical link member extending downward is used in the tilting car frame according to the first embodiment of the technology disclosed in the present specification.
Figure 3:
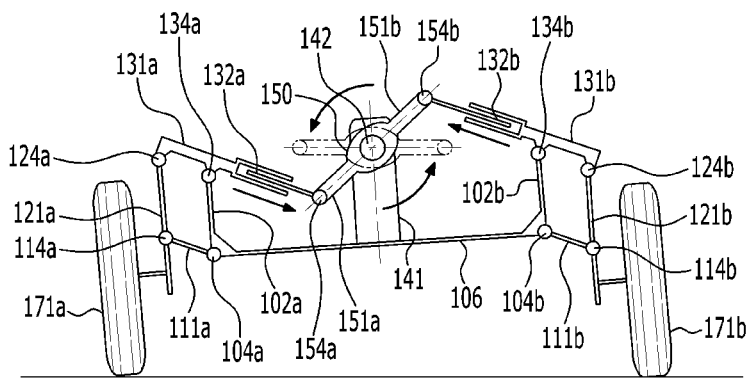
Figure 3:
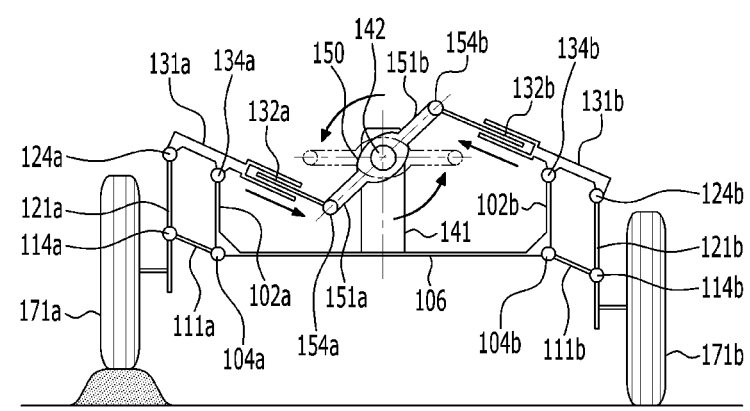
Figure 4:
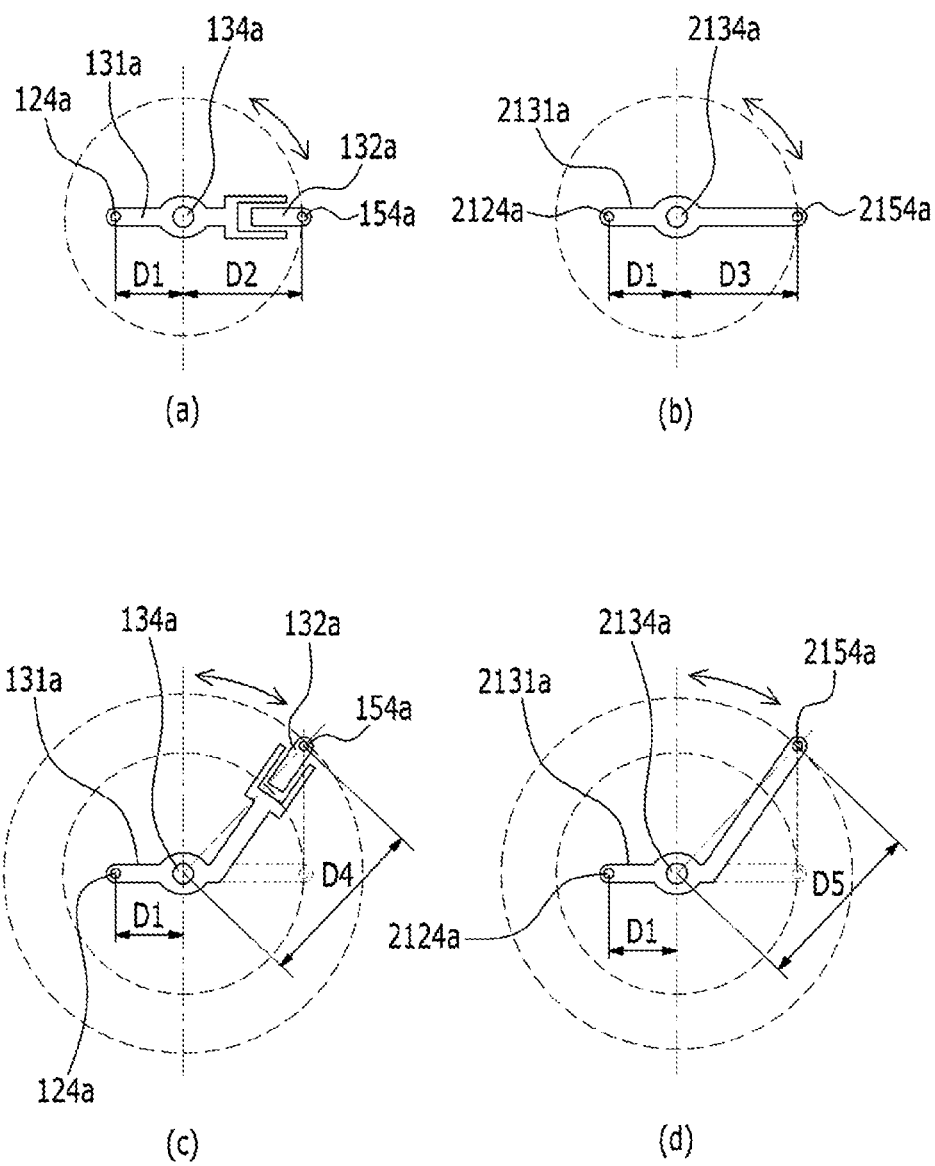
FIG. 4 is a view for explaining the leverage effect of the tilting car frame according to the technology disclosed in the present specification.

FIG. 2 is a diagram schematically illustrating a tilting state of the tilting car frame according to the first embodiment of the technology disclosed in the present specification. FIG. 3 shows a configuration in which a vertical link member extending downward is used in the tilting car frame according to the first embodiment of the technology disclosed in the present specification. FIG. 4 is a view for explaining the leverage effect of the tilting car frame according to the technology disclosed in the present specification.

The tilting car frame according to the first embodiment runs in a state as shown in FIG. 2(a) when the tilting car runs straight on a flat ground.

When the tilting car turns, the tilting car frame according to the first embodiment may allow the rotation center axis support member 141 to be inclined toward the center of the turning radius (left side of FIG. 2(b)).

When the tilting car turns, the rotary shaft drive motor 161 may rotate the rotating member 150 counterclockwise. As the rotating member 150 rotates in a counterclockwise direction, when the first variable length link member 132a is pulled in the lower right direction, the first variable length lever link member 131a is also inclined so that its right end is toward the lower right direction, and at the same time, the first variable length link member 132a slides out from the first variable length lever link member 131a. In addition, when the second variable length link member 132b is pulled in the upper left direction, the second variable length lever link member 131b is also inclined so that its left end is toward the upper left direction, and at the same time, the second variable length link member 132b slides out from the second variable length lever link member 131b.

The first variable length lever link member 131a uses the hinge shaft 134a to which the first variable length lever link member 131a and the first support member 102a are connected as a fulcrum of the lever to perform a lever motion, and the second variable length lever link member 131b uses the hinge shaft 134b to which the second variable length lever link member 131b and the second support member 102b are connected as a fulcrum of the lever to perform a lever motion.

By such a lever motion, the first vertical link member 121a rises, and the second vertical link member 121b descends. Since the first wheel 171a connected to the first vertical link member 121a and the second wheel 171b connected to the second vertical link member 121b remain in contact with the ground, eventually the first end 103a of the lower center frame (101) is inclined downward, and the second end 103b of the lower center frame 101 is raised upward, and the vehicle body is inclined toward the center of the turning radius.

In particular, as the first variable length link member 132a slides out from the first variable length lever link member 131a, the distance between the hinge shaft 154a of the inner through-hole and the hinge shaft 134a of the central through-hole increases than the distance between the hinge shaft 124a of the outer through-hole and the hinge shaft 134a of the central through-hole, thereby obtaining the effect of increasing the length from the fulcrum of the lever to the force point of the lever and raising the first vertical link member 121a with a small force. Likewise, as the second variable length link member 132b slides out from the second variable length lever link member 131b, the distance between the hinge shaft 154b of the inner through-hole and the hinge shaft 134b of the central through-hole increases than the distance between the hinge shaft 124b of the outer through-hole and the hinge shaft 134b of the central through-hole, thereby obtaining the effect of increasing the length from the fulcrum of the lever to the force point of the lever and lowering the second vertical link member 121b with a small force.

On the other hand, in the tilting car frame according to the first embodiment, if the rotary shaft drive motor 161 does not rotate the rotating member 150 and the rotating member 150 is allowed to rotate freely, the vehicle body can be kept horizontal even if the ground is bumpy.

As shown in FIG. 2(c), when the first wheel 171a passes the protrusion of the ground, the first wheel 171a rises, and the first vertical link member 121a connected to the first wheel 171a also rises. The first variable length lever link member 131a hinged to the first vertical link member 121a is inclined so that its right end faces downward to the right, and at the same time the first variable length link member 132a slides out from the first variable length lever link member 131a. The rotating member 150 hinged to the first variable length link member 132a rotates counterclockwise as the right end of the first variable length lever link member 131a is inclined toward the lower right. When the rotating member 150 rotates counterclockwise, the second variable length link member 132b is pulled in the upper left direction, and the second variable length lever link member 131b is also inclined so that its left end faces upward to the left and at the same time the second variable length link member 132b slides out from the second variable length lever link member 131b. The second variable length lever link member 131b performs a lever movement around the hinge shaft 134b connected to the second variable length lever link member (131b) and the second support member (102b). The second vertical link member 121b descends by this lever motion, and thus the hinge shaft 114b to which the second vertical link member 121b and the second horizontal link member 111b are connected descends. since the first wheel 171a connected to the first vertical link member 121a and the second wheel 171b connected to the second vertical link member 121b maintain contact with the ground, the hinge shaft 104b to which the second horizontal link member 111b and the second end 103b of the lower center frame 101 are connected rises. As a result, even if the first wheel 171a suddenly rises due to the bump of the ground, the lower center frame 101 is not inclined and can maintain a horizontal state.

FIG. 2 shows that the first wheel 171a is directly or indirectly connected to the first vertical link member 121a between the hinge shaft 124a and the hinge shaft 114a, and the second wheel 171b is directly or indirectly connected to the second vertical link member 121b between the hinge shaft 124b and the hinge shaft 114b, but as shown in FIG. 3, the first wheel 171a may be directly or indirectly connected to the first vertical link member 121a under the hinge shaft 114a, and the second wheel 171b may be directly or indirectly connected to the second vertical link member 121b under the hinge shaft 114b.

That is, the first vertical link member 121a may be further extended below the hinge shaft 114a to increase the vehicle height, and the first wheel 171a may be connected to the extended portion of the first vertical link member 121a. the second vertical link member 121b may be further extended below the hinge shaft 114b to increase the vehicle height, and the second wheel 171b may be connected to the extended portion of the second vertical link member 121b.

The variable length lever link member behaves according to the lever principle, and this behavior will be described by taking the first variable length lever link member 131a and the first fixed length lever link member 2131a as examples.

As shown in FIG. 4(a), if the distance D2 between the hinge shaft 154a of the inner through-hole and the hinge shaft 134a of the central through-hole is increased than the distance D1 between the hinge shaft 124a of the outer through-hole of the first variable length lever link member 131a and the hinge shaft 134a of the central through-hole, the first vertical link member 121a can be raised and lowered with a small force.

FIG. 4(b) shows a configuration in which the distance D3 between the hinge shaft 2154a of the inner through-hole of the first fixed length lever link member 2131a and the hinge shaft 2134a of the central through-hole is fixed. In this case, if the distance D3 between the hinge shaft 2154a of the inner through-hole and the hinge shaft 2134a of the central through-hole is set longer than the distance D1 between the hinge shaft 2124a of the outer through-hole and the hinge shaft 2134a of the central through-hole, the first vertical link member 2121a can be raised and lowered with a small force. This configuration will be described later in the configuration related to FIG. 24.

FIG. 4(c) shows a configuration capable of increasing the distance D4 between the hinge shaft 154a of the inner through-hole and the hinge shaft 134a of the central through-hole without increasing the width of the tilting car frame. If the first variable length lever link member 131a is not formed in a straight shape, and is formed to be bent at a predetermined angle between the hinge shaft 154a of the inner through-hole and the hinge shaft 134a of the central through-hole, the effect of increasing the distance D4 between the hinge shaft 154a of the inner through-hole and the hinge shaft 134a of the central through-hole can be obtained. This configuration will be described later in configurations related to FIGS. 7, 12, 14, 16, 18, and 20.

FIG. 4(d) shows a structure in which the distance D5 between the hinge shaft 2154a of the inner through-hole and the hinge shaft 2134a of the central through-hole is fixed, and in this case, if the first variable length lever link member 2131a is not formed in a straight shape, and is formed to be bent at a predetermined angle between the hinge shaft 2154a of the inner through-hole and the hinge shaft 2134a of the central through-hole, the effect of increasing the distance D5 between the hinge shaft 2154a of the inner through-hole and the hinge shaft 2134a of the central through-hole can be obtained. This configuration will be described later in the configuration related to FIG. 25.

Figure 5:
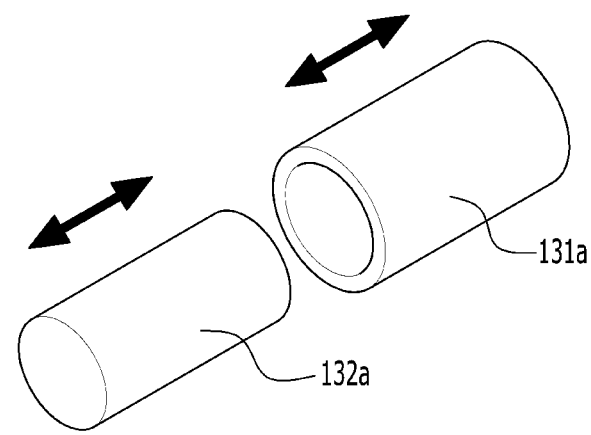
FIG. 5 shows an exemplary configuration of a variable length lever link member used in the tilting car frame according to the technology disclosed in the present specification.
Figure 5:
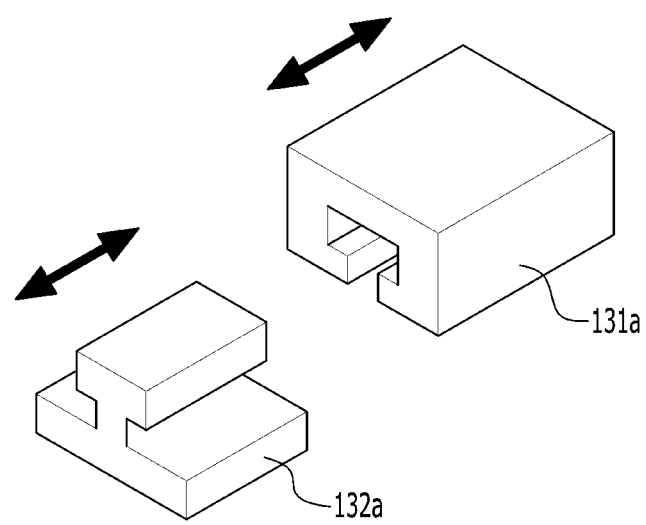

FIG. 5 shows an exemplary configuration of a variable length lever link member used in the tilting car frame according to the technology disclosed in the present specification. The first variable length lever link member 131a will be described as an example.

FIG. 5(a) shows a configuration in which the first variable length lever link member 131a is a hollow pipe member, and the first variable length link member 132a is a cylindrical member. The first variable length link member 132a may slide while being inserted into the inner space of the first variable length lever link member 131a, and as the linear reciprocating motion is performed, the length of the first variable length lever link member 131a is changed.

FIG. 5(b) shows a configuration in which the first variable length lever link member 131a includes a concave portion in which a lower surface is cut, and a configuration in which a protrusion having a shape corresponding to the concave portion is formed on the upper surface of the first variable length link member 132a. The first variable length link member 132a may slide while being inserted into the concave portion of the first variable length lever link member 131a, and as the linear reciprocating motion is performed, the length of the first variable length lever link member 131a is changed.

As the configuration of the variable length lever link member and the variable length link member, various shapes to enable sliding coupling between them may be applied.

Figure 6:
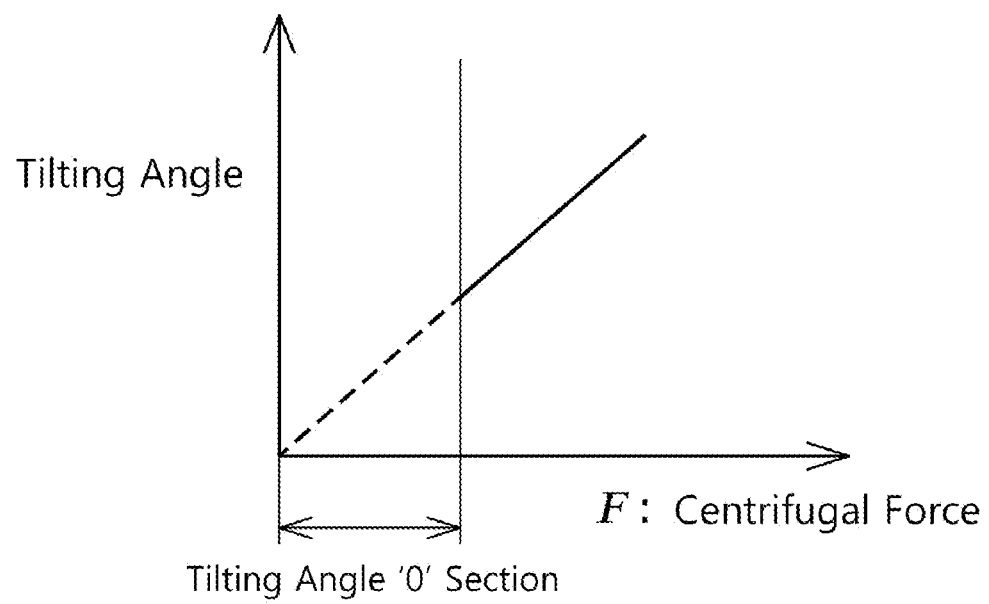
FIG. 6 is a graph illustrating an operable condition of the tilting car frame according to the technology disclosed in the present specification.

FIG. 6 is a graph illustrating an operable condition of the tilting car frame according to the technology disclosed in the present specification.

The tilting function of the tilting car may not be operated in all turning states, and may be operated only when a turning exceeding a predetermined standard speed (i.e., a predetermined standard centrifugal force) occurs. That is, the rotary shaft drive motor 161 does not rotate the rotating member 150 until a turning exceeding a predetermined standard speed occurs, but when a turning exceeding the predetermined standard speed occurs, the rotating member 150 may be rotated to perform a tilting function while the operation of the rotary shaft drive motor 161 is activated.

Figure 7:
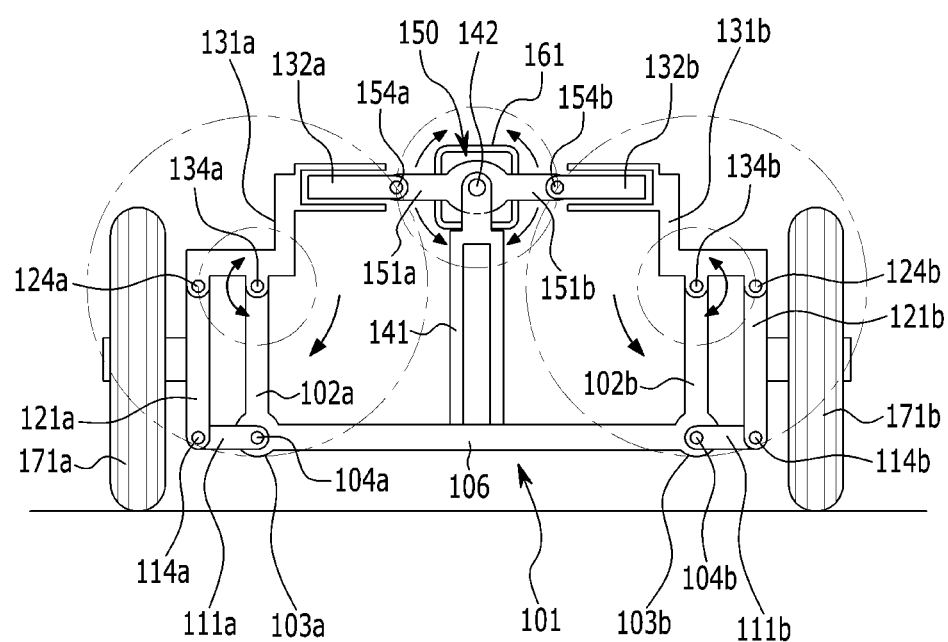
FIG. 7 shows a configuration in which a bent variable length lever link member is used in the tilting car frame according to the first embodiment of the technology disclosed in the present specification.

FIG. 7 shows a configuration in which a bent variable length lever link member is used in the tilting car frame according to the first embodiment of the technology disclosed in the present specification.

In order to increase the leverage effect in a vehicle with limited width, an effect of increasing the inner length of the lever can be obtained by bending the variable length lever link member in an upward direction with respect to the lever fulcrum.

The first variable length lever link member 131a may be formed to be bent at a predetermined angle between the hinge shaft 154a of the inner through-hole and the hinge shaft 134a of the central through-hole. The second variable length lever link member 131b may be formed to be bent at a predetermined angle between the hinge shaft 154b of the inner through-hole and the hinge shaft 134b of the central through-hole.

FIG. 7 shows a configuration in which the first variable length lever link member 131a and the second variable length lever link member 131b are bent twice at an angle of 90 degrees. With this configuration, even in a vehicle with a narrow width, the distance between the hinge shaft 154a of the inner through-hole of the first variable length lever link member 131a and the hinge shaft 134a of the central through-hole and the distance between the hinge shaft 154b of the inner through-hole of the second variable length lever link member 131b and the hinge shaft 134b of the central through-hole can be increased, and thus a larger lever force can be used around the hinge shaft 134a of the central through-hole of the first variable length lever link member 131a and the hinge shaft 134b of the central through-hole of the second variable length lever link member 131b, which are the lever fulcrums.

Figure 8:
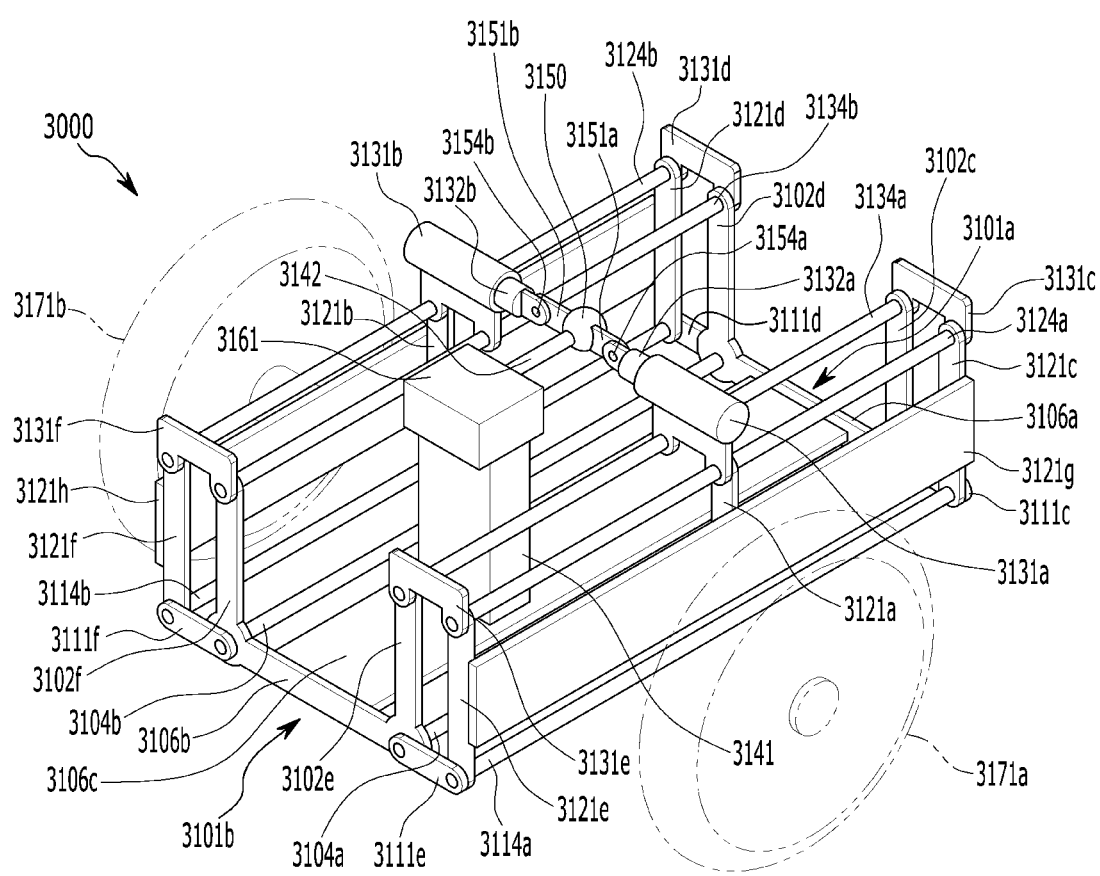
FIG. 8 is a schematic diagram of a tilting car frame according to a second embodiment of the technology disclosed in the present specification.

FIG. 8 is a schematic diagram of a tilting car frame according to a second embodiment of the technology disclosed in the present specification. FIG. 8 is a perspective view showing an example of an indirect hinge connection configuration, and shows a configuration in which hinge-connected connection members are spaced apart from each other along an extended hinge shaft.

The tilting car frame according to the second embodiment may include a first lower center frame 3101a, a second lower center frame 3101b, a lower center plate 3106c, a third horizontal link member 3111c, a fourth horizontal link member 3111d, a fifth horizontal link member 3111e, a sixth horizontal link member 3111f, a first vertical link member 3121a, a second vertical link member 3121b, a third vertical link member 3121c, a fourth vertical link member 3121d, a fifth vertical link member 3121e, a sixth vertical link member 3121f, a first variable length lever link member 3131a, a second variable length lever link member 3131b, a third upper horizontal link member 3131c, a fourth upper horizontal link member 3131d, a fifth upper horizontal link member 3131e, a sixth upper horizontal link member 3131f, a rotation center axis support member 3141, a rotating member 3150 and a rotary shaft drive motor 3161.

The first lower center frame 3101a may include a right end located on the right side and a left end located on the left side with reference to FIG. 8, and may include a first horizontal member 3106a that is elongated in the left and right direction. A third support member 3102c extending upward may be formed at the right end, and a fourth support member 3102d extending upward may be formed at the left end.

The second lower center frame 3101b may include a right end located on the right side and a left end located on the left side with reference to FIG. 8, and may include a first horizontal member 3106a that is elongated in the left and right direction. A fifth support member 3102e extending upward may be formed at the right end, and a sixth support member 3102f extending upward may be formed at the left end.

The first horizontal member 3106a of the first lower center frame 3101a and the second horizontal member 3106b of the second lower center frame 3101b may be connected by a lower center plate 3106c. Accordingly, the first lower center frame 3101a and the second lower center frame 3101b move integrally.

The left end of the third horizontal link member 3111c may be hinged to the right end of the first horizontal member 3106a. A through-hole is formed at the right end of the first horizontal member 3106a, and a through-hole is also formed at the left end of the third horizontal link member 3111c, and the first horizontal member 3106a and the third horizontal link member 3111c may be hingedly connected by a first hinge shaft 3104a passing through the through-hole of the right end of the first horizontal member 3106a and the through-hole of the left end of the third horizontal link member 3111c. Accordingly, the first lower center frame 3101a and the third horizontal link member 3111c can be rotated around the first hinge shaft 3104a.

The right end of the fourth horizontal link member 3111d may be hinged to the left end of the first horizontal member 3106a. A through-hole is formed at the left end of the first horizontal member 3106a, and a through-hole is also formed at the right end of the fourth horizontal link member 3111d, and the first horizontal member 3106a and the fourth horizontal link member 3111d may be hingedly connected by a second hinge shaft 3104b passing through the through-hole of the left end of the first horizontal member 3106a and the through-hole of the right end of the fourth horizontal link member 3111d. Accordingly, the first lower center frame 3101a and the fourth horizontal link member 3111d can be rotated around the second hinge shaft 3104b.

The left end of the fifth horizontal link member 3111e may be hinged to the right end of the second horizontal member 3106b. A through-hole is formed at the right end of the second horizontal member 3106b, and a through-hole is also formed at the left end of the fifth horizontal link member 3111e, and the second horizontal member 3106b and the fifth horizontal link member 3111e may be hingedly connected by the first hinge shaft 3104a passing through the through-hole of the right end of the second horizontal member 3106b and the through-hole of the left end of the fifth horizontal link member 3111e. Accordingly, the second lower center frame 3101b and the fifth horizontal link member 3111e can be rotated around the first hinge shaft 3104a.

The right end of the sixth horizontal link member 3111f may be hinged to the left end of the second horizontal member 3106b. A through-hole is formed at the left end of the second horizontal member 3106b, and a through-hole is also formed at the right end of the sixth horizontal link member 3111f, and the second horizontal member 3106b and the sixth horizontal link member 3111f may be hingedly connected by the second hinge shaft 3104b passing through the through-hole of the left end of the second horizontal member 3106b and the through-hole of the right end of the sixth horizontal link member 3111f. Accordingly, the second lower center frame 3101b and the sixth horizontal link member 3111f can be rotated around the second hinge shaft 3104b.

The lower end of the third vertical link member 3121c may be hinged to the right end of the third horizontal link member 3111c. A through-hole is formed at the right end of the third horizontal link member 3111c, and a through-hole is also formed at the lower end of the third vertical link member 3121c, and the third horizontal link member 3111c and the third vertical link member 3121c may be hingedly connected by a third hinge shaft 3114a passing through the through-hole of the third horizontal link member 3111c and the through-hole of the third vertical link member 3121c. Accordingly, the third vertical link member 3121c and the third horizontal link member 3111c can be rotated around the third hinge shaft 3114a.

The lower end of the fourth vertical link member 3121d may be hinged to the left end of the fourth horizontal link member 3111d. A through-hole is formed at the left end of the fourth horizontal link member 3111d, and a through-hole is also formed at the lower end of the fourth vertical link member 3121d, and the fourth horizontal link member 3111d and the fourth vertical link member 3121d may be hingedly connected by a fourth hinge shaft 3114b passing through the through-hole of the fourth horizontal link member 3111d and the through-hole of the fourth vertical link member 3121d. Accordingly, the fourth vertical link member 3121d and the fourth horizontal link member 3111d can be rotated around the fourth hinge shaft 3114b.

The lower end of the fifth vertical link member 3121e may be hinged to the right end of the fifth horizontal link member 3111e. A through-hole is formed at the right end of the fifth horizontal link member 3111e, and a through-hole is also formed at the lower end of the fifth vertical link member 3121e, and the fifth horizontal link member 3111e and the fifth vertical link member 3121e may be hingedly connected by the third hinge shaft 3114a passing through the through-hole of the fifth horizontal link member 3111e and the through-hole of the fifth vertical link member 3121e. Accordingly, the fifth vertical link member 3121e and the fifth horizontal link member 3111e can be rotated around the third hinge shaft 3114a.

The lower end of the sixth vertical link member 3121f may be hinged to the left end of the sixth horizontal link member 3111f. A through-hole is formed at the left end of the sixth horizontal link member 3111f, and a through-hole is also formed at the lower end of the sixth vertical link member 3121f, and the sixth horizontal link member 3111f and the sixth vertical link member 3121f may be hingedly connected by a fourth hinge shaft 3114b passing through the through-hole of the sixth horizontal link member 3111f and the through-hole of the sixth vertical link member 3121f. Accordingly, the sixth vertical link member 3121f and the sixth horizontal link member 3111f can be rotated around the fourth hinge shaft 3114b.

The first vertical link member 3121a is positioned between the third vertical link member 3121c and the fifth vertical link member 3121e, and the lower end is hingedly connected to the third hinge shaft 3114a.

The second vertical link member 3121b is positioned between the fourth vertical link member 3121d and the sixth vertical link member 3121f, and the lower end is hingedly connected to the fourth hinge shaft 3114b.

The rotation center axis support member 3141 may be a member located at the center of the lower center plate 3106c. A rotating member 3150 may be rotatably connected to an upper end of the rotation center axis support member 3141.

The first variable length lever link member 3131a may be connected such that the first variable length link member 3132a is slidable along the length direction of the first variable length lever link member 3131a at the left end.

The first variable length link member 3132a may be connected to the left end of the first variable length lever link member 3131a to be slidable along the length direction of the first variable length lever link member 3131a. An outer through-hole may be formed at the right end of the first variable length lever link member 3131a, and an inner through-hole may be formed at the left end of the first variable length link member 3132a, and a central through-hole may be formed between the outer through-hole and the inner through-hole. The distance between the outer through-hole and the center through-hole may be the same as the distance between the first hinge shaft 3104a and the third hinge shaft 3114a.

The first variable length lever link member 3131a may be hinged to the upper end of the first vertical link member 3121a. A through-hole may be formed at the upper end of the first vertical link member 3121a. The first variable length lever link member 3131a and the first vertical link member 3121a may be hingedly connected by the fifth hinge shaft 3124a passing through the outer through-hole of the first variable length lever link member 3131a and the through-hole formed at the upper end of the first vertical link member 3121a. The first variable length lever link member 3131a may be hingedly connected to the sixth hinge shaft 3134a by the sixth hinge shaft 3134a passing through the central through-hole of the first variable length lever link member 3131a. Accordingly, the first variable length lever link member 3131a and the first vertical link member 3121a can be rotated around the fifth hinge shaft 3124a, and the first variable length lever link member 3131a can be rotated around the sixth hinge shaft 3134a.

The second variable length link member 3132b may be connected to the right end of the second variable length lever link member 3131b to be slidable along the length direction of the second variable length lever link member 3131b. An outer through-hole may be formed at the left end of the second variable length lever link member 3131b, and an inner through-hole may be formed at the right end of the second variable length link member 3132b, and a central through-hole may be formed between the outer through-hole and the inner through-hole. The distance between the outer through-hole and the center through-hole may be the same as the distance between the second hinge shaft 3104b and the fourth hinge shaft 3114b.

The second variable length lever link member 3131b may be hinged to the upper end of the second vertical link member 3121b. A through-hole may be formed at the upper end of the second vertical link member 3121b. The second variable length lever link member 3131b and the second vertical link member 3121b may be hingedly connected by the seventh hinge shaft 3124b passing through the outer through-hole of the second variable length lever link member 3131b and the through-hole formed at the upper end of the second vertical link member 3121b. The second variable length lever link member 3131b may be hingedly connected to the eighth hinge shaft 3134b by the eighth hinge shaft 3134b passing through the central through-hole of the second variable length lever link member 3131b. Accordingly, the second variable length lever link member 3131b and the second vertical link member 3121b can be rotated around the seventh hinge shaft 3124b, and the second variable length lever link member 3131b can be rotated around the eighth hinge shaft 3134b.

An outer through-hole may be formed at the right end of the third upper horizontal link member 3131c, and a central through-hole may be formed at the left end. The distance between the outer through-hole and the central through-hole may be the same as the distance between the first hinge shaft 3104a and the third hinge shaft 3114a. The third upper horizontal link member 3131c may be hinged to the upper end of the third vertical link member 3121c and the upper end of the third support member 3102c. Through-holes may be formed at the upper end of the third vertical link member 3121c and the upper end of the third support member 3102c, respectively. The third upper horizontal link member 3131c and the third vertical link member 3121c may be hingedly connected by the fifth hinge shaft 3124a passing through the outer through-hole of the third upper horizontal link member 3131c and the through-hole formed at the upper end of the third vertical link member 3121c. The third upper horizontal link member 3131c and the third support member 3102c may be hingedly connected by the sixth hinge shaft 3134a passing through the central through-hole of the third upper horizontal link member 3131c and the through-hole formed at the upper end of the third support member 3102c. Accordingly, the third upper horizontal link member 3131c and the third vertical link member 3121c can be rotated around the fifth hinge shaft 3124a, and the third upper horizontal link member 3131c and the third support member 3102c can be rotated around the sixth hinge shaft 3134a.

An outer through-hole may be formed at the left end of the fourth upper horizontal link member 3131d, and a central through-hole may be formed at the right end. The distance between the outer through-hole and the central through-hole may be the same as the distance between the second hinge shaft 3104b and the fourth hinge shaft 3114b. The fourth upper horizontal link member 3131d may be hinged to the upper end of the fourth vertical link member 3121d and the upper end of the fourth support member 3102d. Through-holes may be formed at the upper end of the fourth vertical link member 3121d and the upper end of the fourth support member 3102d, respectively. The fourth upper horizontal link member 3131d and the fourth vertical link member 3121d may be hingedly connected by the seventh hinge shaft 3124b passing through the outer through-hole of the fourth upper horizontal link member 3131d and the through-hole formed at the upper end of the fourth vertical link member 3121d. The fourth upper horizontal link member 3131d and the fourth support member 3102d may be hingedly connected by the eighth hinge shaft 3134b passing through the central through-hole of the fourth upper horizontal link member 3131d and the through-hole formed at the upper end of the fourth support member 3102d. Accordingly, the fourth upper horizontal link member 3131d and the fourth vertical link member 3121d can be rotated around the seventh hinge shaft 3124b, and the fourth upper horizontal link member 3131d and the fourth support member 3102d can be rotated around the eighth hinge shaft 3134b.

An outer through-hole may be formed at the right end of the fifth upper horizontal link member 3131e, and a central through-hole may be formed at the left end. The distance between the outer through-hole and the central through-hole may be the same as the distance between the first hinge shaft 3104a and the third hinge shaft 3114a. The fifth upper horizontal link member 3131e may be hinged to the upper end of the fifth vertical link member 3121e and the upper end of the fifth support member 3102e. Through-holes may be formed at the upper end of the fifth vertical link member 3121e and the upper end of the fifth support member 3102e, respectively. The fifth upper horizontal link member 3131e and the fifth vertical link member 3121e may be hingedly connected by the fifth hinge shaft 3124a passing through the outer through-hole of the fifth upper horizontal link member 3131e and the through-hole formed at the upper end of the fifth vertical link member 3121e. The fifth upper horizontal link member 3131e and the fifth support member 3102e may be hingedly connected by the sixth hinge shaft 3134a passing through the central through-hole of the fifth upper horizontal link member 3131e and the through-hole formed at the upper end of the fifth support member 3102e. Accordingly, the fifth upper horizontal link member 3131e and the fifth vertical link member 3121e can be rotated around the fifth hinge shaft 3124a, and the fifth upper horizontal link member 3131e and the fifth support member 3102c can be rotated around the sixth hinge shaft 3134a.

An outer through-hole may be formed at the left end of the sixth upper horizontal link member 3131f, and a central through-hole may be formed at the right end. The distance between the outer through-hole and the central through-hole may be the same as the distance between the second hinge shaft 3104b and the fourth hinge shaft 3114b. The sixth upper horizontal link member 3131f may be hinged to the upper end of the sixth vertical link member 3121f and the upper end of the sixth support member 3102f. Through-holes may be formed at the upper end of the sixth vertical link member 3121f and the upper end of the sixth support member 3102f, respectively. The sixth upper horizontal link member 3131f and the sixth vertical link member 3121f may be hingedly connected by the seventh hinge shaft 3124b passing through the outer through-hole of the sixth upper horizontal link member 3131f and the through-hole formed at the upper end of the sixth vertical link member 3121f. The sixth upper horizontal link member 3131f and the sixth support member 3102f may be hingedly connected by the eighth hinge shaft 3134b passing through the central through-hole of the sixth upper horizontal link member 3131f and the through-hole formed at the upper end of the sixth support member 3102f. Accordingly, the sixth upper horizontal link member 3131f and the sixth vertical link member 3121d can be rotated around the seventh hinge shaft 3124b, and the sixth upper horizontal link member 3131f and the sixth support member 3102f can be rotated around the eighth hinge shaft 3134b.

The first vertical link member 3121a, the third vertical link member 3121c and the fifth vertical link member 3121e are connected by the third hinge shaft 3114a and the fifth hinge shaft 3124a to move integrally. The first vertical link member 3121a, the third vertical link member 3121c, and the fifth vertical link member 3121e may be connected by a first vertical plate 3121g, whereby the first vertical link member 3121a, the third vertical link member 3121c and the fifth vertical link member 3121e can have a more robust structure and move integrally. The first wheel 3171a may be directly or indirectly connected to the first vertical plate 3121g.

The second vertical link member 3121b, the fourth vertical link member 3121d, and the sixth vertical link member 3121f are connected by the fourth hinge shaft 3114b and the seventh hinge shaft 3124b to move integrally. The second vertical link member 3121b, the fourth vertical link member 3121d, and the sixth vertical link member 3121f may be connected by the second vertical plate 3121h, whereby the second vertical link member 3121b, the fourth vertical link member 3121d, and the sixth vertical link member 3121f may have a more rigid structure and move integrally. A second wheel 3171b may be directly or indirectly connected to the second vertical plate 3121h.

The rotating member 3150 may be connected to be rotatable about the rotation center axis 3142 of the rotation center axis support member 3141. The rotation center axis 3142 may be fixedly coupled to the central portion of the rotating member 3150 to rotate together with the rotating member 3150, and alternatively, the rotation center axis 3142 may be fixedly coupled to the rotation center axis support member 3141 and the rotating member 3150 may be hingedly connected to the rotation center axis 3142.

The rotating member 3150 may include a first extension member 3151a extending to the right and a second extension member 3151b extending to the left. The first extension member 3151a may be hinged to the end of the first variable length link member 3132a, and the second extension member 3151b may be hinged to the end of the second variable length link member 3132b.

A through-hole may be formed at the end of the first extension member 3151a, and the hinge shaft 3154a passes through the inner through-hole of the first variable length link member 3132a and the through-hole formed at the end of the first extension member 3151a, whereby the first variable length link member 3132a and the first extension member 3151a may be hingedly connected. Accordingly, the first variable length link member 3132a and the first extension member 3151a can be rotated around the ninth hinge shaft 3154a.

A through-hole may be formed at the end of the second extension member 3151b, and the hinge shaft 3154b passes through the inner through-hole of the second variable length link member 3132b and the through-hole formed at the end of the second extension member 3151b, whereby the second variable length link member 3132b and the second extension member 3151b may be hingedly connected. Accordingly, the second variable length link member 3132b and the second extension member 3151b can be rotated around the tenth hinge shaft 3154b.

The rotary shaft drive motor 3161 may be installed on the rotation center axis support member 3141, and the rotating member 3150 may be rotated by rotating the rotation center axis 3142 fixedly coupled to the central portion of the rotating member 3150. In the present embodiment, it has been described that the rotating member 3150 is rotated by the rotary shaft drive motor 3161, but these may be replaced by a rotating member and a rotating shaft driving device of embodiments described later.

Figure 9:
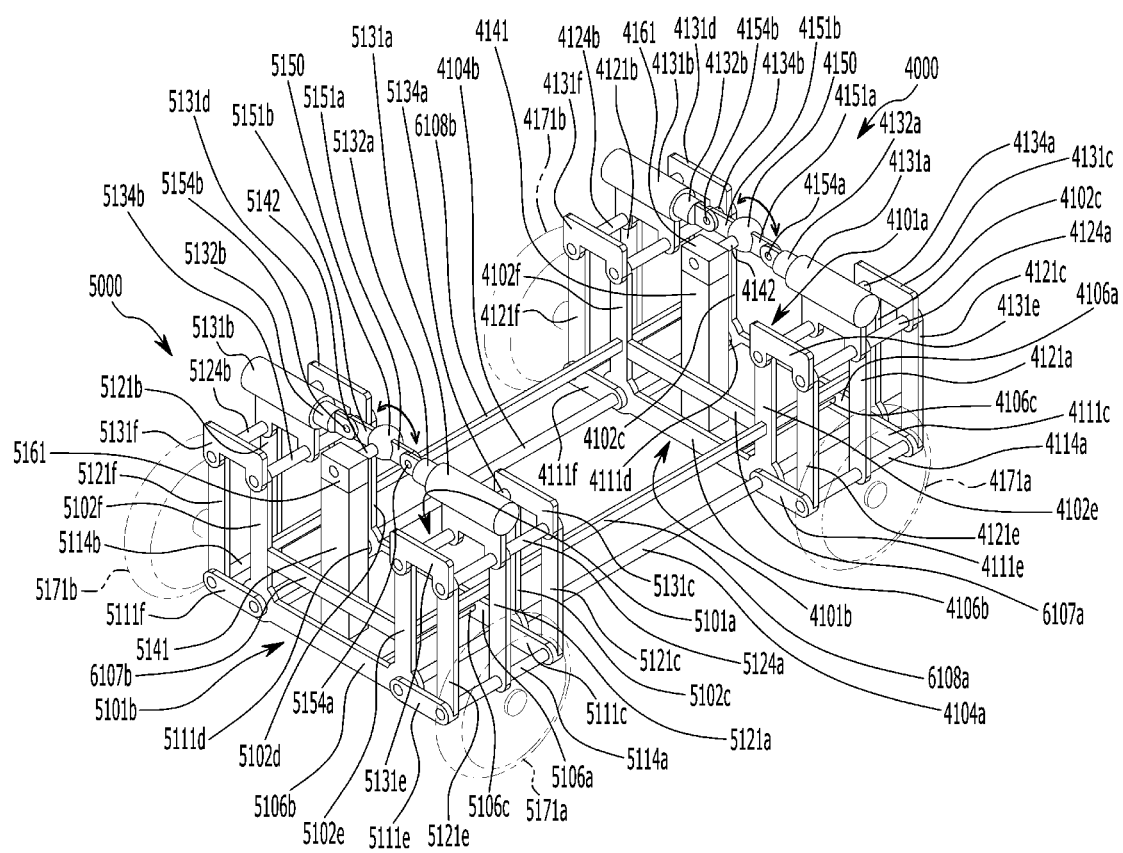
FIG. 9 is a schematic diagram of a tilting car frame according to a third embodiment of the technology disclosed in the present specification.

FIG. 9 is a schematic diagram of a tilting car frame according to a third embodiment of the technology disclosed in the present specification. FIG. 9 shows a configuration in which the tilting car frame shown in FIG. 8 is installed on the front and rear wheels, respectively, so that the front and rear wheels can be independently tilted.

A tilting car frame according to the third embodiment may include a front wheel-tilting car frame 4000 located on the right and a rear tilting car frame 5000 located on the left, based on FIG. 9. In FIG. 9, the tilting car frame located on the right is called the front wheel-tilting car frame, and the tilting car frame located on the left is called the rear wheel tilting car frame, but the tilting car frame located on the right becomes the rear wheel tilting car frame, and The located tilting car frame may be the front wheel-tilting car frame.

A front wheel-tilting car frame 4000 may include a front wheel-first lower center frame 4101a, a front wheel-second lower center frame 4101b, a front wheel-lower center plate 4106c, a front wheel-third horizontal link member 4111c, a front wheel-fourth horizontal link member 4111d, a front wheel-fifth horizontal link member 4111e, a front wheel-sixth horizontal link member 4111f, a front wheel-first vertical link member 4121a, a front wheel-second vertical link member 4121b, a front wheel-third vertical link member 4121c, a front wheel-fourth vertical link member 4121d, a front wheel-fifth vertical link member 4121e, a front wheel-sixth vertical link member 4121f, a front wheel-first variable length lever link member 4131a, a front wheel-second variable length lever link member 4131b, a front wheel-third upper horizontal link member 4131c, a front wheel-fourth upper horizontal link member 4131d, a front wheel-fifth upper horizontal link member 4131e, a front wheel-sixth upper horizontal link member 4131f, a front wheel-rotation center axis support member 4141, a front wheel-rotating member 4150 and a front wheel-rotary shaft drive motor 4161.

The front wheel-first lower center frame 4101a may include a right end located on the right side and a left end located on the left side with reference to FIG. 9, and may include a front wheel-first horizontal member 4106a that is elongated in the left and right direction. A front wheel-third support member 4102c extending upward may be formed at the right end, and a front wheel-fourth support member 4102d extending upward may be formed at the left end.

The front wheel-second lower center frame 4101b may include a right end located on the right side and a left end located on the left side with reference to FIG. 9, and may include a front wheel-second horizontal member 4106b that is elongated in the left and right direction. A front wheel-fifth support member 4102e extending upward may be formed at the right end, and a front wheel-sixth support member 4102f extending upward may be formed at the left end.

The front wheel-first horizontal member 4106a of the front wheel-first lower center frame 4101a and the front wheel-second horizontal member 4106b of the front wheel-second lower center frame 4101b may be connected by a front wheel-lower center plate 4106c. Accordingly, the front wheel-first lower center frame 4101a and the front wheel-second lower center frame 4101b move integrally.

The left end of the front wheel-third horizontal link member 4111c may be hinged to the right end of the front wheel-first horizontal member 4106a. A through-hole is formed at the right end of the front wheel-first horizontal member 4106a, and a through-hole is also formed at the left end of the front wheel-third horizontal link member 4111c, and the front wheel-first horizontal member 4106a and the front wheel-third horizontal link member 4111c may be hingedly connected by a common-first hinge shaft 4104a passing through the through-hole of the right end of the front wheel-first horizontal member 4106a and the through-hole of the left end of the front wheel-third horizontal link member 4111c. Accordingly, the front wheel-first lower center frame 4101a and the front wheel-third horizontal link member 4111c can be rotated around the common-first hinge shaft 4104a.

The right end of the front wheel-fourth horizontal link member 4111d may be hinged to the left end of the front wheel-first horizontal member 4106a. A through-hole is formed at the left end of the front wheel-first horizontal member 4106a, and a through-hole is also formed at the right end of the front wheel-fourth horizontal link member 4111d, and the front wheel-first horizontal member 4106a and the front wheel-fourth horizontal link member 4111d may be hingedly connected by a common-second hinge shaft 4104b passing through the through-hole of the left end of the front wheel-first horizontal member 4106a and the through-hole of the right end of the front wheel-fourth horizontal link member 4111d. Accordingly, the front wheel-first lower center frame 4101a and the front wheel-fourth horizontal link member 4111d can be rotated around the common-second hinge shaft 4104b.

The left end of the front wheel-fifth horizontal link member 4111e may be hinged to the right end of the front wheel-second horizontal member 4106b. A through-hole is formed at the right end of the front wheel-second horizontal member 4106b, and a through-hole is also formed at the left end of the front wheel-fifth horizontal link member 4111e, and the front wheel-second horizontal member 4106b and the front wheel-fifth horizontal link member 4111e may be hingedly connected by the common-first hinge shaft 4104a passing through the through-hole of the right end of the front wheel-second horizontal member 4106b and the through-hole of the left end of the front wheel-fifth horizontal link member 4111e. Accordingly, the front wheel-second lower center frame 4101b and the front wheel-fifth horizontal link member 4111e can be rotated around the common-first hinge shaft 4104a.

The right end of the front wheel-sixth horizontal link member 4111f may be hinged to the left end of the front wheel-second horizontal member 4106b. A through-hole is formed at the left end of the front wheel-second horizontal member 4106b, and a through-hole is also formed at the right end of the front wheel-sixth horizontal link member 4111f, and the front wheel-second horizontal member 4106b and the front wheel-sixth horizontal link member 4111f may be hingedly connected by the common-second hinge shaft 4104b passing through the through-hole of the left end of the front wheel-second horizontal member 4106b and the through-hole of the right end of the front wheel-sixth horizontal link member 4111f. Accordingly, the front wheel-second lower center frame 4101b and the front wheel-sixth horizontal link member 4111f can be rotated around the common-second hinge shaft 4104b.

The lower end of the front wheel-third vertical link member 4121c may be hinged to the right end of the front wheel-third horizontal link member 4111c. A through-hole is formed at the right end of the front wheel-third horizontal link member 4111c, and a through-hole is also formed at the lower end of the front wheel-third vertical link member 4121c, and the front wheel-third horizontal link member 4111c and the front wheel-third vertical link member 4121c may be hingedly connected by a front wheel-third hinge shaft 4114a passing through the through-hole of the front wheel-third horizontal link member 4111c and the through-hole of the front wheel-third vertical link member 4121c. Accordingly, the front wheel-third vertical link member 4121c and the front wheel-third horizontal link member 4111c can be rotated around the front wheel-third hinge shaft 4114a.

The lower end of the front wheel-fourth vertical link member 4121d may be hinged to the left end of the front wheel-fourth horizontal link member 4111d. A through-hole is formed at the left end of the front wheel-fourth horizontal link member 4111d, and a through-hole is also formed at the lower end of the front wheel-fourth vertical link member 4121d, and the front wheel-fourth horizontal link member 4111d and the front wheel-fourth vertical link member 4121d may be hingedly connected by a front wheel-fourth hinge shaft 4114b passing through the through-hole of the front wheel-fourth horizontal link member 4111d and the through-hole of the front wheel-fourth vertical link member 4121d. Accordingly, the front wheel-fourth vertical link member 4121d and the front wheel-fourth horizontal link member 4111d can be rotated around the front wheel-fourth hinge shaft 4114b.

The lower end of the front wheel-fifth vertical link member 4121e may be hinged to the right end of the front wheel-fifth horizontal link member 4111e. A through-hole is formed at the right end of the front wheel-fifth horizontal link member 4111e, and a through-hole is also formed at the lower end of the front wheel-fifth vertical link member 4121e, and the front wheel-fifth horizontal link member 4111e and the front wheel-fifth vertical link member 4121e may be hingedly connected by the front wheel-third hinge shaft 4114a passing through the through-hole of the front wheel-fifth horizontal link member 4111e and the through-hole of the front wheel-fifth vertical link member 4121e. Accordingly, the front wheel-fifth vertical link member 4121e and the front wheel-fifth horizontal link member 4111e can be rotated around the front wheel-third hinge shaft 4114a.

The lower end of the front wheel-sixth vertical link member 4121f may be hinged to the left end of the front wheel-sixth horizontal link member 4111f A through-hole is formed at the left end of the front wheel-sixth horizontal link member 4111f, and a through-hole is also formed at the lower end of the front wheel-sixth vertical link member 4121f, and the front wheel-sixth horizontal link member 4111f and the front wheel-sixth vertical link member 4121f may be hingedly connected by a front wheel-fourth hinge shaft 4114b passing through the through-hole of the front wheel-sixth horizontal link member 4111f and the through-hole of the front wheel-sixth vertical link member 4121f. Accordingly, the front wheel-sixth vertical link member 4121f and the front wheel-sixth horizontal link member 4111f can be rotated around the front wheel-fourth hinge shaft 4114b.

The front wheel-first vertical link member 4121a is positioned between the front wheel-third vertical link member 4121c and the front wheel-fifth vertical link member 4121e, and the lower end is hingedly connected to the front wheel-third hinge shaft 4114a.

The front wheel-second vertical link member 4121b is positioned between the front wheel-fourth vertical link member 4121d and the front wheel-sixth vertical link member 4121f, and the lower end is hingedly connected to the front wheel-fourth hinge shaft 4114b.

The front wheel-rotation center axis support member 4141 may be a member located at the center of the front wheel-lower center plate 4106c. A front wheel-rotating member 4150 may be rotatably connected to an upper end of the front wheel-rotation center axis support member 4141.

The front wheel-first variable length lever link member 4131a may be connected such that the front wheel-first variable length link member 4132a is slidable along the length direction of the front wheel-first variable length lever link member 4131a at the left end. An outer through-hole may be formed at the right end of the front wheel-first variable length lever link member 4131a, and an inner through-hole may be formed at the left end of the front wheel-first variable length link member 4132a, and a central through-hole may be formed between the outer through-hole and the inner through-hole. The distance between the outer through-hole and the center through-hole may be the same as the distance between the common-first hinge shaft 4104a and the front wheel-third hinge shaft 4114a.

The front wheel-first variable length lever link member 4131a may be hinged to the upper end of the front wheel-first vertical link member 4121a. A through-hole may be formed at the upper end of the front wheel-first vertical link member 4121a. The front wheel-first variable length lever link member 4131a and the front wheel-first vertical link member 4121a may be hingedly connected by the front wheel-fifth hinge shaft 4124a passing through the outer through-hole of the front wheel-first variable length lever link member 4131a and the through-hole formed at the upper end of the front wheel-first vertical link member 4121a. The front wheel-first variable length lever link member 4131a may be hingedly connected to the front wheel-sixth hinge shaft 4134a by the front wheel-sixth hinge shaft 4134a passing through the central through-hole of the front wheel-first variable length lever link member 4131a. Accordingly, the front wheel-first variable length lever link member 4131a and the front wheel-first vertical link member 4121a can be rotated around the front wheel-fifth hinge shaft 4124a, and the front wheel-first variable length lever link member 4131a can be rotated around the front wheel-sixth hinge shaft 4134a.

The front wheel-second variable length link member 4132b may be connected to the right end of the front wheel-second variable length lever link member 4131b to be slidable along the length direction of the front wheel-second variable length lever link member 4131b. An outer through-hole may be formed at the left end of the front wheel-second variable length lever link member 4131b, and an inner through-hole may be formed at the right end of the front wheel-second variable length link member 4132b, and a central through-hole may be formed between the outer through-hole and the inner through-hole. The distance between the outer through-hole and the center through-hole may be the same as the distance between the common-second hinge shaft 4104b and the front wheel-fourth hinge shaft 4114b.

The front wheel-second variable length lever link member 4131b may be hinged to the upper end of the front wheel-second vertical link member 4121b. A through-hole may be formed at the upper end of the front wheel-second vertical link member 4121b. The front wheel-second variable length lever link member 4131b and the front wheel-second vertical link member 4121b may be hingedly connected by the front wheel-seventh hinge shaft 4124b passing through the outer through-hole of the front wheel-second variable length lever link member 4131*b* and the through-hole formed at the upper end of the front wheel-second vertical link member 4121*b*. The front wheel-second variable length lever link member 4131*b* may be hingedly connected to the front wheel-eighth hinge shaft 4134*b* by the front wheel-eighth hinge shaft 4134*b* passing through the central through-hole of the front wheel-second variable length lever link member 4131*b*. Accordingly, the front wheel-second variable length lever link member 4131*b* and the front wheel-second vertical link member 4121*b* can be rotated around the front wheel-seventh hinge shaft 4124*b*, and the front wheel-second variable length lever link member 4131*b* can be rotated around the front wheel-eighth hinge shaft 4134*b*.

An outer through-hole may be formed at the right end of the front wheel-third upper horizontal link member 4131*c*, and a central through-hole may be formed at the left end. The distance between the outer through-hole and the central through-hole may be the same as the distance between the common-first hinge shaft 4104*a* and the front wheel-third hinge shaft 4114*a*. The front wheel-third upper horizontal link member 4131*c* may be hinged to the upper end of the front wheel-third vertical link member 4121*c* and the upper end of the front wheel-third support member 4102*c*. Through-holes may be formed at the upper end of the front wheel-third vertical link member 4121*c* and the upper end of the front wheel-third support member 4102*c*, respectively. The front wheel-third upper horizontal link member 4131*c* and the front wheel-third vertical link member 4121*c* may be hingedly connected by the front wheel-fifth hinge shaft 4124*a* passing through the outer through-hole of the front wheel-third upper horizontal link member 4131*c* and the through-hole formed at the upper end of the front wheel-third vertical link member 4121*c*. The front wheel-third upper horizontal link member 4131*c* and the front wheel-third support member 4102*c* may be hingedly connected by the front wheel-sixth hinge shaft 4134*a* passing through the central through-hole of the front wheel-third upper horizontal link member 4131*c* and the through-hole formed at the upper end of the front wheel-third support member 3102*c*. Accordingly, the front wheel-third upper horizontal link member 4131*c* and the front wheel-third vertical link member 4121*c* can be rotated around the front wheel-fifth hinge shaft 4124*a*, and the front wheel-third upper horizontal link member 4131*c* and the front wheel-third support member 4102*c* can be rotated around the front wheel-sixth hinge shaft 4134*a*.

An outer through-hole may be formed at the left end of the front wheel-fourth upper horizontal link member 4131*d*, and a central through-hole may be formed at the right end. The distance between the outer through-hole and the central through-hole may be the same as the distance between the common-second hinge shaft 4104*b* and the front wheel-fourth hinge shaft 4114*b*. The front wheel-fourth upper horizontal link member 4131*d* may be hinged to the upper end of the front wheel-fourth vertical link member 4121*d* and the upper end of the front wheel-fourth support member 4102*d*. Through-holes may be formed at the upper end of the front wheel-fourth vertical link member 4121*d* and the upper end of the front wheel-fourth support member 4102*d*, respectively. The front wheel-fourth upper horizontal link member 4131*d* and the front wheel-fourth vertical link member 4121*d* may be hingedly connected by the front wheel-seventh hinge shaft 4124*b* passing through the outer through-hole of the front wheel-fourth upper horizontal link member 4131*d* and the through-hole formed at the upper end of the front wheel-fourth vertical link member 4121*d*. The front wheel-fourth upper horizontal link member 4131*d* and the front wheel-fourth support member 4102*d* may be hingedly connected by the front wheel-eighth hinge shaft 4134*b* passing through the central through-hole of the front wheel-fourth upper horizontal link member 4131*d* and the through-hole formed at the upper end of the front wheel-fourth support member 4102*d*. Accordingly, the front wheel-fourth upper horizontal link member 4131*d* and the front wheel-fourth vertical link member 4121*d* can be rotated around the front wheel-seventh hinge shaft 4124*b*, and the front wheel-fourth upper horizontal link member 4131*d* and the front wheel-fourth support member 4102*d* can be rotated around the front wheel-eighth hinge shaft 4134*b*.

An outer through-hole may be formed at the right end of the front wheel-fifth upper horizontal link member 4131*e*, and a central through-hole may be formed at the left end. The distance between the outer through-hole and the central through-hole may be the same as the distance between the common-first hinge shaft 4104*a* and the front wheel-third hinge shaft 4114*a*. The front wheel-fifth upper horizontal link member 4131*e* may be hinged to the upper end of the front wheel-fifth vertical link member 4121*e* and the upper end of the front wheel-fifth support member 4102*e*. Through-holes may be formed at the upper end of the front wheel-fifth vertical link member 4121*e* and the upper end of the front wheel-fifth support member 4102*e*, respectively. The front wheel-fifth upper horizontal link member 4131*e* and the front wheel-fifth vertical link member 4121*e* may be hingedly connected by the front wheel-fifth hinge shaft 4124*a* passing through the outer through-hole of the front wheel-fifth upper horizontal link member 4131*e* and the through-hole formed at the upper end of the front wheel-fifth vertical link member 4121*e*. The front wheel-fifth upper horizontal link member 4131*e* and the front wheel-fifth support member 4102*e* may be hingedly connected by the front wheel-sixth hinge shaft 4134*a* passing through the central through-hole of the front wheel-fifth upper horizontal link member 4131*e* and the through-hole formed at the upper end of the front wheel-fifth support member 4102*e*. Accordingly, the front wheel-fifth upper horizontal link member 4131*e* and the front wheel-fifth vertical link member 4121*e* can be rotated around the front wheel-fifth hinge shaft 4124*a*, and the front wheel-fifth upper horizontal link member 4131*e* and the front wheel-fifth support member 4102*c* can be rotated around the front wheel-sixth hinge shaft 4134*a*.

An outer through-hole may be formed at the left end of the front wheel-sixth upper horizontal link member 4131*f*, and a central through-hole may be formed at the right end. The distance between the outer through-hole and the central through-hole may be the same as the distance between the common-second hinge shaft 4104*b* and the front wheel-fourth hinge shaft 4114*b*. The front wheel-sixth upper horizontal link member 4131*f* may be hinged to the upper end of the front wheel-sixth vertical link member 4121*f* and the upper end of the front wheel-sixth support member 4102*f* Through-holes may be formed at the upper end of the front wheel-sixth vertical link member 4121*f* and the upper end of the front wheel-sixth support member 4102*f*, respectively. The front wheel-sixth upper horizontal link member 4131*f* and the front wheel-sixth vertical link member 4121*f* may be hingedly connected by the front wheel-seventh hinge shaft 4124*b* passing through the outer through-hole of the front wheel-sixth upper horizontal link member 4131*f* and the through-hole formed at the upper end of the front wheel-sixth vertical link member 4121*f*. The front wheel-sixth upper horizontal link member 4131*f* and the front wheel-sixth support member 4102*f* may be hingedly connected by the front wheel-eighth hinge shaft 4134*b* passing through the central through-hole of the front wheel-sixth upper horizontal link member 4131*f* and the through-hole formed at the upper end of the front wheel-sixth support member 4102*f*. Accordingly, the front wheel-sixth upper horizontal link member 4131*f* and the front wheel-sixth vertical link member 4121*d* can be rotated around the front wheel-seventh hinge shaft 4124*b*, and the front wheel-sixth upper horizontal link member 4131*f* and the front wheel-sixth support member 4102*f* can be rotated around the front wheel-eighth hinge shaft 4134*b*.

The front wheel-first vertical link member 4121*a*, the front wheel-third vertical link member 4121*c* and the front wheel-fifth vertical link member 4121*e* are connected by the front wheel-third hinge shaft 4114*a* and the front wheel-fifth hinge shaft 4124*a* to move integrally. The front wheel-first vertical link member 4121*a*, the front wheel-third vertical link member 4121*c*, and the front wheel-fifth vertical link member 4121*e* may be connected by a front wheel-first vertical plate 4121*g*, whereby the front wheel-first vertical link member 4121*a*, the front wheel-third vertical link member 4121*c* and the front wheel-fifth vertical link member 4121*e* can have a more robust structure and move integrally. The front wheel-first wheel 4171*a* may be directly or indirectly connected to the front wheel-first vertical plate 4121*g*.

The front wheel-second vertical link member 4121*b*, the front wheel-fourth vertical link member 4121*d*, and the front wheel-sixth vertical link member 4121*f* are connected by the front wheel-fourth hinge shaft 4114*b* and the front wheel-seventh hinge shaft 4124*b* to move integrally. The front wheel-second vertical link member 4121*b*, the front wheel-fourth vertical link member 4121*d*, and the front wheel-sixth vertical link member 4121*f* may be connected by the front wheel-second vertical plate 4121*h*, whereby the front wheel-second vertical link member 4121*b*, the front wheel-fourth vertical link member 4121*d*, and the front wheel-sixth vertical link member 4121*f* may have a more rigid structure and move integrally. A front wheel-second wheel 4171*b* may be directly or indirectly connected to the front wheel-second vertical plate 4121*h*.

The front wheel-rotating member 4150 may be connected to be rotatable about the front wheel-rotation center axis 4142 of the front wheel-rotation center axis support member 4141. The front wheel-rotation center axis 4142 may be fixedly coupled to the central portion of the front wheel-rotating member 4150 to rotate together with the front wheel-rotating member 4150, and alternatively, the front wheel-rotation center axis 4142 may be fixedly coupled to the front wheel-rotation center axis support member 4141 and the front wheel-rotating member 4150 may be hingedly connected to the front wheel-rotation center axis 4142.

The front wheel-rotating member 4150 may include a front wheel-first extension member 4151*a* extending to the right and a front wheel-second extension member 4151*b* extending to the left. The front wheel-first extension member 4151*a* may be hinged to the end of the front wheel-first variable length link member 4132*a*, and the front wheel-second extension member 4151*b* may be hinged to the end of the front wheel-second variable length link member 4132*b*.

A through-hole may be formed at the end of the front wheel-first extension member 4151*a*, and the front wheel-hinge shaft 4154*a* passes through the inner through-hole of the front wheel-first variable length link member 4132*a* and the through-hole formed at the end of the front wheel-first extension member 4151*a*, whereby the front wheel-first variable length link member 4132*a* and the front wheel-first extension member 4151*a* may be hingedly connected. Accordingly, the front wheel-first variable length link member 4132*a* and the front wheel-first extension member 4151*a* can be rotated around the front wheel-ninth hinge shaft 4154*a*.

A through-hole may be formed at the end of the front wheel-second extension member 4151*b*, and the front wheel-hinge shaft 4154*b* passes through the inner through-hole of the front wheel-second variable length link member 4132*b* and the through-hole formed at the end of the front wheel-second extension member 4151*b*, whereby the front wheel-second variable length link member 4132*b* and the front wheel-second extension member 4151*b* may be hingedly connected. Accordingly, the front wheel-second variable length link member 4132*b* and the front wheel-second extension member 4151*b* can be rotated around the front wheel-tenth hinge shaft 4154*b*.

The front wheel-rotary shaft drive motor 4161 may be installed on the front wheel-rotation center axis support member 4141, and the front wheel-rotating member 4150 may be rotated by rotating the front wheel-rotation center axis 4142 fixedly coupled to the central portion of the front wheel-rotating member 4150. In the front wheel tilting car frame 4000, it has been described that the front wheel-rotating member 4150 is rotated by the front wheel-rotary shaft drive motor 4161, but these may be replaced by a rotating member and a rotating shaft driving device of embodiments described later.

A rear wheel tilting car frame 5000 may include a rear wheel-first lower center frame 5101*a*, a rear wheel-second lower center frame 5101*b*, a rear wheel-lower center plate 5106*c*, a rear wheel-third horizontal link member 5111*c*, a rear wheel-fourth horizontal link member 5111*d*, a rear wheel-fifth horizontal link member 5111*e*, a rear wheel-sixth horizontal link member 5111*f*, a rear wheel-first vertical link member 5121*a*, a rear wheel-second vertical link member 5121*b*, a rear wheel-third vertical link member 5121*c*, a rear wheel-fourth vertical link member 5121*d*, a rear wheel-fifth vertical link member 5121*e*, a rear wheel-sixth vertical link member 5121*f*, a rear wheel-first variable length lever link member 5131*a*, a rear wheel-second variable length lever link member 5131*b*, a rear wheel-third upper horizontal link member 5131*c*, a rear wheel-fourth upper horizontal link member 5131*d*, a rear wheel-fifth upper horizontal link member 5131*e*, a rear wheel-sixth upper horizontal link member 5131*f*, a rear wheel-rotation center axis support member 5141, a rear wheel-rotating member 5150 and a rear wheel-rotary shaft drive motor 5161.

The rear wheel-first lower center frame 5101*a* may include a right end located on the right side and a left end located on the left side with reference to FIG. 9, and may include a rear wheel-first horizontal member 5106*a* that is elongated in the left and right direction. A rear wheel-third support member 5102*c* extending upward may be formed at the right end, and a rear wheel-fourth support member 5102*d* extending upward may be formed at the left end.

The rear wheel-second lower center frame 5101*b* may include a right end located on the right side and a left end located on the left side with reference to FIG. 9, and may include a rear wheel-second horizontal member 5106*b* that is elongated in the left and right direction. A rear wheel-fifth support member 5102*e* extending upward may be formed at the right end, and a rear wheel-sixth support member 5102*f* extending upward may be formed at the left end.

The rear wheel-first horizontal member 5106*a* of the rear wheel-first lower center frame 5101*a* and the rear wheel-second horizontal member 5106*b* of the rear wheel-second lower center frame 5101*b* may be connected by a rear wheel-lower center plate 5106*c*. Accordingly, the rear wheel-first lower center frame 5101*a* and the rear wheel-second lower center frame 5101*b* move integrally.

The left end of the rear wheel-third horizontal link member 5111*c* may be hinged to the right end of the rear wheel-first horizontal member 5106*a*. A through-hole is formed at the right end of the rear wheel-first horizontal member 5106*a*, and a through-hole is also formed at the left end of the rear wheel-third horizontal link member 5111*c*, and the rear wheel-first horizontal member 5106*a* and the rear wheel-third horizontal link member 5111*c* may be hingedly connected by a common-first hinge shaft 5104*a* passing through the through-hole of the right end of the rear wheel-first horizontal member 5106*a* and the through-hole of the left end of the rear wheel-third horizontal link member 5111*c*. Accordingly, the rear wheel-first lower center frame 5101*a* and the rear wheel-third horizontal link member 5111*c* can be rotated around the common-first hinge shaft 5104*a*.

The right end of the rear wheel-fourth horizontal link member 5111*d* may be hinged to the left end of the rear wheel-first horizontal member 5106*a*. A through-hole is formed at the left end of the rear wheel-first horizontal member 5106*a*, and a through-hole is also formed at the right end of the rear wheel-fourth horizontal link member 5111*d*, and the rear wheel-first horizontal member 5106*a* and the rear wheel-fourth horizontal link member 5111*d* may be hingedly connected by a common-second hinge shaft 5104*b* passing through the through-hole of the left end of the rear wheel-first horizontal member 5106*a* and the through-hole of the right end of the rear wheel-fourth horizontal link member 5111*d*. Accordingly, the rear wheel-first lower center frame 5101*a* and the rear wheel-fourth horizontal link member 5111*d* can be rotated around the common-second hinge shaft 5104*b*.

The left end of the rear wheel-fifth horizontal link member 5111*e* may be hinged to the right end of the rear wheel-second horizontal member 5106*b*. A through-hole is formed at the right end of the rear wheel-second horizontal member 5106*b*, and a through-hole is also formed at the left end of the rear wheel-fifth horizontal link member 5111*e*, and the rear wheel-second horizontal member 5106*b* and the rear wheel-fifth horizontal link member 5111*e* may be hingedly connected by the common-first hinge shaft 5104*a* passing through the through-hole of the right end of the rear wheel-second horizontal member 5106*b* and the through-hole of the left end of the rear wheel-fifth horizontal link member 5111*e*. Accordingly, the rear wheel-second lower center frame 5101*b* and the rear wheel-fifth horizontal link member 5111*e* can be rotated around the common-first hinge shaft 5104*a*.

The right end of the rear wheel-sixth horizontal link member 5111*f* may be hinged to the left end of the rear wheel-second horizontal member 5106*b*. A through-hole is formed at the left end of the rear wheel-second horizontal member 5106*b*, and a through-hole is also formed at the right end of the rear wheel-sixth horizontal link member 5111*f*, and the rear wheel-second horizontal member 5106*b* and the rear wheel-sixth horizontal link member 5111*f* may be hingedly connected by the common-second hinge shaft 5104*b* passing through the through-hole of the left end of the rear wheel-second horizontal member 5106*b* and the through-hole of the right end of the rear wheel-sixth horizontal link member 5111*f*. Accordingly, the rear wheel-second lower center frame 5101*b* and the rear wheel-sixth horizontal link member 5111*f* can be rotated around the common-second hinge shaft 5104*b*.

The lower end of the rear wheel-third vertical link member 5121*c* may be hinged to the right end of the rear wheel-third horizontal link member 5111*c*. A through-hole is formed at the right end of the rear wheel-third horizontal link member 5111*c*, and a through-hole is also formed at the lower end of the rear wheel-third vertical link member 5121*c*, and the rear wheel-third horizontal link member 5111*c* and the rear wheel-third vertical link member 5121*c* may be hingedly connected by a rear wheel-third hinge shaft 5114*a* passing through the through-hole of the rear wheel-third horizontal link member 5111*c* and the through-hole of the rear wheel-third vertical link member 5121*c*. Accordingly, the rear wheel-third vertical link member 5121*c* and the rear wheel-third horizontal link member 5111*c* can be rotated around the rear wheel-third hinge shaft 5114*a*.

The lower end of the rear wheel-fourth vertical link member 5121*d* may be hinged to the left end of the rear wheel-fourth horizontal link member 5111*d*. A through-hole is formed at the left end of the rear wheel-fourth horizontal link member 5111*d*, and a through-hole is also formed at the lower end of the rear wheel-fourth vertical link member 5121*d*, and the rear wheel-fourth horizontal link member 5111*d* and the rear wheel-fourth vertical link member 5121*d* may be hingedly connected by a rear wheel-fourth hinge shaft 5114*b* passing through the through-hole of the rear wheel-fourth horizontal link member 5111*d* and the through-hole of the rear wheel-fourth vertical link member 5121*d*. Accordingly, the rear wheel-fourth vertical link member 5121*d* and the rear wheel-fourth horizontal link member 5111*d* can be rotated around the rear wheel-fourth hinge shaft 5114*b*.

The lower end of the rear wheel-fifth vertical link member 5121*e* may be hinged to the right end of the rear wheel-fifth horizontal link member 5111*e*. A through-hole is formed at the right end of the rear wheel-fifth horizontal link member 5111*e*, and a through-hole is also formed at the lower end of the rear wheel-fifth vertical link member 5121*e*, and the rear wheel-fifth horizontal link member 5111*e* and the rear wheel-fifth vertical link member 5121*e* may be hingedly connected by the rear wheel-third hinge shaft 5114*a* passing through the through-hole of the rear wheel-fifth horizontal link member 5111*e* and the through-hole of the rear wheel-fifth vertical link member 5121*e*. Accordingly, the rear wheel-fifth vertical link member 5121*e* and the rear wheel-fifth horizontal link member 5111*e* can be rotated around the rear wheel-third hinge shaft 5114*a*.

The lower end of the rear wheel-sixth vertical link member 5121*f* may be hinged to the left end of the rear wheel-sixth horizontal link member 5111*f* A through-hole is formed at the left end of the rear wheel-sixth horizontal link member 5111*f*, and a through-hole is also formed at the lower end of the rear wheel-sixth vertical link member 5121*f*, and the rear wheel-sixth horizontal link member 5111*f* and the rear wheel-sixth vertical link member 5121*f* may be hingedly connected by a rear wheel-fourth hinge shaft 5114*b* passing through the through-hole of the rear wheel-sixth horizontal link member 5111*f* and the through-hole of the rear wheel-sixth vertical link member 5121*f* Accordingly, the rear wheel-sixth vertical link member 5121*f* and the rear wheel-sixth horizontal link member 5111*f* can be rotated around the rear wheel-fourth hinge shaft 5114*b*.

The rear wheel-first vertical link member 5121*a* is positioned between the rear wheel-third vertical link member 5121c and the rear wheel-fifth vertical link member 5121e, and the lower end is hingedly connected to the rear wheel-third hinge shaft 5114a.

The rear wheel-second vertical link member 5121b is positioned between the rear wheel-fourth vertical link member 5121d and the rear wheel-sixth vertical link member 5121f, and the lower end is hingedly connected to the rear wheel-fourth hinge shaft 5114b.

The rear wheel-rotation center axis support member 5141 may be a member located at the center of the rear wheel-lower center plate 5106c. A rear wheel-rotating member 5150 may be rotatably connected to an upper end of the rear wheel-rotation center axis support member 5141.

The rear wheel-first variable length lever link member 5131a may be connected such that the rear wheel-first variable length link member 5132a is slidable along the length direction of the rear wheel-first variable length lever link member 5131a at the left end. An outer through-hole may be formed at the right end of the rear wheel-first variable length lever link member 5131a, and an inner through-hole may be formed at the left end of the rear wheel-first variable length link member 5132a, and a central through-hole may be formed between the outer through-hole and the inner through-hole. The distance between the outer through-hole and the center through-hole may be the same as the distance between the common-first hinge shaft 5104a and the rear wheel-third hinge shaft 5114a.

The rear wheel-first variable length lever link member 5131a may be hinged to the upper end of the rear wheel-first vertical link member 5121a. A through-hole may be formed at the upper end of the rear wheel-first vertical link member 5121a. The rear wheel-first variable length lever link member 5131a and the rear wheel-first vertical link member 5121a may be hingedly connected by the rear wheel-fifth hinge shaft 5124a passing through the outer through-hole of the rear wheel-first variable length lever link member 5131a and the through-hole formed at the upper end of the rear wheel-first vertical link member 5121a. The rear wheel-first variable length lever link member 5131a may be hingedly connected to the rear wheel-sixth hinge shaft 5134a by the rear wheel-sixth hinge shaft 5134a passing through the central through-hole of the rear wheel-first variable length lever link member 5131a. Accordingly, the rear wheel-first variable length lever link member 5131a and the rear wheel-first vertical link member 5121a can be rotated around the rear wheel-fifth hinge shaft 5124a, and the rear wheel-first variable length lever link member 5131a can be rotated around the rear wheel-sixth hinge shaft 5134a.

The rear wheel-second variable length link member 5132b may be connected to the right end of the rear wheel-second variable length lever link member 5131b to be slidable along the length direction of the rear wheel-second variable length lever link member 5131b. An outer through-hole may be formed at the left end of the rear wheel-second variable length lever link member 5131b, and an inner through-hole may be formed at the right end of the rear wheel-second variable length link member 5132b, and a central through-hole may be formed between the outer through-hole and the inner through-hole. The distance between the outer through-hole and the center through-hole may be the same as the distance between the common-second hinge shaft 5104b and the rear wheel-fourth hinge shaft 5114b.

The rear wheel-second variable length lever link member 5131b may be hinged to the upper end of the rear wheel-second vertical link member 5121b. A through-hole may be formed at the upper end of the rear wheel-second vertical link member 5121b. The rear wheel-second variable length lever link member 5131b and the rear wheel-second vertical link member 5121b may be hingedly connected by the rear wheel-seventh hinge shaft 5124b passing through the outer through-hole of the rear wheel-second variable length lever link member 5131b and the through-hole formed at the upper end of the rear wheel-second vertical link member 5121b. The rear wheel-second variable length lever link member 5131b may be hingedly connected to the rear wheel-eighth hinge shaft 5134b by the rear wheel-eighth hinge shaft 5134b passing through the central through-hole of the rear wheel-second variable length lever link member 5131b. Accordingly, the rear wheel-second variable length lever link member 5131b and the rear wheel-second vertical link member 5121b can be rotated around the rear wheel-seventh hinge shaft 5124b, and the rear wheel-second variable length lever link member 5131b can be rotated around the rear wheel-eighth hinge shaft 5134b.

An outer through-hole may be formed at the right end of the rear wheel-third upper horizontal link member 5131c, and a central through-hole may be formed at the left end. The distance between the outer through-hole and the central through-hole may be the same as the distance between the common-first hinge shaft 5104a and the rear wheel-third hinge shaft 5114a. The rear wheel-third upper horizontal link member 5131c may be hinged to the upper end of the rear wheel-third vertical link member 5121c and the upper end of the rear wheel-third support member 5102c. Through-holes may be formed at the upper end of the rear wheel-third vertical link member 5121c and the upper end of the rear wheel-third support member 5102c, respectively. The rear wheel-third upper horizontal link member 5131c and the rear wheel-third vertical link member 5121c may be hingedly connected by the rear wheel-fifth hinge shaft 5124a passing through the outer through-hole of the rear wheel-third upper horizontal link member 5131c and the through-hole formed at the upper end of the rear wheel-third vertical link member 5121c. The rear wheel-third upper horizontal link member 5131c and the rear wheel-third support member 5102c may be hingedly connected by the rear wheel-sixth hinge shaft 5134a passing through the central through-hole of the rear wheel-third upper horizontal link member 5131c and the through-hole formed at the upper end of the rear wheel-third support member 3102c. Accordingly, the rear wheel-third upper horizontal link member 5131c and the rear wheel-third vertical link member 5121c can be rotated around the rear wheel-fifth hinge shaft 5124a, and the rear wheel-third upper horizontal link member 5131c and the rear wheel-third support member 5102c can be rotated around the rear wheel-sixth hinge shaft 5134a.

An outer through-hole may be formed at the left end of the rear wheel-fourth upper horizontal link member 5131d, and a central through-hole may be formed at the right end. The distance between the outer through-hole and the central through-hole may be the same as the distance between the common-second hinge shaft 5104b and the rear wheel-fourth hinge shaft 5114b. The rear wheel-fourth upper horizontal link member 5131d may be hinged to the upper end of the rear wheel-fourth vertical link member 5121d and the upper end of the rear wheel-fourth support member 5102d. Through-holes may be formed at the upper end of the rear wheel-fourth vertical link member 5121d and the upper end of the rear wheel-fourth support member 5102d, respectively. The rear wheel-fourth upper horizontal link member 5131d and the rear wheel-fourth vertical link member 5121d may be hingedly connected by the rear wheel-seventh hinge shaft 5124b passing through the outer through-hole of the rear wheel-fourth upper horizontal link member 5131d and the through-hole formed at the upper end of the rear wheel-fourth vertical link member 5121d. The rear wheel-fourth upper horizontal link member 5131d and the rear wheel-fourth support member 5102d may be hingedly connected by the rear wheel-eighth hinge shaft 5134b passing through the central through-hole of the rear wheel-fourth upper horizontal link member 5131d and the through-hole formed at the upper end of the rear wheel-fourth support member 5102d. Accordingly, the rear wheel-fourth upper horizontal link member 5131d and the rear wheel-fourth vertical link member 5121d can be rotated around the rear wheel-seventh hinge shaft 5124b, and the rear wheel-fourth upper horizontal link member 5131d and the rear wheel-fourth support member 5102d can be rotated around the rear wheel-eighth hinge shaft 5134b.

An outer through-hole may be formed at the right end of the rear wheel-fifth upper horizontal link member 5131e, and a central through-hole may be formed at the left end. The distance between the outer through-hole and the central through-hole may be the same as the distance between the common-first hinge shaft 5104a and the rear wheel-third hinge shaft 5114a. The rear wheel-fifth upper horizontal link member 5131e may be hinged to the upper end of the rear wheel-fifth vertical link member 5121e and the upper end of the rear wheel-fifth support member 5102e. Through-holes may be formed at the upper end of the rear wheel-fifth vertical link member 5121e and the upper end of the rear wheel-fifth support member 5102e, respectively. The rear wheel-fifth upper horizontal link member 5131e and the rear wheel-fifth vertical link member 5121e may be hingedly connected by the rear wheel-fifth hinge shaft 5124a passing through the outer through-hole of the rear wheel-fifth upper horizontal link member 5131e and the through-hole formed at the upper end of the rear wheel-fifth vertical link member 5121e. The rear wheel-fifth upper horizontal link member 5131e and the rear wheel-fifth support member 5102e may be hingedly connected by the rear wheel-sixth hinge shaft 5134a passing through the central through-hole of the rear wheel-fifth upper horizontal link member 5131e and the through-hole formed at the upper end of the rear wheel-fifth support member 5102e. Accordingly, the rear wheel-fifth upper horizontal link member 5131e and the rear wheel-fifth vertical link member 5121e can be rotated around the rear wheel-fifth hinge shaft 5124a, and the rear wheel-fifth upper horizontal link member 5131e and the rear wheel-fifth support member 5102c can be rotated around the rear wheel-sixth hinge shaft 5134a.

An outer through-hole may be formed at the left end of the rear wheel-sixth upper horizontal link member 5131f, and a central through-hole may be formed at the right end. The distance between the outer through-hole and the central through-hole may be the same as the distance between the common-second hinge shaft 5104b and the rear wheel-fourth hinge shaft 5114b. The rear wheel-sixth upper horizontal link member 5131f may be hinged to the upper end of the rear wheel-sixth vertical link member 5121f and the upper end of the rear wheel-sixth support member 5102f. Through-holes may be formed at the upper end of the rear wheel-sixth vertical link member 5121f and the upper end of the rear wheel-sixth support member 5102f, respectively. The rear wheel-sixth upper horizontal link member 5131f and the rear wheel-sixth vertical link member 5121f may be hingedly connected by the rear wheel-seventh hinge shaft 5124b passing through the outer through-hole of the rear wheel-sixth upper horizontal link member 5131f and the through-hole formed at the upper end of the rear wheel-sixth vertical link member 5121f. The rear wheel-sixth upper horizontal link member 5131f and the rear wheel-sixth support member 5102f may be hingedly connected by the rear wheel-eighth hinge shaft 5134b passing through the central through-hole of the rear wheel-sixth upper horizontal link member 5131f and the through-hole formed at the upper end of the rear wheel-sixth support member 5102f. Accordingly, the rear wheel-sixth upper horizontal link member 5131f and the rear wheel-sixth vertical link member 5121d can be rotated around the rear wheel-seventh hinge shaft 5124b, and the rear wheel-sixth upper horizontal link member 5131f and the rear wheel-sixth support member 5102f can be rotated around the rear wheel-eighth hinge shaft 5134b.

The rear wheel-first vertical link member 5121a, the rear wheel-third vertical link member 5121c and the rear wheel-fifth vertical link member 5121e are connected by the rear wheel-third hinge shaft 5114a and the rear wheel-fifth hinge shaft 5124a to move integrally. The rear wheel-first vertical link member 5121a, the rear wheel-third vertical link member 5121c, and the rear wheel-fifth vertical link member 5121e may be connected by a rear wheel-first vertical plate 5121g, whereby the rear wheel-first vertical link member 5121a, the rear wheel-third vertical link member 5121c and the rear wheel-fifth vertical link member 5121e can have a more robust structure and move integrally. The rear wheel-first wheel 5171a may be directly or indirectly connected to the rear wheel-first vertical plate 5121g.

The rear wheel-second vertical link member 5121b, the rear wheel-fourth vertical link member 5121d, and the rear wheel-sixth vertical link member 5121f are connected by the rear wheel-fourth hinge shaft 5114b and the rear wheel-seventh hinge shaft 5124b to move integrally. The rear wheel-second vertical link member 5121b, the rear wheel-fourth vertical link member 5121d, and the rear wheel-sixth vertical link member 5121f may be connected by the rear wheel-second vertical plate 5121h, whereby the rear wheel-second vertical link member 5121b, the rear wheel-fourth vertical link member 5121d, and the rear wheel-sixth vertical link member 5121f may have a more rigid structure and move integrally. A rear wheel-second wheel 5171b may be directly or indirectly connected to the rear wheel-second vertical plate 5121h.

The rear wheel-rotating member 5150 may be connected to be rotatable about the rear wheel-rotation center axis 5142 of the rear wheel-rotation center axis support member 5141. The rear wheel-rotation center axis 5142 may be fixedly coupled to the central portion of the rear wheel-rotating member 5150 to rotate together with the rear wheel-rotating member 5150, and alternatively, the rear wheel-rotation center axis 5142 may be fixedly coupled to the rear wheel-rotation center axis support member 5141 and the rear wheel-rotating member 5150 may be hingedly connected to the rear wheel-rotation center axis 5142.

The rear wheel-rotating member 5150 may include a rear wheel-first extension member 5151a extending to the right and a rear wheel-second extension member 5151b extending to the left. The rear wheel-first extension member 5151a may be hinged to the end of the rear wheel-first variable length link member 5132a, and the rear wheel-second extension member 5151b may be hinged to the end of the rear wheel-second variable length link member 5132b.

A through-hole may be formed at the end of the rear wheel-first extension member 5151a, and the rear wheel-hinge shaft 5154a passes through the inner through-hole of the rear wheel-first variable length link member 5132a and the through-hole formed at the end of the rear wheel-first extension member 5151a, whereby the rear wheel-first variable length link member 5132a and the rear wheel-first extension member 5151a may be hingedly connected. Accordingly, the rear wheel-first variable length link member 5132a and the rear wheel-first extension member 5151a can be rotated around the rear wheel-ninth hinge shaft 5154a.

A through-hole may be formed at the end of the rear wheel-second extension member 5151b, and the rear wheel-hinge shaft 5154b passes through the inner through-hole of the rear wheel-second variable length link member 5132b and the through-hole formed at the end of the rear wheel-second extension member 5151b, whereby the rear wheel-second variable length link member 5132b and the rear wheel-second extension member 5151b may be hingedly connected. Accordingly, the rear wheel-second variable length link member 5132b and the rear wheel-second extension member 5151b can be rotated around the rear wheel-tenth hinge shaft 5154b.

The rear wheel-rotary shaft drive motor 5161 may be installed on the rear wheel-rotation center axis support member 5141, and the rear wheel-rotating member 5150 may be rotated by rotating the rear wheel-rotation center axis 5142 fixedly coupled to the central portion of the rear wheel-rotating member 5150. In the front wheel tilting car frame 5000, it has been described that the rear wheel-rotating member 5150 is rotated by the rear wheel-rotary shaft drive motor 5161, but these may be replaced by a rotating member and a rotating shaft driving device of embodiments described later.

The front wheel-tilting car frame 4000 and the rear wheel-tilting car frame 5000 may be connected to each other by a first front-rear reinforcement frame 6108a, a second front-rear reinforcement frame 6108b, a first left-right reinforcement frame 6107a and a second left-right reinforcement frame 6107b.

The first left-right reinforcement frame 6107a may connect the front wheel-sixth support member 4102f and the front wheel-fifth support member 4102e of the front wheel-second lower center frame 4101b. The first left-right reinforcement frame 6107a may connect the front wheel-fourth support member 4102d and the front wheel-third support member 4102c of the front wheel-first lower center frame 4101a, and may be installed in both the front wheel-first lower center frame 4101a and the front wheel-second lower center frame 4101b.

The second left-right reinforcement frame 6107b may connect the rear wheel-sixth support member 5102f and the rear wheel-fifth support member 5102e of the rear wheel-second lower center frame 5101b. The second left-right reinforcement frame 6107b may connect the rear wheel-fourth support member 5102d and the rear wheel-third support member 5102c of the rear wheel-first lower center frame 5101a, and may be installed in both the rear wheel-first lower center frame 5101a and the rear wheel-second lower center frame 5101b.

The first front-rear reinforcement frame 6108a may connect the front wheel-fifth support member 4102e of the front wheel-second lower center frame 4101b and the rear wheel-third support member 5102c of the rear wheel-first lower center frame 5101a, may penetrate the front wheel-fifth support member 4102e to extend to the front wheel-third support member 4102c, and may penetrate the rear wheel-third support member 5102c to extend to the rear wheel-fifth support member 5102e.

The second front-rear reinforcement frame 6108b may connect the front wheel-sixth support member 4102f of the front wheel-second lower center frame 4101b and the rear wheel-fourth support member 5102d of the rear wheel-first lower center frame 5101a, may penetrate the front wheel-sixth support member 4102f to extend to the front wheel-fourth support member 4102d, and may penetrate the rear wheel-fourth support member 5102d to extend to the rear wheel-sixth support member 5102f.

Figure 10:
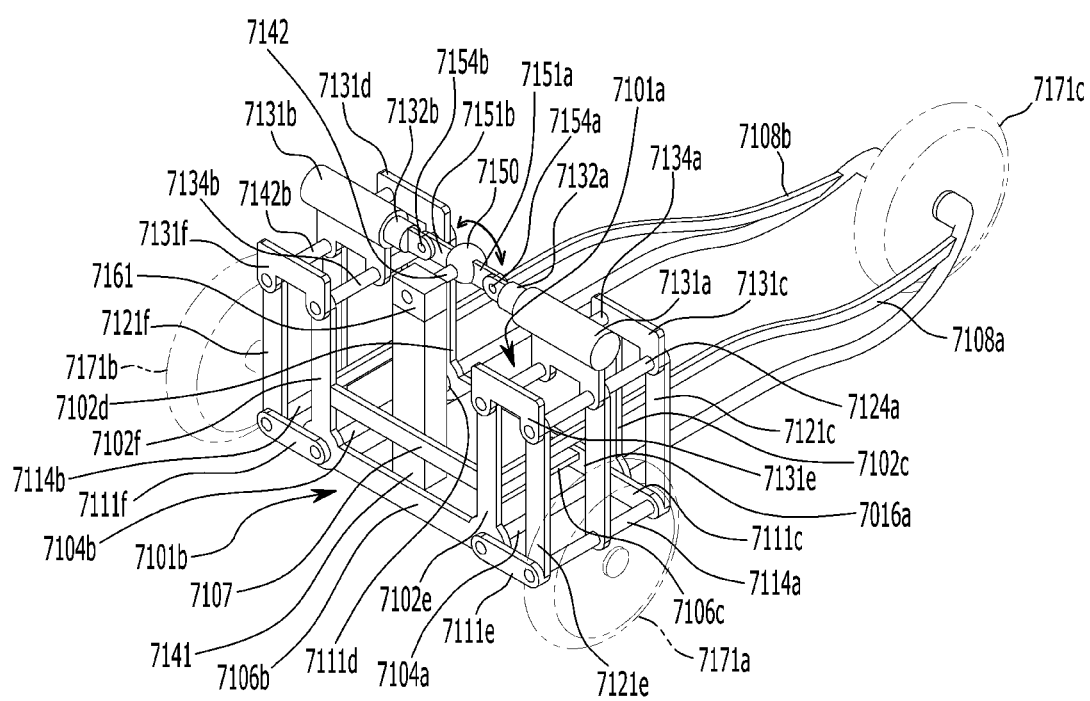
FIG. 10 is a schematic diagram of a tilting car frame according to a fourth embodiment of the technology disclosed in the present specification.

FIG. 10 is a schematic diagram of a tilting car frame according to a fourth embodiment of the technology disclosed in the present specification. FIG. 10 shows a configuration in which the tilting car frame shown in FIG. 8 is used as a three-wheel vehicle. The tilting car frame of FIG. 10 may be used as a front wheel or a rear wheel.

The tilting car frame according to the fourth embodiment may include a first lower center frame 7101a, a second lower center frame 7101b, a lower center plate 7106c, a third horizontal link member 7111c, a fourth horizontal link member 7111d, a fifth horizontal link member 7111e, a sixth horizontal link member 7111f, a first vertical link member 7121a, a second vertical link member 7121b, a third vertical link member 7121c, a fourth vertical link member 7121d, a fifth vertical link member 7121e, a sixth vertical link member 7121f, a first variable length lever link member 7131a, a second variable length lever link member 7131b, a third upper horizontal link member 7131c, a fourth upper horizontal link member 7131d, a fifth upper horizontal link member 7131e, a sixth upper horizontal link member 7131f, a rotation center axis support member 7141, a rotating member 7150 and a rotary shaft drive motor 7161.

The first lower center frame 7101a may include a right end located on the right side and a left end located on the left side with reference to FIG. 8, and may include a first horizontal member 7106a that is elongated in the left and right direction. A third support member 7102c extending upward may be formed at the right end, and a fourth support member 7102d extending upward may be formed at the left end.

The second lower center frame 7101b may include a right end located on the right side and a left end located on the left side with reference to FIG. 8, and may include a second horizontal member 7106a that is elongated in the left and right direction. A fifth support member 7102e extending upward may be formed at the right end, and a sixth support member 7102f extending upward may be formed at the left end.

The first horizontal member 7106a of the first lower center frame 7101a and the second horizontal member 7106b of the second lower center frame 7101b may be connected by a lower center plate 7106c. Accordingly, the first lower center frame 7101a and the second lower center frame 7101b move integrally.

The left end of the third horizontal link member 7111c may be hinged to the right end of the first horizontal member 7106a. A through-hole is formed at the right end of the first horizontal member 7106a, and a through-hole is also formed at the left end of the third horizontal link member 7111c, and the first horizontal member 7106a and the third horizontal link member 7111c may be hingedly connected by a first hinge shaft 7104a passing through the through-hole of the right end of the first horizontal member 7106a and the through-hole of the left end of the third horizontal link member 7111c. Accordingly, the first lower center frame 7101a and the third horizontal link member 7111c can be rotated around the first hinge shaft 7104a.

The right end of the fourth horizontal link member 7111d may be hinged to the left end of the first horizontal member 7106a. A through-hole is formed at the left end of the first horizontal member 7106a, and a through-hole is also formed at the right end of the fourth horizontal link member 7111d, and the first horizontal member 7106a and the fourth horizontal link member 7111d may be hingedly connected by a second hinge shaft 7104b passing through the through-hole of the left end of the first horizontal member 7106a and the through-hole of the right end of the fourth horizontal link member 7111d. Accordingly, the first lower center frame 7101a and the fourth horizontal link member 7111d can be rotated around the second hinge shaft 7104b.

The left end of the fifth horizontal link member 7111e may be hinged to the right end of the second horizontal member 7106b. A through-hole is formed at the right end of the second horizontal member 7106b, and a through-hole is also formed at the left end of the fifth horizontal link member 7111e, and the second horizontal member 7106b and the fifth horizontal link member 7111e may be hingedly connected by the first hinge shaft 7104a passing through the through-hole of the right end of the second horizontal member 7106b and the through-hole of the left end of the fifth horizontal link member 7111e. Accordingly, the second lower center frame 7101b and the fifth horizontal link member 7111e can be rotated around the first hinge shaft 7104a.

The right end of the sixth horizontal link member 7111f may be hinged to the left end of the second horizontal member 7106b. A through-hole is formed at the left end of the second horizontal member 7106b, and a through-hole is also formed at the right end of the sixth horizontal link member 7111f, and the second horizontal member 7106b and the sixth horizontal link member 7111f may be hingedly connected by the second hinge shaft 7104b passing through the through-hole of the left end of the second horizontal member 7106b and the through-hole of the right end of the sixth horizontal link member 7111f. Accordingly, the second lower center frame 7101b and the sixth horizontal link member 7111f can be rotated around the second hinge shaft 7104b.

The lower end of the third vertical link member 7121c may be hinged to the right end of the third horizontal link member 7111c. A through-hole is formed at the right end of the third horizontal link member 7111c, and a through-hole is also formed at the lower end of the third vertical link member 7121c, and the third horizontal link member 7111c and the third vertical link member 7121c may be hingedly connected by a third hinge shaft 7114a passing through the through-hole of the third horizontal link member 7111c and the through-hole of the third vertical link member 7121c. Accordingly, the third vertical link member 7121c and the third horizontal link member 7111c can be rotated around the third hinge shaft 7114a.

The lower end of the fourth vertical link member 7121d may be hinged to the left end of the fourth horizontal link member 7111d. A through-hole is formed at the left end of the fourth horizontal link member 7111d, and a through-hole is also formed at the lower end of the fourth vertical link member 7121d, and the fourth horizontal link member 7111d and the fourth vertical link member 7121d may be hingedly connected by a fourth hinge shaft 7114b passing through the through-hole of the fourth horizontal link member 7111d and the through-hole of the fourth vertical link member 7121d. Accordingly, the fourth vertical link member 7121d and the fourth horizontal link member 7111d can be rotated around the fourth hinge shaft 7114b.

The lower end of the fifth vertical link member 7121e may be hinged to the right end of the fifth horizontal link member 7111e. A through-hole is formed at the right end of the fifth horizontal link member 7111e, and a through-hole is also formed at the lower end of the fifth vertical link member 7121e, and the fifth horizontal link member 7111e and the fifth vertical link member 7121e may be hingedly connected by the third hinge shaft 7114a passing through the through-hole of the fifth horizontal link member 7111e and the through-hole of the fifth vertical link member 7121e. Accordingly, the fifth vertical link member 7121e and the fifth horizontal link member 7111e can be rotated around the third hinge shaft 7114a.

The lower end of the sixth vertical link member 7121f may be hinged to the left end of the sixth horizontal link member 7111f. A through-hole is formed at the left end of the sixth horizontal link member 7111f, and a through-hole is also formed at the lower end of the sixth vertical link member 7121f, and the sixth horizontal link member 7111f and the sixth vertical link member 7121f may be hingedly connected by a fourth hinge shaft 7114b passing through the through-hole of the sixth horizontal link member 7111f and the through-hole of the sixth vertical link member 7121f. Accordingly, the sixth vertical link member 7121f and the sixth horizontal link member 7111f can be rotated around the fourth hinge shaft 7114b.

The first vertical link member 7121a is positioned between the third vertical link member 7121c and the fifth vertical link member 7121e, and the lower end is hingedly connected to the third hinge shaft 7114a.

The second vertical link member 7121b is positioned between the fourth vertical link member 7121d and the sixth vertical link member 7121f, and the lower end is hingedly connected to the fourth hinge shaft 7114b.

The rotation center axis support member 7141 may be a member located at the center of the lower center plate 7106c. A rotating member 7150 may be rotatably connected to an upper end of the rotation center axis support member 7141.

The first variable length lever link member 7131a may be connected such that the first variable length link member 7132a is slidable along the length direction of the first variable length lever link member 7131a at the left end. An outer through-hole may be formed at the right end of the first variable length lever link member 7131a, and an inner through-hole may be formed at the left end of the first variable length link member 7132a, and a central through-hole may be formed between the outer through-hole and the inner through-hole. The distance between the outer through-hole and the center through-hole may be the same as the distance between the first hinge shaft 7104a and the third hinge shaft 7114a.

The first variable length lever link member 7131a may be hinged to the upper end of the first vertical link member 7121a. A through-hole may be formed at the upper end of the first vertical link member 7121a. The first variable length lever link member 7131a and the first vertical link member 7121a may be hingedly connected by the fifth hinge shaft 7124a passing through the outer through-hole of the first variable length lever link member 7131a and the through-hole formed at the upper end of the first vertical link member 7121a. The first variable length lever link member 7131a may be hingedly connected to the sixth hinge shaft 7134a by the sixth hinge shaft 7134a passing through the central through-hole of the first variable length lever link member 7131a. Accordingly, the first variable length lever link member 7131a and the first vertical link member 7121a can be rotated around the fifth hinge shaft 7124a, and the first variable length lever link member 7131a can be rotated around the sixth hinge shaft 7134a.

The second variable length lever link member 7131b may be connected such that the second variable length link member 7132b is slidable along the length direction of the second variable length lever link member 7131b at the left end. An outer through-hole may be formed at the left end of the second variable length lever link member 7131b, and an inner through-hole may be formed at the right end of the second variable length link member 7132b, and a central through-hole may be formed between the outer through-hole and the inner through-hole. The distance between the outer through-hole and the center through-hole may be the same as the distance between the second hinge shaft 7104b and the fourth hinge shaft 7114b.

The second variable length lever link member 7131b may be hinged to the upper end of the second vertical link member 7121b. A through-hole may be formed at the upper end of the second vertical link member 7121b. The second variable length lever link member 7131b and the second vertical link member 7121b may be hingedly connected by the seventh hinge shaft 7124b passing through the outer through-hole of the second variable length lever link member 7131b and the through-hole formed at the upper end of the second vertical link member 7121b. The second variable length lever link member 7131b may be hingedly connected to the eighth hinge shaft 7134b by the eighth hinge shaft 7134b passing through the central through-hole of the second variable length lever link member 7131b. Accordingly, the second variable length lever link member 7131b and the second vertical link member 7121b can be rotated around the seventh hinge shaft 7124b, and the second variable length lever link member 7131b can be rotated around the eighth hinge shaft 7134b.

An outer through-hole may be formed at the right end of the third upper horizontal link member 7131c, and a central through-hole may be formed at the left end. The distance between the outer through-hole and the central through-hole may be the same as the distance between the first hinge shaft 7104a and the third hinge shaft 7114a. The third upper horizontal link member 7131c may be hinged to the upper end of the third vertical link member 7121c and the upper end of the third support member 7102c. Through-holes may be formed at the upper end of the third vertical link member 7121c and the upper end of the third support member 7102c, respectively. The third upper horizontal link member 7131c and the third vertical link member 7121c may be hingedly connected by the fifth hinge shaft 7124a passing through the outer through-hole of the third upper horizontal link member 7131c and the through-hole formed at the upper end of the third vertical link member 7121c. The third upper horizontal link member 7131c and the third support member 7102c may be hingedly connected by the sixth hinge shaft 7134a passing through the central through-hole of the third upper horizontal link member 7131c and the through-hole formed at the upper end of the third support member 7102c. Accordingly, the third upper horizontal link member 7131c and the third vertical link member 7121c can be rotated around the fifth hinge shaft 7124a, and the third upper horizontal link member 7131c and the third support member 7102c can be rotated around the sixth hinge shaft 7134a.

An outer through-hole may be formed at the left end of the fourth upper horizontal link member 7131d, and a central through-hole may be formed at the right end. The distance between the outer through-hole and the central through-hole may be the same as the distance between the second hinge shaft 7104b and the fourth hinge shaft 7114b. The fourth upper horizontal link member 7131d may be hinged to the upper end of the fourth vertical link member 7121d and the upper end of the fourth support member 7102d. Through-holes may be formed at the upper end of the fourth vertical link member 7121d and the upper end of the fourth support member 7102d, respectively. The fourth upper horizontal link member 7131d and the fourth vertical link member 7121d may be hingedly connected by the seventh hinge shaft 7124b passing through the outer through-hole of the fourth upper horizontal link member 7131d and the through-hole formed at the upper end of the fourth vertical link member 7121d. The fourth upper horizontal link member 7131d and the fourth support member 7102d may be hingedly connected by the eighth hinge shaft 7134b passing through the central through-hole of the fourth upper horizontal link member 7131d and the through-hole formed at the upper end of the fourth support member 7102d. Accordingly, the fourth upper horizontal link member 7131d and the fourth vertical link member 7121d can be rotated around the seventh hinge shaft 7124b, and the fourth upper horizontal link member 7131d and the fourth support member 7102d can be rotated around the eighth hinge shaft 7134b.

An outer through-hole may be formed at the right end of the fifth upper horizontal link member 7131e, and a central through-hole may be formed at the left end. The distance between the outer through-hole and the central through-hole may be the same as the distance between the first hinge shaft 7104a and the third hinge shaft 7114a. The fifth upper horizontal link member 7131e may be hinged to the upper end of the fifth vertical link member 7121e and the upper end of the fifth support member 7102e. Through-holes may be formed at the upper end of the fifth vertical link member 7121e and the upper end of the fifth support member 7102e, respectively. The fifth upper horizontal link member 7131e and the fifth vertical link member 7121e may be hingedly connected by the fifth hinge shaft 7124a passing through the outer through-hole of the fifth upper horizontal link member 7131e and the through-hole formed at the upper end of the fifth vertical link member 7121e. The fifth upper horizontal link member 7131e and the fifth support member 7102e may be hingedly connected by the sixth hinge shaft 7134a passing through the central through-hole of the fifth upper horizontal link member 7131e and the through-hole formed at the upper end of the fifth support member 7102e. Accordingly, the fifth upper horizontal link member 7131e and the fifth vertical link member 7121e can be rotated around the fifth hinge shaft 7124a, and the fifth upper horizontal link member 7131e and the fifth support member 7102c can be rotated around the sixth hinge shaft 7134a.

An outer through-hole may be formed at the left end of the sixth upper horizontal link member 7131f, and a central through-hole may be formed at the right end. The distance between the outer through-hole and the central through-hole may be the same as the distance between the second hinge shaft 7104b and the fourth hinge shaft 7114b. The sixth upper horizontal link member 7131f may be hinged to the upper end of the sixth vertical link member 7121f and the upper end of the sixth support member 7102f. Through-holes may be formed at the upper end of the sixth vertical link member 7121f and the upper end of the sixth support member 7102f, respectively. The sixth upper horizontal link member 7131f and the sixth vertical link member 7121f may be hingedly connected by the seventh hinge shaft 7124b passing through the outer through-hole of the sixth upper horizontal link member 7131f and the through-hole formed at the upper end of the sixth vertical link member 7121f. The sixth upper horizontal link member 7131f and the sixth support member 7102f may be hingedly connected by the eighth hinge shaft 7134b passing through the central through-hole of the sixth upper horizontal link member 7131f and the through-hole formed at the upper end of the sixth support member 7102*f*. Accordingly, the sixth upper horizontal link member 7131*f* and the sixth vertical link member 7121*d* can be rotated around the seventh hinge shaft 7124*b*, and the sixth upper horizontal link member 7131*f* and the sixth support member 7102*f* can be rotated around the eighth hinge shaft 7134*b*.

The first vertical link member 7121*a*, the third vertical link member 7121*c* and the fifth vertical link member 7121*e* are connected by the third hinge shaft 7114*a* and the fifth hinge shaft 7124*a* to move integrally. The first vertical link member 7121*a*, the third vertical link member 7121*c*, and the fifth vertical link member 7121*e* may be connected by a first vertical plate 7121*g*, whereby the first vertical link member 7121*a*, the third vertical link member 7121*c* and the fifth vertical link member 7121*e* can have a more robust structure and move integrally. The first wheel 7171*a* may be directly or indirectly connected to the first vertical plate 7121*g*.

The second vertical link member 7121*b*, the fourth vertical link member 7121*d*, and the sixth vertical link member 7121*f* are connected by the fourth hinge shaft 7114*b* and the seventh hinge shaft 7124*b* to move integrally. The second vertical link member 7121*b*, the fourth vertical link member 7121*d*, and the sixth vertical link member 7121*f* may be connected by the second vertical plate 7121*h*, whereby the second vertical link member 7121*b*, the fourth vertical link member 7121*d*, and the sixth vertical link member 7121*f* may have a more rigid structure and move integrally. A second wheel 7171*b* may be directly or indirectly connected to the second vertical plate 7121*h*.

The rotating member 7150 may be connected to be rotatable about the rotation center axis 7142 of the rotation center axis support member 7141. The rotation center axis 7142 may be fixedly coupled to the central portion of the rotating member 7150 to rotate together with the rotating member 7150, and alternatively, the rotation center axis 7142 may be fixedly coupled to the rotation center axis support member 7141 and the rotating member 7150 may be hingedly connected to the rotation center axis 7142.

The rotating member 7150 may include a first extension member 7151*a* extending to the right and a second extension member 7151*b* extending to the left. The first extension member 7151*a* may be hinged to the end of the first variable length link member 7132*a*, and the second extension member 7151*b* may be hinged to the end of the second variable length link member 7132*b*.

A through-hole may be formed at the end of the first extension member 7151*a*, and the hinge shaft 7154*a* passes through the inner through-hole of the first variable length link member 7132*a* and the through-hole formed at the end of the first extension member 7151*a*, whereby the first variable length link member 7132*a* and the first extension member 7151*a* may be hingedly connected. Accordingly, the first variable length link member 7132*a* and the first extension member 7151*a* can be rotated around the ninth hinge shaft 7154*a*.

A through-hole may be formed at the end of the second extension member 7151*b*, and the hinge shaft 7154*b* passes through the inner through-hole of the second variable length link member 7132*b* and the through-hole formed at the end of the second extension member 7151*b*, whereby the second variable length link member 7132*b* and the second extension member 7151*b* may be hingedly connected. Accordingly, the second variable length link member 7132*b* and the second extension member 7151*b* can be rotated around the tenth hinge shaft 7154*b*.

The rotary shaft drive motor 7161 may be installed on the rotation center axis support member 7141, and the rotating member 7150 may be rotated by rotating the rotation center axis 7142 fixedly coupled to the central portion of the rotating member 7150. In the present embodiment, it has been described that the rotating member 7150 is rotated by the rotary shaft drive motor 7161, but these may be replaced by a rotating member and a rotating shaft driving device of embodiments described later.

The tilting car frame may be connected to a third wheel 7171*c*, which is a single wheel, through a first hinge shaft 7104*a* and a second hinge shaft 7104*b*. The first hinge shaft 7104*a* and the second hinge shaft 7104*b* extend in the direction of the third wheel 7171*c* to become a rotation shaft of the third wheel 7171*c*. In order to reinforce the rigidity of this structure, the left-right reinforcement frame 7107 may connect the sixth support member 7102*f* and the fifth support member 7102*e* of the second lower center frame 7101*b*. The left-right reinforcement frame 7107 may connect the fourth support member 7102*d* and the third support member 7102*c* of the first lower center frame 7101*a*, and may be installed in both the first lower center frame 7101*a* and the second lower center frame 7101*b*.

The first front-rear reinforcement frame 7108*a* may connect the first hinge shaft 7104*a* and the third support member 7102*c* of the first lower center frame 7101*a*, and may penetrate through the third support member 7102*c* to extend to the fifth support member 7102*e*. The second front-rear reinforcement frame 7108*b* may connect the second hinge shaft 7104*b* and the fourth support member 7102*d* of the first lower center frame 7101*a*, and may penetrate through the fourth support member 7102*d* to extend to the sixth support member 7102*f*.

Figure 11:
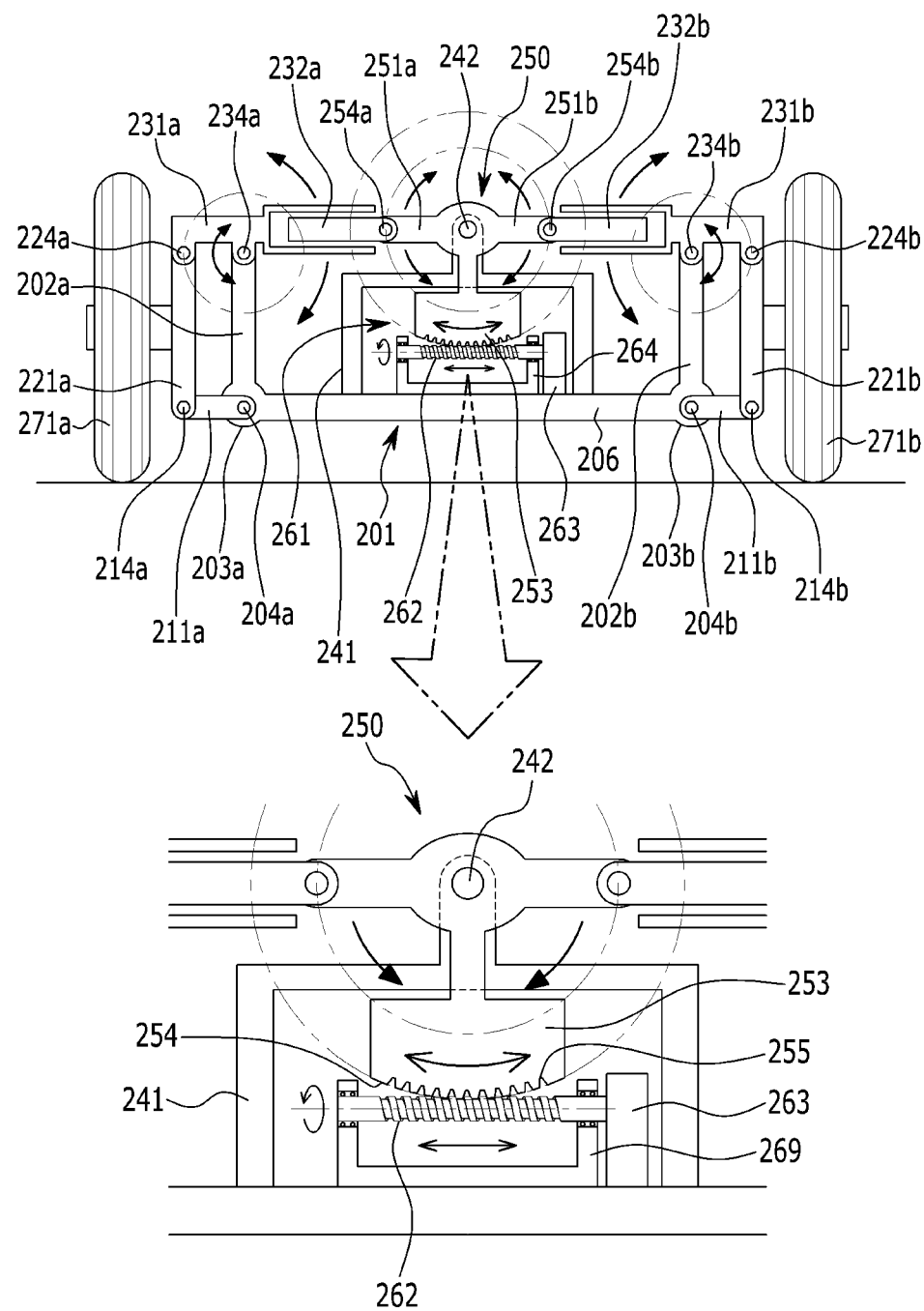
FIG. 11 is a schematic diagram of a tilting car frame according to a fifth embodiment of the technology disclosed in the present specification.

FIG. 11 is a schematic diagram of a tilting car frame according to a fifth embodiment of the technology disclosed in the present specification.

The tilting car frame according to the fifth embodiment may include a lower center frame 201, a first horizontal link member 211*a*, a second horizontal link member 211*b*, a first vertical link member 221*a*, a second vertical link member 221*b*, a first variable length lever link member 231*a*, a second variable length lever link member 231*b*, a rotation center axis support member 241, a rotating member 250 and a rotating shaft driving device 261.

The lower center frame 201 may include a first end 203*a* located on the left and a second end 203*b* located on the right with reference to FIG. 11, and may include a horizontal member 206 that is elongated in the left and right direction. A first support member 202*a* extending upward from the first end 203*a* may be formed at the first end 203*a*, and a second support member 202*b* extending upward from the second end 203*b* may be formed at the second end 203*b*.

The right end of the first horizontal link member 211*a* may be hinged to the first end 203*a*. A through-hole may be formed at the first end 203*a*, and a through-hole may also be formed at the right end of the first horizontal link member 211*a*, and the first end 203*a* and the first horizontal link member 211*a* may be hingedly connected by a hinge shaft 204*a* passing through the through-hole of the first end 203*a* and the through-hole of the first horizontal link member 211*a*. Accordingly, the first horizontal link member 211*a* and the lower center frame 201 can be rotated about the hinge shaft 204*a*.

The left end of the second horizontal link member 211*b* may be hinged to the second end 203*b*. A through-hole may be formed at the second end 203*b*, and a through-hole may also be formed at the left end of the second horizontal link member 211*b*, and the second end 203*b* and the second horizontal link member 211*b* may be hingedly connected by a hinge shaft 204*b* passing through the through-hole of the second end 203*b* and the through-hole of the second horizontal link member 211*b*. Accordingly, the second horizontal link member 211*b* and the lower center frame 201 can be rotated about the hinge shaft 204*b*.

The lower end of the first vertical link member 221*a* may be hinged to the left end of the first horizontal link member 211*a*. A through-hole may be formed at the left end of the first horizontal link member 211*a*, and a through-hole may also be formed at the lower end of the first vertical link member 221*a*, and the first horizontal link member 211*a* and the first vertical link member 221*a* may be hingedly connected by the hinge shaft 214*a* passing through the through-hole of the first horizontal link member 211*a* and the through-hole of the first vertical link member 221*a*. Accordingly, the first vertical link member 221*a* and the first horizontal link member 211*a* can rotate around the hinge shaft 214*a*.

A first wheel 271*a* may be connected to the first vertical link member 221*a*, and the first wheel 271*a* and the first vertical link member 221*a* may be directly connected, and an intermediate configuration may exist between the first wheel 271*a* and the first vertical link member 221*a*.

A first shock absorbing device may be hingedly connected between the first vertical link member 221*a* and the first support member 202*a* to absorb vibration or shock transmitted from the ground.

The lower end of the second vertical link member 221*b* may be hinged to the right end of the second horizontal link member 211*b*. A through-hole may be formed at the right end of the second horizontal link member 211*b*, and a through-hole may also be formed at the lower end of the second vertical link member 221*b*, and the second horizontal link member 211*b* and the second vertical link member 221*b* may be hingedly connected by the hinge shaft 214*b* passing through the through-hole of the second horizontal link member 211*b* and the through-hole of the second vertical link member 221*b*. Accordingly, the second vertical link member 221*b* and the second horizontal link member 211*b* can rotate around the hinge shaft 214*b*.

A second wheel 271*b* may be connected to the second vertical link member 221*b*, and the second wheel 271*b* and the second vertical link member 221*b* may be directly connected, and an intermediate configuration may exist between the second wheel 271*b* and the second vertical link member 221*b*.

A second shock absorbing device may be hingedly connected between the second vertical link member 221*b* and the second support member 202*b* to absorb vibration or shock transmitted from the ground.

The rotation center axis support member 241 may be a member extending upward from the center of the lower center frame 201. A rotating member 250 may be rotatably connected to the upper end of the rotation center axis support member 241.

The first variable length link member 232*a* may be connected to the right end of the first variable length lever link member 231*a* to be slidable along the length direction of the first variable length lever link member 231*a*. An outer through-hole may be formed at the left end of the first variable length lever link member 231*a*, and an inner through-hole may be formed at the right end of the first variable length link member 232*a* slidably connected to the first variable length lever link member 231*a*, and a central through-hole may be formed between the outer through-hole and the inner through-hole. The distance between the outer through-hole and the center through-hole may be the same as the distance between the hinge shaft 204*a* and the hinge shaft 214*a*.

The first variable length lever link member 231*a* may be hinged to the upper end of the first vertical link member 221*a* and the upper end of the first support member 202*a*. Through-holes may be formed at the upper end of the first vertical link member 221*a* and the upper end of the first support member 202*a*, respectively. the first variable length lever link member 231*a* and the first vertical link member 221*a* may be hingedly connected by the hinge shaft 224*a* passing through the outer through-hole of the first variable length lever link member 231*a* and the through-hole formed at the upper end of the first vertical link member 221*a*. In addition, the first variable length lever link member 231*a* and the first support member 202*a* may be hingedly connected by the hinge shaft 234*a* passing through the central through-hole of the first variable length lever link member 231*a* and the through-hole formed at an upper end of the first support member 202*a*. Accordingly, the first variable length lever link member 231*a* and the first vertical link member 221*a* can be rotated around the hinge shaft 224*a*, and the first variable length lever link member 231*a* and the first support member 202*a* can be rotated around the hinge shaft 234*a*.

The second variable length link member 232*b* may be connected to the left end of the second variable length lever link member 231*b* to be slidable along the length direction of the second variable length lever link member 231*b*. An outer through-hole may be formed at the right end of the second variable length lever link member 231*b*, and an inner through-hole may be formed at the left end of the second variable length link member 232*b* slidably connected to the second variable length lever link member 231*b*, and a central through-hole may be formed between the outer through-hole and the inner through-hole. The distance between the outer through-hole and the center through-hole may be the same as the distance between the hinge shaft 204*b* and the hinge shaft 214*b*.

The second variable length lever link member 231*b* may be hinged to the upper end of the second vertical link member 221*b* and the upper end of the second support member 202*b*. Through-holes may be formed at the upper end of the second vertical link member 221*b* and the upper end of the second support member 202*b*, respectively. the second variable length lever link member 231*b* and the second vertical link member 221*b* may be hingedly connected by the hinge shaft 224*b* passing through the outer through-hole of the second variable length lever link member 231*b* and the through-hole formed at the upper end of the second vertical link member 221*b*. In addition, the second variable length lever link member 231*b* and the second support member 202*b* may be hingedly connected by the hinge shaft 234*b* passing through the central through-hole of the second variable length lever link member 231*b* and the through-hole formed at an upper end of the second support member 202*b*. Accordingly, the second variable length lever link member 231*b* and the second vertical link member 221*b* can be rotated around the hinge shaft 224*b*, and the second variable length lever link member 231*b* and the second support member 202*b* can be rotated around the hinge shaft 234*b*.

The rotating member 250 may be connected to be rotatable about the rotation center axis 242 of the rotation center axis support member 241. The rotation center axis 242 may be fixedly coupled to the rotation center axis support member 241 and the rotating member 250 may be rotatably connected to the rotation center axis 242, and alternatively, the rotation center axis 242 may be fixedly coupled to the central portion of the rotating member 250 to rotate together with the rotating member 250.

The rotating member 250 may include a first extension member 251a extending to the left and a second extension member 251b extending to the right. The first extension member 251a may be hinged to the end of the first variable length link member 232a, and the second extension member 251b may be hinged to the end of the second variable length link member 232b. In addition, the rotating member 250 may include a third extension member 253 extending downward, and the third extension member 253 may have a curved surface having a predetermined curvature in its longitudinal section 254, on which teeth 255 may be formed.

A through-hole may be formed at the end of the first extension member 251a, and the first variable length link member 232a and the first extension member 251a may be hingedly connected by the hinge shaft 254a passing through the inner through-hole of the first variable length link member 232a and the through-hole formed at the end of the first extension member 251a. Accordingly, the first variable length link member 232a and the first extension member 251a can be rotated around the hinge shaft 254a.

A through-hole may be formed at the end of the second extension member 251b, and the second variable length link member 232b and the second extension member 251b may be hingedly connected by the hinge shaft 254b passing through the inner through-hole of the second variable length link member 232b and the through-hole formed at the end of the second extension member 251b. Accordingly, the second variable length link member 232b and the second extension member 251b can be rotated around the hinge shaft 254b.

The rotating shaft driving device 261 may be installed on the lower center frame 201 and is a device that rotates the rotating member 250 rotatably coupled to the rotation center axis 242. The rotating shaft driving device 261 may include a worm gear 262, a worm gear support member 269 and a lower drive motor 263.

The worm gear 262 may be rotatably connected to the worm gear support member 269 located on the horizontal member 206 and may be engaged with the teeth 255 of the third extension member 253. The lower drive motor 263 may rotate the worm gear 262. When the lower drive motor 263 rotates the worm gear 262, the rotating member 250 connected to the third extension member 253 engaged with the worm gear 262 rotates around the rotation center axis 242.

When the tilting car is turning, the rotating shaft driving device 261 may rotate the rotating member 250 so that the longitudinal section 254 of the third extension member 253 of the rotating member 250 faces the outside of the turning radius.

For example, in case of rotating the rotating member 250 counterclockwise, the first variable length link member 232a is pulled in the lower right direction, whereby the first variable length lever link member 231a is also inclined so that its right end faces downward to the right, and then the first variable length link member 232a slides out from the first variable length lever link member 231a. In addition, the second variable length link member 232b is pulled in the upper left direction, whereby the second variable length lever link member 231b is also inclined so that its left end faces upward to the left, and then the second variable length link member 232b slides out from the second variable length lever link member 231b.

The first variable length lever link member 231a performs a lever motion around the hinge shaft 234a to which the first variable length lever link member 231a and the first support member 202a are connected, and the second variable length lever link member 231b performs a lever motion around the hinge shaft 234b to which the second variable length lever link member 231b and the second support member 202b are connected.

By such a lever motion, the first vertical link member 221a rises, and the second vertical link member 221b descends. Since the first wheel 271a connected to the first vertical link member 221a and the second wheel 271b connected to the second vertical link member 221b remain in contact with the ground, eventually the first end 203a of the lower center frame (201) is inclined downward, and the second end 203b of the lower center frame 201 is raised upward, and the vehicle body is inclined toward the center of the turning radius.

In particular, as the first variable length link member 232a slides out from the first variable length lever link member 231a, the distance between the hinge shaft 254a of the inner through-hole and the hinge shaft 234a of the central through-hole increases than the distance between the hinge shaft 224a of the outer through-hole and the hinge shaft 234a of the central through-hole, thereby obtaining the effect of increasing the length from the fulcrum of the lever to the force point of the lever and raising the first vertical link member 221a with a small force. Likewise, as the second variable length link member 232b slides out from the second variable length lever link member 231b, the distance between the hinge shaft 254b of the inner through-hole and the hinge shaft 234b of the central through-hole increases than the distance between the hinge shaft 224b of the outer through-hole and the hinge shaft 234b of the central through-hole, thereby obtaining the effect of increasing the length from the fulcrum of the lever to the force point of the lever and lowering the second vertical link member 221b with a small force.

In addition, the third extension member 253 is extended to the lower side of the rotating member 250 and the third extension member 253 is moved to rotate the rotating member 250, whereby a leverage effect is generated where the rotation center axis 242 becomes the fulcrum of the lever. Accordingly, it is possible to control the rotation of the rotating member 250 with a small force.

Figure 12:
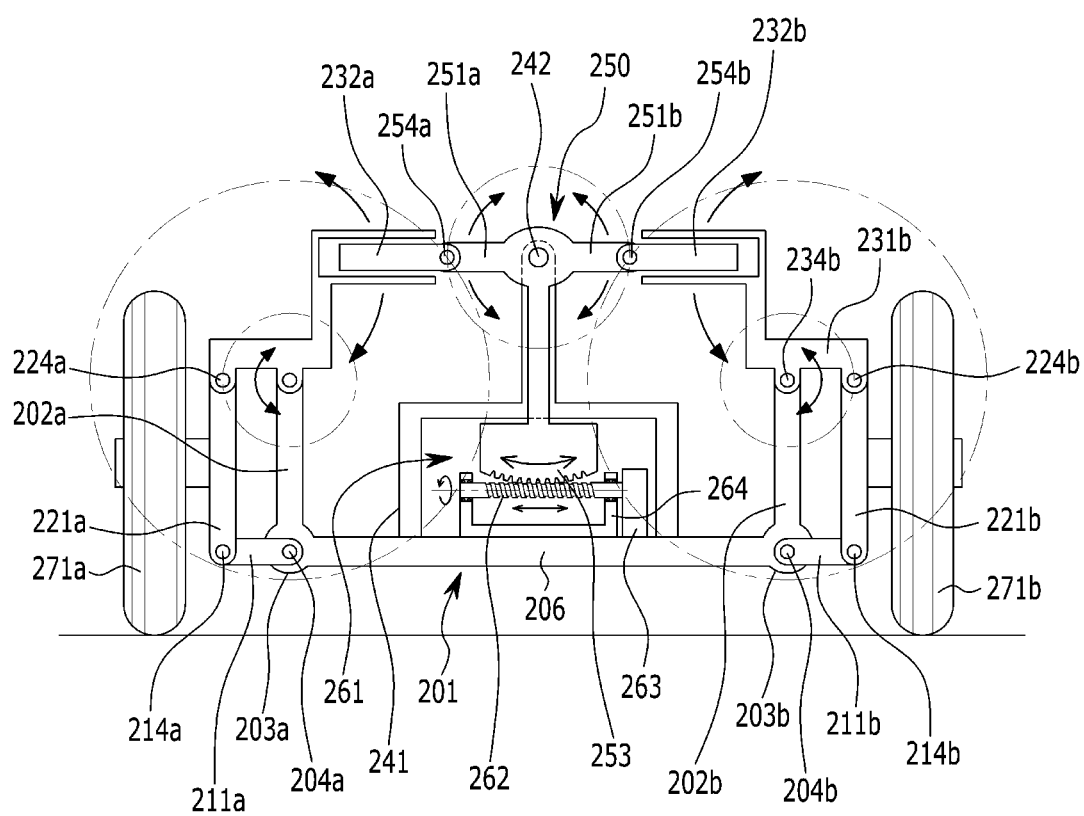
FIG. 12 shows a configuration in which a bent variable length lever link member is used in the tilting car frame according to the fifth embodiment of the technology disclosed in the present specification.

FIG. 12 shows a configuration in which a bent variable length lever link member is used in the tilting car frame according to the fifth embodiment of the technology disclosed in the present specification.

The first variable length lever link member 231a may be formed to be bent at a predetermined angle between the hinge shaft 254a of the inner through-hole and the hinge shaft 234a of the central through-hole. The second variable length lever link member 231b may be formed to be bent at a predetermined angle between the hinge shaft 254b of the inner through-hole and the hinge shaft 234b of the central through-hole. In FIG. 12, a configuration in which the first variable length lever link member 231a and the second variable length lever link member 231b are bent twice at an angle of 90 degrees is shown. With this configuration, even in a vehicle having a narrow width, it is possible to increase the distance between the hinge shaft 254a of the inner through-hole of the first variable length lever link member 231a and the hinge shaft 234a of the central through-hole and the distance between the hinge shaft 254b of the inner through-hole of the second variable length lever link member 231b and the hinge shaft 234b of the central through-hole, whereby greater lever force can be used around the hinge shaft 234*a* of the central through-hole of the first variable length lever link member 231*a* and the hinge shaft 234*b* of the central through-hole of the second variable length lever link member 231*b*, which are lever fulcrum.

In addition, since the first variable length lever link member 231*a* and the second variable length lever link member 231*b* are bent and extend upward, the height of the rotation center axis 242 is increased, whereby as the length of the third extension member 253 becomes longer, the leverage effect of the third extension member 253 using the rotation center axis 242 as a fulcrum of the lever becomes larger.

Figure 13:
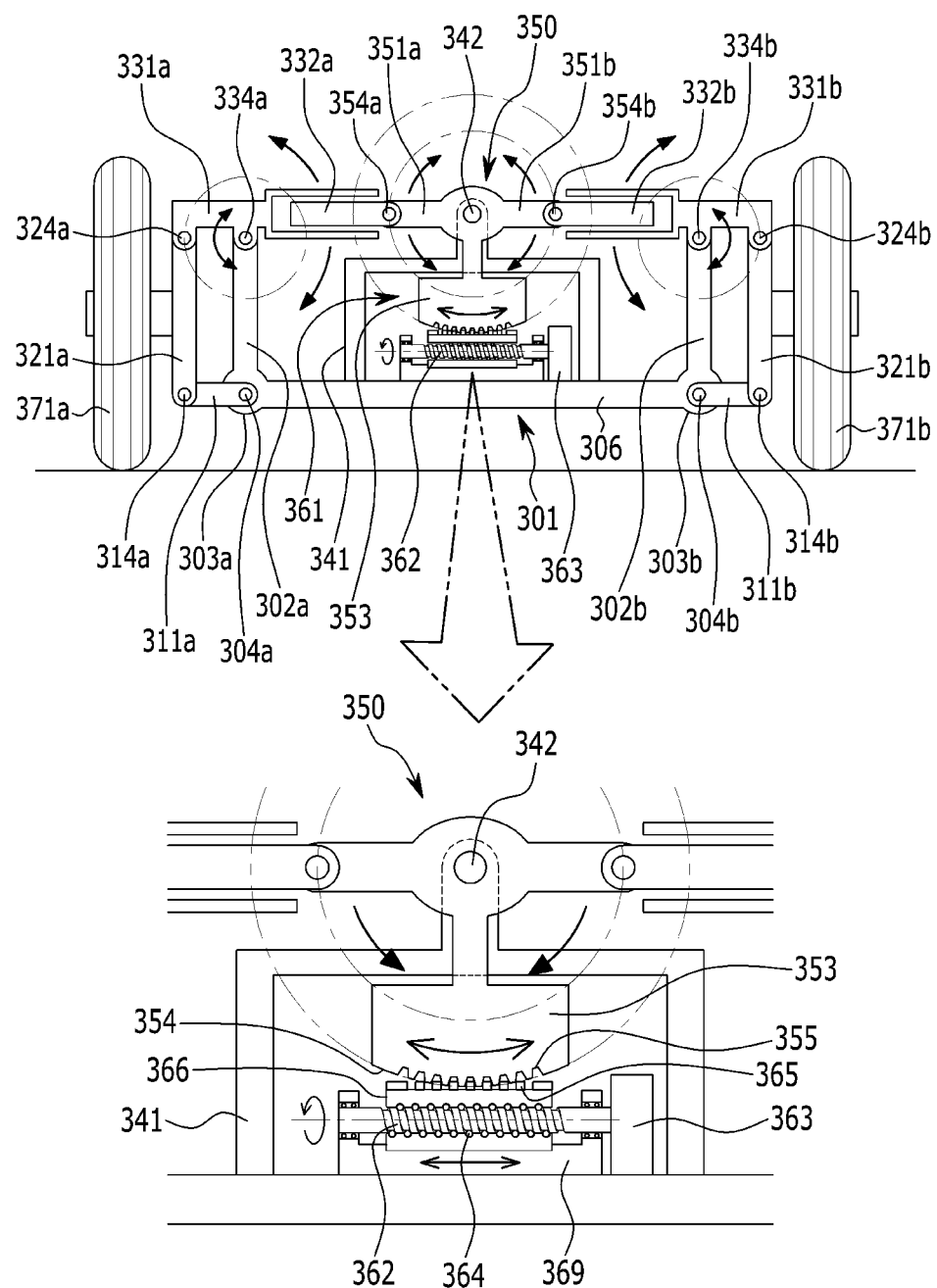
FIG. 13 is a schematic diagram of a tilting car frame according to a sixth embodiment of the technology disclosed in the present specification.

FIG. 13 is a schematic diagram of a tilting car frame according to a sixth embodiment of the technology disclosed in the present specification.

The tilting car frame according to the sixth embodiment may include a lower center frame 301, a first horizontal link member 311*a*, a second horizontal link member 311*b*, a first vertical link member 321*a*, a second vertical link member 321*b*, a first variable length lever link member 331*a*, a second variable length lever link member 331*b*, a rotation center axis support member 341, a rotating member 350 and a rotating shaft driving device 361.

The lower center frame 301 may include a first end 303*a* located on the left and a second end 303*b* located on the right with reference to FIG. 13, and may include a horizontal member 306 that is elongated in the left and right direction. A first support member 302*a* extending upward from the first end 303*a* may be formed at the first end 303*a*, and a second support member 302*b* extending upward from the second end 303*b* may be formed at the second end 303*b*.

The right end of the first horizontal link member 311*a* may be hinged to the first end 303*a*. A through-hole may be formed at the first end 303*a*, and a through-hole may also be formed at the right end of the first horizontal link member 311*a*, and the first end 303*a* and the first horizontal link member 311*a* may be hingedly connected by a hinge shaft 304*a* passing through the through-hole of the first end 303*a* and the through-hole of the first horizontal link member 311*a*. Accordingly, the first horizontal link member 311*a* and the lower center frame 301 can be rotated about the hinge shaft 304*a*.

The left end of the second horizontal link member 311*b* may be hinged to the second end 303*b*. A through-hole may be formed at the second end 303*b*, and a through-hole may also be formed at the left end of the second horizontal link member 311*b*, and the second end 303*b* and the second horizontal link member 311*b* may be hingedly connected by a hinge shaft 304*b* passing through the through-hole of the second end 303*b* and the through-hole of the second horizontal link member 311*b*. Accordingly, the second horizontal link member 311*b* and the lower center frame 301 can be rotated about the hinge shaft 304*b*.

The lower end of the first vertical link member 321*a* may be hinged to the left end of the first horizontal link member 311*a*. A through-hole may be formed at the left end of the first horizontal link member 311*a*, and a through-hole may also be formed at the lower end of the first vertical link member 321*a*, and the first horizontal link member 311*a* and the first vertical link member 321*a* may be hingedly connected by the hinge shaft 314*a* passing through the through-hole of the first horizontal link member 311*a* and the through-hole of the first vertical link member 321*a*. Accordingly, the first vertical link member 321*a* and the first horizontal link member 311*a* can rotate around the hinge shaft 314*a*.

A first wheel 371*a* may be connected to the first vertical link member 321*a*, and the first wheel 371*a* and the first vertical link member 321*a* may be directly connected, and an intermediate configuration may exist between the first wheel 371*a* and the first vertical link member 321*a*.

A first shock absorbing device may be hingedly connected between the first vertical link member 321*a* and the first support member 302*a* to absorb vibration or shock transmitted from the ground.

The lower end of the second vertical link member 321*b* may be hinged to the right end of the second horizontal link member 311*b*. A through-hole may be formed at the right end of the second horizontal link member 311*b*, and a through-hole may also be formed at the lower end of the second vertical link member 321*b*, and the second horizontal link member 311*b* and the second vertical link member 321*b* may be hingedly connected by the hinge shaft 314*b* passing through the through-hole of the second horizontal link member 311*b* and the through-hole of the second vertical link member 321*b*. Accordingly, the second vertical link member 321*b* and the second horizontal link member 311*b* can rotate around the hinge shaft 314*b*.

A second wheel 371*b* may be connected to the second vertical link member 321*b*, and the second wheel 371*b* and the second vertical link member 321*b* may be directly connected, and an intermediate configuration may exist between the second wheel 371*b* and the second vertical link member 321*b*.

A second shock absorbing device may be hingedly connected between the second vertical link member 321*b* and the second support member 302*b* to absorb vibration or shock transmitted from the ground.

The rotation center axis support member 341 may be a member extending upward from the center of the lower center frame 301. A rotating member 350 may be rotatably connected to the upper end of the rotation center axis support member 341.

The first variable length link member 332*a* may be connected to the right end of the first variable length lever link member 331*a* to be slidable along the length direction of the first variable length lever link member 331*a*. An outer through-hole may be formed at the left end of the first variable length lever link member 331*a*, and an inner through-hole may be formed at the right end of the first variable length link member 332*a* slidably connected to the first variable length lever link member 331*a*, and a central through-hole may be formed between the outer through-hole and the inner through-hole. The distance between the outer through-hole and the center through-hole may be the same as the distance between the hinge shaft 304*a* and the hinge shaft 314*a*.

The first variable length lever link member 331*a* may be hinged to the upper end of the first vertical link member 321*a* and the upper end of the first support member 302*a*. Through-holes may be formed at the upper end of the first vertical link member 321*a* and the upper end of the first support member 302*a*, respectively. the first variable length lever link member 331*a* and the first vertical link member 321*a* may be hingedly connected by the hinge shaft 324*a* passing through the outer through-hole of the first variable length lever link member 331*a* and the through-hole formed at the upper end of the first vertical link member 321*a*. In addition, the first variable length lever link member 331*a* and the first support member 302*a* may be hingedly connected by the hinge shaft 334*a* passing through the central through-hole of the first variable length lever link member 331*a* and the through-hole formed at an upper end of the first support member 302a. Accordingly, the first variable length lever link member 331a and the first vertical link member 321a can be rotated around the hinge shaft 324a, and the first variable length lever link member 331a and the first support member 302a can be rotated around the hinge shaft 334a.

The second variable length link member 332b may be connected to the left end of the second variable length lever link member 331b to be slidable along the length direction of the second variable length lever link member 331b. An outer through-hole may be formed at the right end of the second variable length lever link member 331b, and an inner through-hole may be formed at the left end of the second variable length link member 332b slidably connected to the second variable length lever link member 331b, and a central through-hole may be formed between the outer through-hole and the inner through-hole. The distance between the outer through-hole and the center through-hole may be the same as the distance between the hinge shaft 304b and the hinge shaft 314b.

The second variable length lever link member 331b may be hinged to the upper end of the second vertical link member 321b and the upper end of the second support member 302b. Through-holes may be formed at the upper end of the second vertical link member 321b and the upper end of the second support member 302b, respectively. the second variable length lever link member 331b and the second vertical link member 321b may be hingedly connected by the hinge shaft 324b passing through the outer through-hole of the second variable length lever link member 331b and the through-hole formed at the upper end of the second vertical link member 321b. In addition, the second variable length lever link member 331b and the second support member 302b may be hingedly connected by the hinge shaft 334b passing through the central through-hole of the second variable length lever link member 331b and the through-hole formed at an upper end of the second support member 302b. Accordingly, the second variable length lever link member 331b and the second vertical link member 321b can be rotated around the hinge shaft 324b, and the second variable length lever link member 331b and the second support member 302b can be rotated around the hinge shaft 334b.

The rotating member 350 may be connected to be rotatable about the rotation center axis 342 of the rotation center axis support member 341. The rotation center axis 342 may be fixedly coupled to the rotation center axis support member 341 and the rotating member 350 may be rotatably connected to the rotation center axis 342, and alternatively, the rotation center axis 342 may be fixedly coupled to the central portion of the rotating member 350 to rotate together with the rotating member 350.

The rotating member 350 may include a first extension member 351a extending to the left and a second extension member 351b extending to the right. The first extension member 351a may be hinged to the end of the first variable length link member 332a, and the second extension member 351b may be hinged to the end of the second variable length link member 332b. In addition, the rotating member 350 may include a third extension member 353 extending downward, and the third extension member 353 may have a curved surface having a predetermined curvature in its longitudinal section 354, on which teeth 355 may be formed.

A through-hole may be formed at the end of the first extension member 351a, and the first variable length link member 332a and the first extension member 351a may be hingedly connected by the hinge shaft 354a passing through the inner through-hole of the first variable length link member 332a and the through-hole formed at the end of the first extension member 351a. Accordingly, the first variable length link member 332a and the first extension member 351a can be rotated around the hinge shaft 354a.

A through-hole may be formed at the end of the second extension member 351b, and the second variable length link member 332b and the second extension member 351b may be hingedly connected by the hinge shaft 354b passing through the inner through-hole of the second variable length link member 332b and the through-hole formed at the end of the second extension member 351b. Accordingly, the second variable length link member 332b and the second extension member 351b can be rotated around the hinge shaft 354b.

The rotating shaft driving device 361 may be installed on the lower center frame 301 and is a device that rotates the rotating member 350 rotatably coupled to the rotation center axis 342. The rotating shaft driving device 361 may include a worm gear 362, a worm gear support member 369, a ball screw nut 366 and a lower drive motor 363.

The worm gear 362 is rotatably connected to the worm gear support member 369 located on the horizontal member 306. The ball screw nut 366 surrounds the worm gear 362 along the axial direction, and the balls 364 are rotatably positioned on the inner circumferential surface. The balls 364 are located between the teeth of the worm gear 362 so that the ball screw nut 366 moves linearly along the axial direction of the worm gear 362 according to the rotation of the worm gear 362. Teeth 365 are formed on the upper surface of the ball screw nut 366, and the teeth 365 are engaged with the teeth 355 of the third extension member 353. When the lower drive motor 363 rotates the worm gear 362, the ball screw nut 366 moves linearly by the rotation of the worm gear 362, and the third extension member 353 engaged with the ball screw nut 366 rotates, and the rotating member 350 connected to the third extension member 353 rotates around the rotation center axis 342.

When the tilting car is turning, the rotating shaft driving device 361 may rotate the rotating member 350 so that the longitudinal section 354 of the third extension member 353 of the rotating member 350 faces the outside of the turning radius.

For example, in case of rotating the rotating member 350 counterclockwise, the first variable length link member 332a is pulled in the lower right direction, whereby the first variable length lever link member 331a is also inclined so that its right end faces downward to the right, and then the first variable length link member 332a slides out from the first variable length lever link member 331a. In addition, the second variable length link member 332b is pulled in the upper left direction, whereby the second variable length lever link member 331b is also inclined so that its left end faces upward to the left, and then the second variable length link member 332b slides out from the second variable length lever link member 331b.

The first variable length lever link member 331a performs a lever motion around the hinge shaft 334a to which the first variable length lever link member 331a and the first support member 302a are connected, and the second variable length lever link member 331b performs a lever motion around the hinge shaft 334b to which the second variable length lever link member 331b and the second support member 302b are connected.

By such a lever motion, the first vertical link member 321a rises, and the second vertical link member 321b descends. Since the first wheel 371a connected to the first vertical link member 321a and the second wheel 371b connected to the second vertical link member 321b remain in contact with the ground, eventually the first end 303a of the lower center frame 301 is inclined downward, and the second end 303b of the lower center frame 301 is raised upward, and the vehicle body is inclined toward the center of the turning radius.

In particular, as the first variable length link member 332a slides out from the first variable length lever link member 331a, the distance between the hinge shaft 354a of the inner through-hole and the hinge shaft 334a of the central through-hole increases than the distance between the hinge shaft 324a of the outer through-hole and the hinge shaft 334a of the central through-hole, thereby obtaining the effect of increasing the length from the fulcrum of the lever to the force point of the lever and raising the first vertical link member 321a with a small force. Likewise, as the second variable length link member 332b slides out from the second variable length lever link member 331b, the distance between the hinge shaft 354b of the inner through-hole and the hinge shaft 334b of the central through-hole increases than the distance between the hinge shaft 324b of the outer through-hole and the hinge shaft 334b of the central through-hole, thereby obtaining the effect of increasing the length from the fulcrum of the lever to the force point of the lever and lowering the second vertical link member 321b with a small force.

In addition, the third extension member 353 is extended to the lower side of the rotating member 350 and the third extension member 353 is moved to rotate the rotating member 350, whereby a leverage effect is generated where the rotation center axis 342 becomes the fulcrum of the lever. Accordingly, it is possible to control the rotation of the rotating member 350 with a small force.

Figure 14:
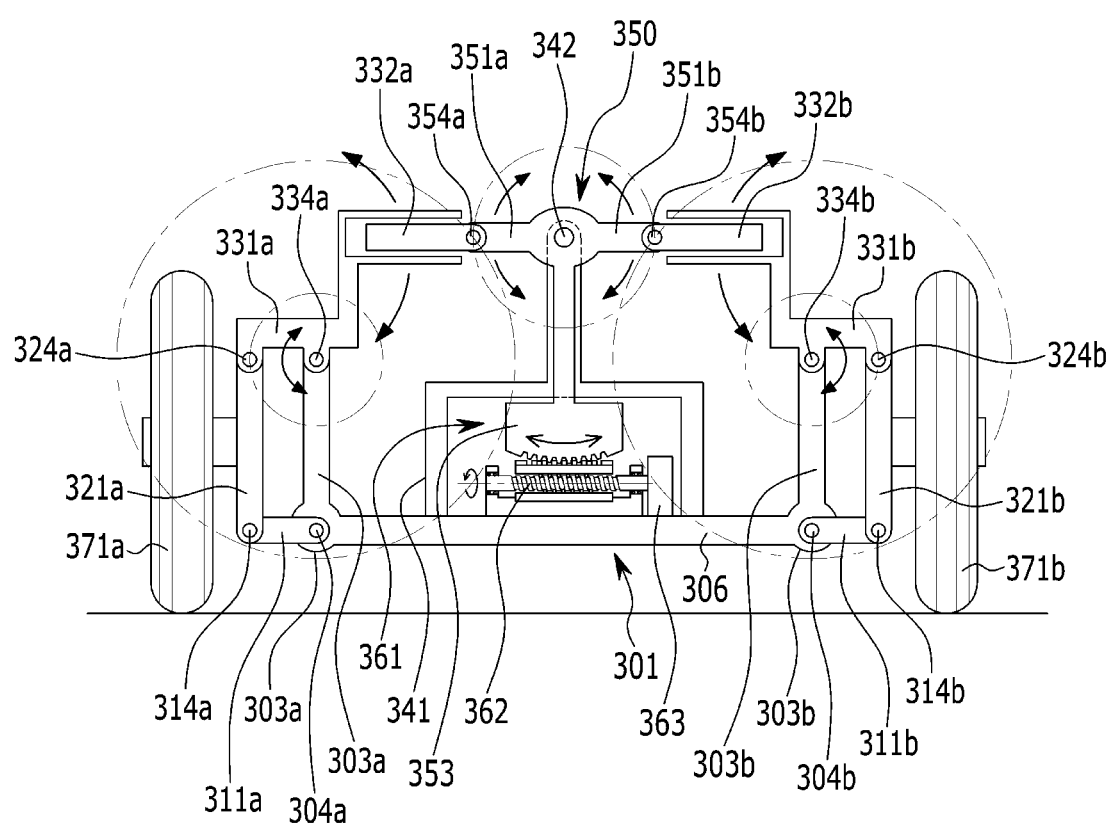
FIG. 14 shows a configuration in which a bent variable length lever link member is used in the tilting car frame according to the sixth embodiment of the technology disclosed in the present specification.

FIG. 14 shows a configuration in which a bent variable length lever link member is used in the tilting car frame according to the sixth embodiment of the technology disclosed in the present specification.

The first variable length lever link member 331a may be formed to be bent at a predetermined angle between the hinge shaft 354a of the inner through-hole and the hinge shaft 334a of the central through-hole. The second variable length lever link member 331b may be formed to be bent at a predetermined angle between the hinge shaft 354b of the inner through-hole and the hinge shaft 334b of the central through-hole. In FIG. 14, a configuration in which the first variable length lever link member 331a and the second variable length lever link member 331b are bent twice at an angle of 90 degrees is shown. With this configuration, even in a vehicle having a narrow width, it is possible to increase the distance between the hinge shaft 354a of the inner through-hole of the first variable length lever link member 331a and the hinge shaft 334a of the central through-hole and the distance between the hinge shaft 354b of the inner through-hole of the second variable length lever link member 331b and the hinge shaft 334b of the central through-hole, whereby greater lever force can be used around the hinge shaft 334a of the central through-hole of the first variable length lever link member 331a and the hinge shaft 334b of the central through-hole of the second variable length lever link member 331b, which are lever fulcrum.

In addition, since the first variable length lever link member 331a and the second variable length lever link member 331b are bent and extend upward, the height of the rotation center axis 342 is increased, whereby as the length of the third extension member 353 becomes longer, the leverage effect of the third extension member 353 using the rotation center axis 342 as a fulcrum of the lever becomes larger.

Figure 15:
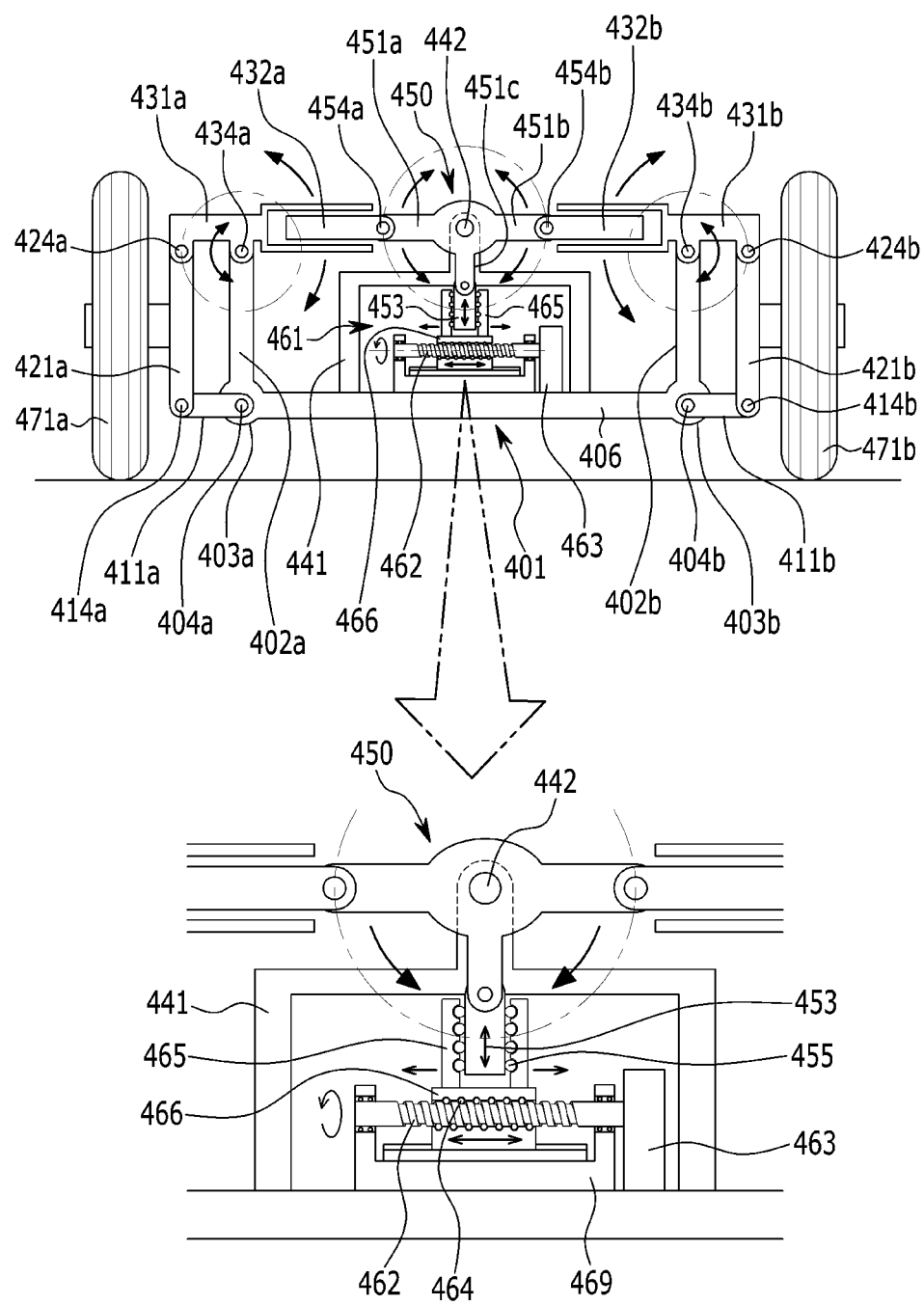
FIG. 15 is a schematic diagram of a tilting car frame according to a seventh embodiment of the technology disclosed in the present specification.

FIG. 15 is a schematic diagram of a tilting car frame according to a seventh embodiment of the technology disclosed in the present specification.

A tilting car frame according to the seventh embodiment may include a lower center frame 401, a first horizontal link member 411a, a second horizontal link member 411b, a first vertical link member 421a, a second vertical link member 421b, a first variable length lever link member 431a, a second variable length lever link member 431b, a rotation center axis support member 441, a rotating member 450 and a rotating shaft driving device 461.

The lower center frame 401 may include a first end 403a located on the left and a second end 403b located on the right with reference to FIG. 15, and may include a horizontal member 406 that is elongated in the left and right direction. A first support member 402a extending upward from the first end 403a may be formed at the first end 403a, and a second support member 402b extending upward from the second end 403b may be formed at the second end 403b.

The right end of the first horizontal link member 411a may be hinged to the first end 403a. A through-hole may be formed at the first end 403a, and a through-hole may also be formed at the right end of the first horizontal link member 411a, and the first end 403a and the first horizontal link member 411a may be hingedly connected by a hinge shaft 404a passing through the through-hole of the first end 403a and the through-hole of the first horizontal link member 411a. Accordingly, the first horizontal link member 411a and the lower center frame 401 can be rotated about the hinge shaft 404a.

The left end of the second horizontal link member 411b may be hinged to the second end 403b. A through-hole may be formed at the second end 403b, and a through-hole may also be formed at the left end of the second horizontal link member 411b, and the second end 403b and the second horizontal link member 411b may be hingedly connected by a hinge shaft 404b passing through the through-hole of the second end 403b and the through-hole of the second horizontal link member 411b. Accordingly, the second horizontal link member 411b and the lower center frame 401 can be rotated about the hinge shaft 404b.

The lower end of the first vertical link member 421a may be hinged to the left end of the first horizontal link member 411a. A through-hole may be formed at the left end of the first horizontal link member 411a, and a through-hole may also be formed at the lower end of the first vertical link member 421a, and the first horizontal link member 411a and the first vertical link member 421a may be hingedly connected by the hinge shaft 414a passing through the through-hole of the first horizontal link member 411a and the through-hole of the first vertical link member 421a. Accordingly, the first vertical link member 421a and the first horizontal link member 411a can rotate around the hinge shaft 414a.

A first wheel 471a may be connected to the first vertical link member 421a, and the first wheel 471a and the first vertical link member 421a may be directly connected, and an intermediate configuration may exist between the first wheel 471a and the first vertical link member 421a.

A first shock absorbing device may be hingedly connected between the first vertical link member 421a and the first support member 402a to absorb vibration or shock transmitted from the ground.

The lower end of the second vertical link member 421b may be hinged to the right end of the second horizontal link member 411b. A through-hole may be formed at the right end of the second horizontal link member 411b, and a through-hole may also be formed at the lower end of the second vertical link member 421b, and the second horizontal link member 411b and the second vertical link member 421b may be hingedly connected by the hinge shaft 414b passing through the through-hole of the second horizontal link member 411b and the through-hole of the second vertical link member 421b. Accordingly, the second vertical link member 421b and the second horizontal link member 411b can rotate around the hinge shaft 414b.

A second wheel 471b may be connected to the second vertical link member 421b, and the second wheel 471b and the second vertical link member 421b may be directly connected, and an intermediate configuration may exist between the second wheel 371b and the second vertical link member 421b.

A second shock absorbing device may be hingedly connected between the second vertical link member 421b and the second support member 402b to absorb vibration or shock transmitted from the ground.

The rotation center axis support member 441 may be a member extending upward from the center of the lower center frame 401. A rotating member 450 may be rotatably connected to the upper end of the rotation center axis support member 441.

The first variable length link member 432a may be connected to the right end of the first variable length lever link member 431a to be slidable along the length direction of the first variable length lever link member 431a. An outer through-hole may be formed at the left end of the first variable length lever link member 431a, and an inner through-hole may be formed at the right end of the first variable length link member 432a slidably connected to the first variable length lever link member 431a, and a central through-hole may be formed between the outer through-hole and the inner through-hole. The distance between the outer through-hole and the center through-hole may be the same as the distance between the hinge shaft 404a and the hinge shaft 414a.

The first variable length lever link member 431a may be hinged to the upper end of the first vertical link member 421a and the upper end of the first support member 402a. Through-holes may be formed at the upper end of the first vertical link member 421a and the upper end of the first support member 402a, respectively. the first variable length lever link member 431a and the first vertical link member 421a may be hingedly connected by the hinge shaft 424a passing through the outer through-hole of the first variable length lever link member 431a and the through-hole formed at the upper end of the first vertical link member 421a. In addition, the first variable length lever link member 431a and the first support member 402a may be hingedly connected by the hinge shaft 434a passing through the central through-hole of the first variable length lever link member 431a and the through-hole formed at an upper end of the first support member 402a. Accordingly, the first variable length lever link member 431a and the first vertical link member 421a can be rotated around the hinge shaft 424a, and the first variable length lever link member 431a and the first support member 402a can be rotated around the hinge shaft 434a.

The second variable length link member 432b may be connected to the left end of the second variable length lever link member 431b to be slidable along the length direction of the second variable length lever link member 431b. An outer through-hole may be formed at the right end of the second variable length lever link member 431b, and an inner through-hole may be formed at the left end of the second variable length link member 432b slidably connected to the second variable length lever link member 431b, and a central through-hole may be formed between the outer through-hole and the inner through-hole. The distance between the outer through-hole and the center through-hole may be the same as the distance between the hinge shaft 404b and the hinge shaft 414b.

The second variable length lever link member 431b may be hinged to the upper end of the second vertical link member 421b and the upper end of the second support member 402b. Through-holes may be formed at the upper end of the second vertical link member 421b and the upper end of the second support member 402b, respectively. the second variable length lever link member 431b and the second vertical link member 421b may be hingedly connected by the hinge shaft 424b passing through the outer through-hole of the second variable length lever link member 431b and the through-hole formed at the upper end of the second vertical link member 421b. In addition, the second variable length lever link member 431b and the second support member 402b may be hingedly connected by the hinge shaft 434b passing through the central through-hole of the second variable length lever link member 431b and the through-hole formed at an upper end of the second support member 402b. Accordingly, the second variable length lever link member 431b and the second vertical link member 421b can be rotated around the hinge shaft 424b, and the second variable length lever link member 431b and the second support member 402b can be rotated around the hinge shaft 434b.

The rotating member 450 may be connected to be rotatable about the rotation center axis 442 of the rotation center axis support member 441. The rotation center axis 442 may be fixedly coupled to the rotation center axis support member 441 and the rotating member 450 may be rotatably connected to the rotation center axis 442, and alternatively, the rotation center axis 442 may be fixedly coupled to the central portion of the rotating member 450 to rotate together with the rotating member 450.

The rotating member 450 may include a first extension member 451a extending to the left and a second extension member 451b extending to the right. The first extension member 451a may be hinged to the end of the first variable length link member 432a, and the second extension member 451b may be hinged to the end of the second variable length link member 432b. In addition, the rotating member 450 may include a third extension member 451c extending downward, and a rotating member-auxiliary link member 453 may be hinged to an end of the third extension member 451c.

A through-hole may be formed at the end of the first extension member 451a, and the first variable length link member 432a and the first extension member 451a may be hingedly connected by the hinge shaft 454a passing through the inner through-hole of the first variable length link member 432a and the through-hole formed at the end of the first extension member 451a. Accordingly, the first variable length link member 432a and the first extension member 451a can be rotated around the hinge shaft 454a.

A through-hole may be formed at the end of the second extension member 451b, and the second variable length link member 432b and the second extension member 451b may be hingedly connected by the hinge shaft 454b passing through the inner through-hole of the second variable length link member 432b and the through-hole formed at the end of the second extension member 451b. Accordingly, the second variable length link member 432b and the second extension member 451b can be rotated around the hinge shaft 454b.

The rotating shaft driving device 461 may be installed on the lower center frame 401 and is a device that rotates the rotating member 450 rotatably coupled to the rotation center axis 442. The rotating shaft driving device 461 may include a worm gear 462, a worm gear support member 469, a ball screw nut 466, a rotating member-auxiliary link member insertion part 465 and a lower drive motor 463.

The worm gear 462 may be rotatably connected to the worm gear support member 469 located on the horizontal member 406. The ball screw nut 466 may surround the worm gear 462 along the axial direction, and the balls 464 may be rotatably positioned on the inner circumferential surface. The balls 464 may be located between the teeth of the worm gear 462 so that the ball screw nut 466 moves linearly along the axial direction of the worm gear 462 according to the rotation of the worm gear 462. A rotating member-auxiliary link member insertion part 465 may be formed on the upper surface of the ball screw nut 466, and the rotating member-auxiliary link member 453 may be inserted into the rotating member-auxiliary link member insertion part 465. Balls 455 may be positioned to be rotatable on the inner surface of the rotating member-auxiliary link member insertion part 465, whereby the rotating member-auxiliary link member 453 contacts the balls 455, and linear motion in the longitudinal direction of the rotating member-auxiliary link member insertion part 465 is possible without friction.

When the lower drive motor 463 rotates the worm gear 462, the ball screw nut 466 performs a linear motion by the rotation of the worm gear 462, whereby the rotating member-auxiliary link member insertion part 465 fixed to the ball screw nut 466 also performs a linear motion. According to the linear motion of the rotating member-auxiliary link member insertion part 465, the rotating member-auxiliary link member 453 may come out of the rotating member-auxiliary link member insertion part 465 or enter the rotating member-auxiliary link member insertion part 465, and by the left-right linear motion of the ball screw nut 466 and the up-down linear motion of the rotating member-auxiliary link member 453, the rotating member 450 hinged to the rotating member-auxiliary link member 453 can rotate around the rotation center axis 442.

When the tilting car is turning, the rotating shaft driving device 461 may rotate the rotating member 450 so that an end of the third extension member 451c of the rotating member 450, which is connected to the rotating member-auxiliary link member 453, faces the outside of the turning radius.

For example, in case of rotating the rotating member 450 counterclockwise, the first variable length link member 432a is pulled in the lower right direction, whereby the first variable length lever link member 431a is also inclined so that its right end faces downward to the right, and then the first variable length link member 432a slides out from the first variable length lever link member 431a. In addition, the second variable length link member 432b is pulled in the upper left direction, whereby the second variable length lever link member 431b is also inclined so that its left end faces upward to the left, and then the second variable length link member 432b slides out from the second variable length lever link member 431b.

The first variable length lever link member 431a performs a lever motion around the hinge shaft 434a to which the first variable length lever link member 431a and the first support member 402a are connected, and the second variable length lever link member 431b performs a lever motion around the hinge shaft 434b to which the second variable length lever link member 431b and the second support member 402b are connected.

By such a lever motion, the first vertical link member 421a rises, and the second vertical link member 421b descends. Since the first wheel 471a connected to the first vertical link member 421a and the second wheel 471b connected to the second vertical link member 421b remain in contact with the ground, eventually the first end 403a of the lower center frame 401 is inclined downward, and the second end 403b of the lower center frame 401 is raised upward, and the vehicle body is inclined toward the center of the turning radius.

In particular, as the first variable length link member 432a slides out from the first variable length lever link member 431a, the distance between the hinge shaft 454a of the inner through-hole and the hinge shaft 434a of the central through-hole increases than the distance between the hinge shaft 424a of the outer through-hole and the hinge shaft 434a of the central through-hole, thereby obtaining the effect of increasing the length from the fulcrum of the lever to the force point of the lever and raising the first vertical link member 421a with a small force. Likewise, as the second variable length link member 432b slides out from the second variable length lever link member 431b, the distance between the hinge shaft 454b of the inner through-hole and the hinge shaft 434b of the central through-hole increases than the distance between the hinge shaft 424b of the outer through-hole and the hinge shaft 434b of the central through-hole, thereby obtaining the effect of increasing the length from the fulcrum of the lever to the force point of the lever and lowering the second vertical link member 421b with a small force.

In addition, the third extension member 451c is extended to the lower side of the rotating member 450 and the third extension member 451c is moved to rotate the rotating member 450, whereby a leverage effect is generated where the rotation center axis 442 becomes the fulcrum of the lever. Accordingly, it is possible to control the rotation of the rotating member 450 with a small force.

Figure 16:
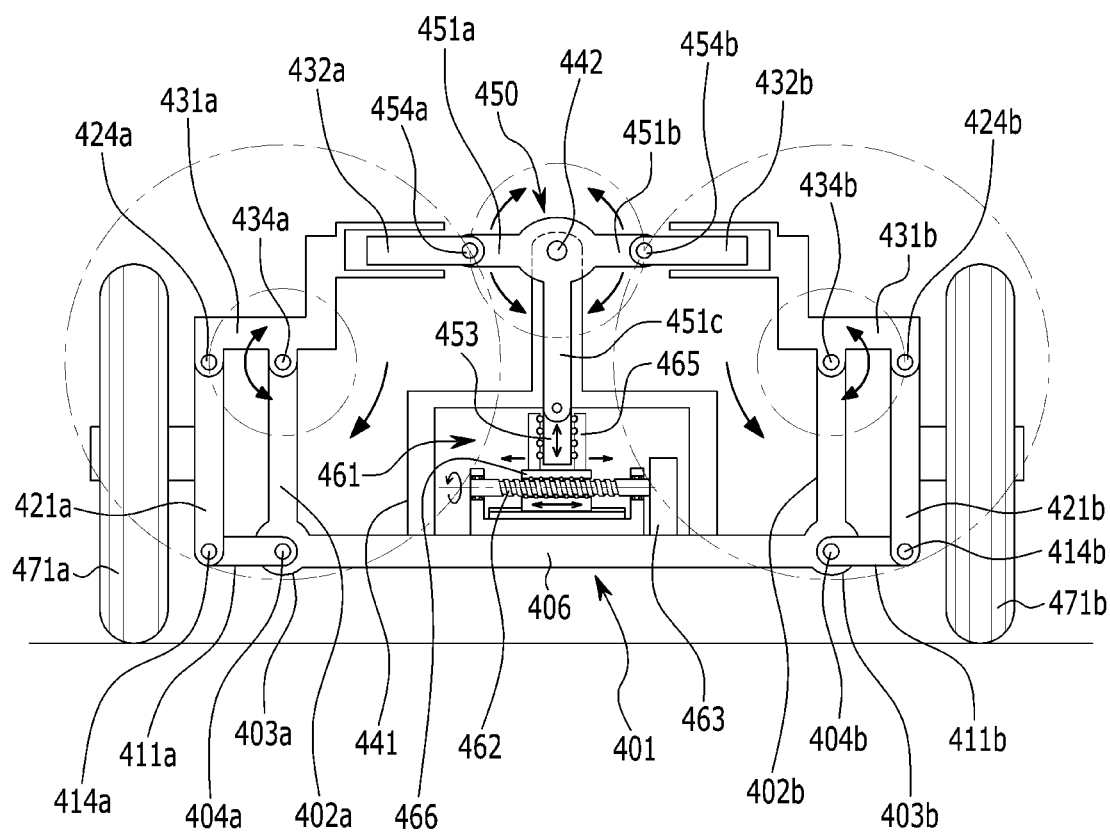
FIG. 16 shows a configuration in which a bent variable length lever link member is used in the tilting car frame according to the seventh embodiment of the technology disclosed in the present specification.

FIG. 16 shows a configuration in which a bent variable length lever link member is used in the tilting car frame according to the seventh embodiment of the technology disclosed in the present specification.

The first variable length lever link member 431a may be formed to be bent at a predetermined angle between the hinge shaft 454a of the inner through-hole and the hinge shaft 434a of the central through-hole. The second variable length lever link member 431b may be formed to be bent at a predetermined angle between the hinge shaft 454b of the inner through-hole and the hinge shaft 434b of the central through-hole. In FIG. 16, a configuration in which the first variable length lever link member 431a and the second variable length lever link member 431b are bent twice at an angle of 90 degrees is shown. With this configuration, even in a vehicle having a narrow width, it is possible to increase the distance between the hinge shaft 454a of the inner through-hole of the first variable length lever link member 431a and the hinge shaft 434a of the central through-hole and the distance between the hinge shaft 454b of the inner through-hole of the second variable length lever link member 431b and the hinge shaft 434b of the central through-hole, whereby greater lever force can be used around the hinge shaft 434a of the central through-hole of the first variable length lever link member 431a and the hinge shaft 434b of the central through-hole of the second variable length lever link member 431b, which are lever fulcrum.

In addition, since the first variable length lever link member 431a and the second variable length lever link member 431b are bent and extend upward, the height of the rotation center axis 442 is increased, whereby as the length of the third extension member 451c becomes longer, the leverage effect of the third extension member 451c using the rotation center axis 442 as a fulcrum of the lever becomes larger.

Figure 17:
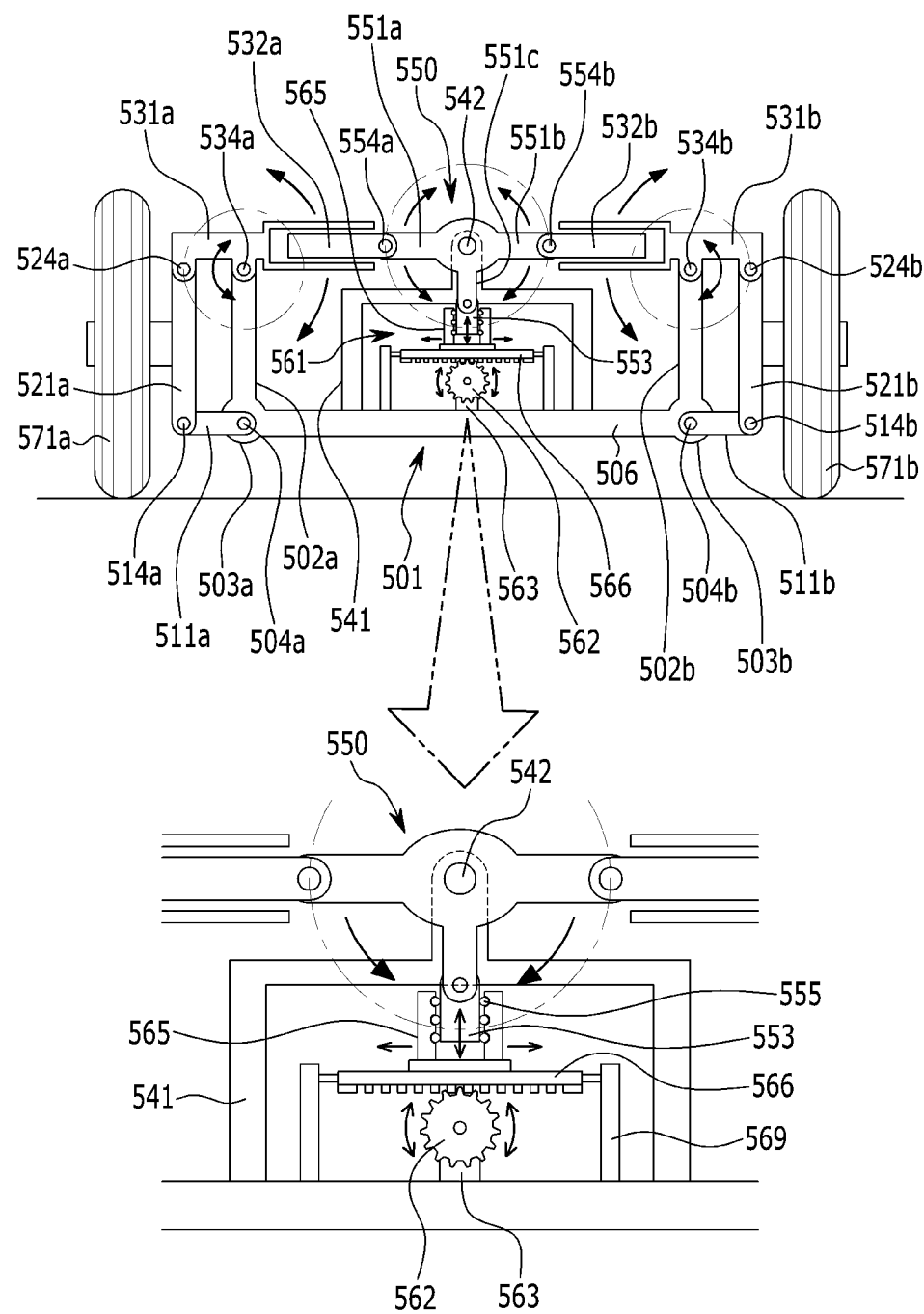
FIG. 17 is a schematic diagram of a tilting car frame according to an eighth embodiment of the technology disclosed in the present specification.

FIG. 17 is a schematic diagram of a tilting car frame according to an eighth embodiment of the technology disclosed in the present specification.

A tilting car frame according to the eighth embodiment may include a lower center frame 501, a first horizontal link member 511a, a second horizontal link member 511b, a first vertical link member 521a, a second vertical link member 521b, a first variable length lever link member 531a, a second variable length lever link member 531b, a rotation center axis support member 541, a rotating member 550 and a rotating shaft driving device 561.

The lower center frame 501 may include a first end 503a located on the left and a second end 503b located on the right with reference to FIG. 17, and may include a horizontal member 506 that is elongated in the left and right direction. A first support member 502a extending upward from the first end 503a may be formed at the first end 503a, and a second support member 502b extending upward from the second end 503b may be formed at the second end 503b.

The right end of the first horizontal link member 511a may be hinged to the first end 503a. A through-hole may be formed at the first end 503a, and a through-hole may also be formed at the right end of the first horizontal link member 511a, and the first end 503a and the first horizontal link member 511a may be hingedly connected by a hinge shaft 504a passing through the through-hole of the first end 503a and the through-hole of the first horizontal link member 511a. Accordingly, the first horizontal link member 511a and the lower center frame 501 can be rotated about the hinge shaft 504a.

The left end of the second horizontal link member 511b may be hinged to the second end 503b. A through-hole may be formed at the second end 503b, and a through-hole may also be formed at the left end of the second horizontal link member 511b, and the second end 503b and the second horizontal link member 511b may be hingedly connected by a hinge shaft 504b passing through the through-hole of the second end 503b and the through-hole of the second horizontal link member 511b. Accordingly, the second horizontal link member 511b and the lower center frame 501 can be rotated about the hinge shaft 504b.

The lower end of the first vertical link member 521a may be hinged to the left end of the first horizontal link member 511a. A through-hole may be formed at the left end of the first horizontal link member 511a, and a through-hole may also be formed at the lower end of the first vertical link member 521a, and the first horizontal link member 511a and the first vertical link member 521a may be hingedly connected by the hinge shaft 514a passing through the through-hole of the first horizontal link member 511a and the through-hole of the first vertical link member 521a. Accordingly, the first vertical link member 521a and the first horizontal link member 511a can rotate around the hinge shaft 514a.

A first wheel 571a may be connected to the first vertical link member 521a, and the first wheel 571a and the first vertical link member 521a may be directly connected, and an intermediate configuration may exist between the first wheel 571a and the first vertical link member 521a.

A first shock absorbing device may be hingedly connected between the first vertical link member 521a and the first support member 502a to absorb vibration or shock transmitted from the ground.

The lower end of the second vertical link member 521b may be hinged to the right end of the second horizontal link member 511b. A through-hole may be formed at the right end of the second horizontal link member 511b, and a through-hole may also be formed at the lower end of the second vertical link member 521b, and the second horizontal link member 511b and the second vertical link member 521b may be hingedly connected by the hinge shaft 514b passing through the through-hole of the second horizontal link member 511b and the through-hole of the second vertical link member 521b. Accordingly, the second vertical link member 521b and the second horizontal link member 511b can rotate around the hinge shaft 514b.

A second wheel 571b may be connected to the second vertical link member 521b, and the second wheel 571b and the second vertical link member 521b may be directly connected, and an intermediate configuration may exist between the second wheel 571b and the second vertical link member 521b.

A second shock absorbing device may be hingedly connected between the second vertical link member 521b and the second support member 502b to absorb vibration or shock transmitted from the ground.

The rotation center axis support member 541 may be a member extending upward from the center of the lower center frame 501. A rotating member 550 may be rotatably connected to the upper end of the rotation center axis support member 541.

The first variable length link member 532a may be connected to the right end of the first variable length lever link member 531a to be slidable along the length direction of the first variable length lever link member 531a. An outer through-hole may be formed at the left end of the first variable length lever link member 531a, and an inner through-hole may be formed at the right end of the first variable length link member 532a slidably connected to the first variable length lever link member 531a, and a central through-hole may be formed between the outer through-hole and the inner through-hole. The distance between the outer through-hole and the center through-hole may be the same as the distance between the hinge shaft 504a and the hinge shaft 514a.

The first variable length lever link member 531a may be hinged to the upper end of the first vertical link member 521a and the upper end of the first support member 502a. Through-holes may be formed at the upper end of the first vertical link member 521a and the upper end of the first support member 502a, respectively. the first variable length lever link member 531a and the first vertical link member 521a may be hingedly connected by the hinge shaft 524a passing through the outer through-hole of the first variable length lever link member 531a and the through-hole formed at the upper end of the first vertical link member 521a. In addition, the first variable length lever link member 531a and the first support member 502a may be hingedly connected by the hinge shaft 534a passing through the central through-hole of the first variable length lever link member 531a and the through-hole formed at an upper end of the first support member 502a. Accordingly, the first variable length lever link member 531a and the first vertical link member 521a can be rotated around the hinge shaft 524a, and the first variable length lever link member 531a and the first support member 502a can be rotated around the hinge shaft 534a.

The second variable length link member 532b may be connected to the left end of the second variable length lever link member 531b to be slidable along the length direction of the second variable length lever link member 531b. An outer through-hole may be formed at the right end of the second variable length lever link member 531b, and an inner through-hole may be formed at the left end of the second variable length link member 532b slidably connected to the second variable length lever link member 531b, and a central through-hole may be formed between the outer through-hole and the inner through-hole. The distance between the outer through-hole and the center through-hole may be the same as the distance between the hinge shaft 504b and the hinge shaft 514b.

The second variable length lever link member 531b may be hinged to the upper end of the second vertical link member 521b and the upper end of the second support member 502b. Through-holes may be formed at the upper end of the second vertical link member 521b and the upper end of the second support member 502b, respectively. the second variable length lever link member 531b and the second vertical link member 521b may be hingedly connected by the hinge shaft 524b passing through the outer through-hole of the second variable length lever link member 531b and the through-hole formed at the upper end of the second vertical link member 521b. In addition, the second variable length lever link member 531b and the second support member 502b may be hingedly connected by the hinge shaft 534b passing through the central through-hole of the second variable length lever link member 531b and the through-hole formed at an upper end of the second support member 502b. Accordingly, the second variable length lever link member 531b and the second vertical link member 521b can be rotated around the hinge shaft 524b, and the second variable length lever link member 531b and the second support member 502b can be rotated around the hinge shaft 534b.

The rotating member 550 may be connected to be rotatable about the rotation center axis 542 of the rotation center axis support member 541. The rotation center axis 542 may be fixedly coupled to the rotation center axis support member 541 and the rotating member 550 may be rotatably connected to the rotation center axis 542, and alternatively, the rotation center axis 542 may be fixedly coupled to the central portion of the rotating member 550 to rotate together with the rotating member 550.

The rotating member 550 may include a first extension member 551a extending to the left and a second extension member 551b extending to the right. The first extension member 551a may be hinged to the end of the first variable length link member 532a, and the second extension member 551b may be hinged to the end of the second variable length link member 532b. In addition, the rotating member 550 may include a third extension member 551c extending downward, and a rotating member-auxiliary link member 553 may be hinged to an end of the third extension member 551c.

A through-hole may be formed at the end of the first extension member 551a, and the first variable length link member 532a and the first extension member 551a may be hingedly connected by the hinge shaft 554a passing through the inner through-hole of the first variable length link member 532a and the through-hole formed at the end of the first extension member 551a. Accordingly, the first variable length link member 532a and the first extension member 551a can be rotated around the hinge shaft 554a.

A through-hole may be formed at the end of the second extension member 551b, and the second variable length link member 532b and the second extension member 551b may be hingedly connected by the hinge shaft 554b passing through the inner through-hole of the second variable length link member 532b and the through-hole formed at the end of the second extension member 551b. Accordingly, the second variable length link member 532b and the second extension member 551b can be rotated around the hinge shaft 554b.

The rotating shaft driving device 561 may be installed on the lower center frame 501 and is a device that rotates the rotating member 550 rotatably coupled to the rotation center axis 542. The rotating shaft driving device 561 may include a pinion gear 562, a pinion gear support member 569, a rack gear 566, a rotating member-auxiliary link member insertion part 565 and a lower drive motor 563.

The pinion gear 562 may be rotatably connected on the horizontal member 506, and the lower drive motor 563 may rotate the pinion gear 562. The rack gear 566 may be connected to the rack gear support member 569 so that the rack gear 566 can move linearly on the rack gear support member 569, and may be engaged with the pinion gear 562. A rotating member-auxiliary link member insertion part 565 may be formed on the upper surface of the pinion gear 562, and the rotating member-auxiliary link member 553 may be inserted into the rotating member-auxiliary link member insertion part 565. Balls 555 may be positioned to be rotatable on the inner surface of the rotating member-auxiliary link member insertion part 565, whereby the rotating member-auxiliary link member 553 may be in contact with the balls 555 and perform linear motion in the longitudinal direction of the rotating member-auxiliary link member insertion part 565 without friction.

When the lower drive motor 563 rotates the pinion gear 562, the rack gear 566 performs a linear motion by the rotation of the pinion gear 562, whereby the rotating member-auxiliary link member insertion part 565 fixed to the rack gear 566 also performs a linear motion. According to the linear motion of the rotating member-auxiliary link member insertion part 565, the rotating member-auxiliary link member 553 may come out of the rotating member-auxiliary link member insertion part 565 or enter the rotating member-auxiliary link member insertion part 565, and by the left-right linear motion of the rack gear 566 and the up-down linear motion of the rotating member-auxiliary link member 553, the rotating member 550 hinged to the rotating member-auxiliary link member 553 can rotate around the rotation center axis 542.

When the tilting car is turning, the rotating shaft driving device 561 may rotate the rotating member 550 so that an end of the third extension member 551c of the rotating member 550, which is connected to the rotating member-auxiliary link member 553, faces the outside of the turning radius.

For example, in case of rotating the rotating member 550 counterclockwise, the first variable length link member 532a is pulled in the lower right direction, whereby the first variable length lever link member 531a is also inclined so that its right end faces downward to the right, and then the first variable length link member 532a slides out from the first variable length lever link member 531a. In addition, the second variable length link member 532b is pulled in the upper left direction, whereby the second variable length lever link member 531b is also inclined so that its left end faces upward to the left, and then the second variable length link member 532b slides out from the second variable length lever link member 531b.

The first variable length lever link member 531a performs a lever motion around the hinge shaft 534a to which the first variable length lever link member 531a and the first support member 502a are connected, and the second variable length lever link member 531b performs a lever motion around the hinge shaft 534b to which the second variable length lever link member 531b and the second support member 502b are connected.

By such a lever motion, the first vertical link member 521a rises, and the second vertical link member 521b descends. Since the first wheel 571a connected to the first vertical link member 521a and the second wheel 571b connected to the second vertical link member 521b remain in contact with the ground, eventually the first end 503a of the lower center frame 501 is inclined downward, and the second end 503b of the lower center frame 501 is raised upward, and the vehicle body is inclined toward the center of the turning radius.

In particular, as the first variable length link member 532a slides out from the first variable length lever link member 531a, the distance between the hinge shaft 554a of the inner through-hole and the hinge shaft 534a of the central through-hole increases than the distance between the hinge shaft 524a of the outer through-hole and the hinge shaft 534a of the central through-hole, thereby obtaining the effect of increasing the length from the fulcrum of the lever to the force point of the lever and raising the first vertical link member 521a with a small force. Likewise, as the second variable length link member 532b slides out from the second variable length lever link member 531b, the distance between the hinge shaft 554b of the inner through-hole and the hinge shaft 534b of the central through-hole increases than the distance between the hinge shaft 524b of the outer through-hole and the hinge shaft 534b of the central through-hole, thereby obtaining the effect of increasing the length from the fulcrum of the lever to the force point of the lever and lowering the second vertical link member 521b with a small force.

In addition, the third extension member 551c is extended to the lower side of the rotating member 550 and the third extension member 551c is moved to rotate the rotating member 550, whereby a leverage effect is generated where the rotation center axis 542 becomes the fulcrum of the lever. Accordingly, it is possible to control the rotation of the rotating member 550 with a small force.

Figure 18:
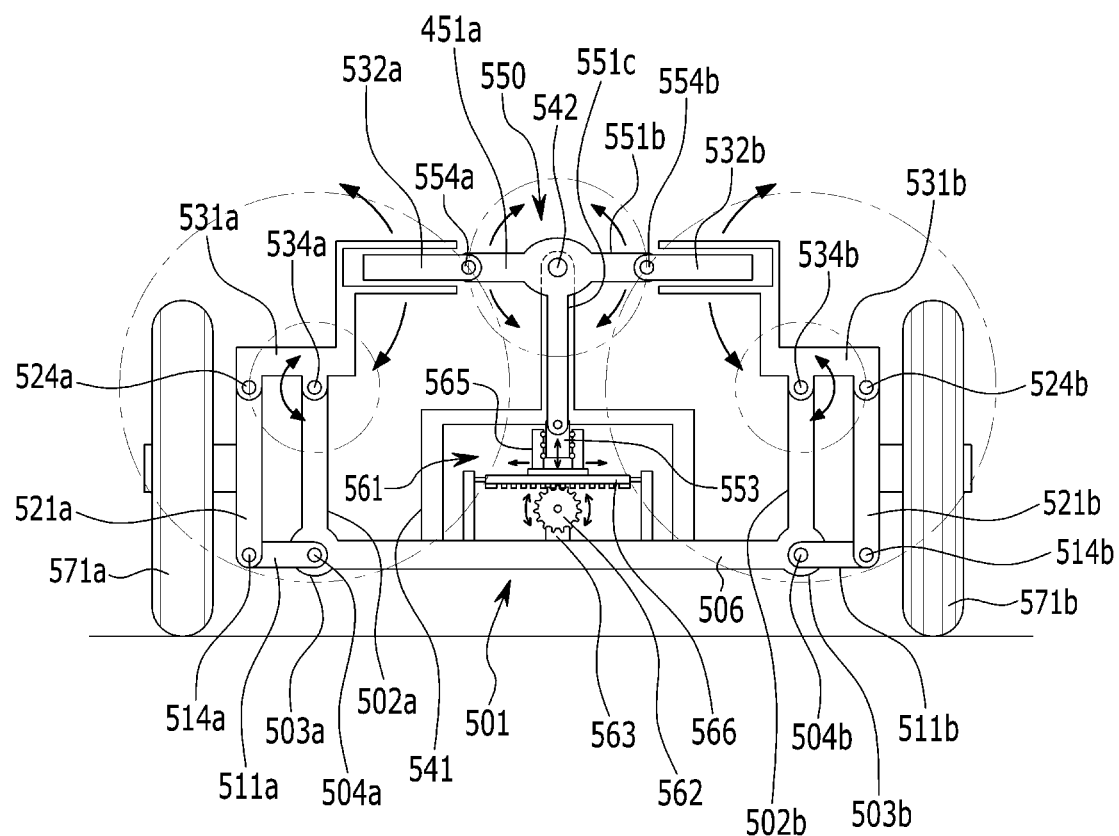
FIG. 18 shows a configuration in which a bent variable length lever link member is used in the tilting car frame according to the eighth embodiment of the technology disclosed in the present specification.

FIG. 18 shows a configuration in which a bent variable length lever link member is used in the tilting car frame according to the eighth embodiment of the technology disclosed in the present specification.

The first variable length lever link member 531a may be formed to be bent at a predetermined angle between the hinge shaft 554a of the inner through-hole and the hinge shaft 534a of the central through-hole. The second variable length lever link member 531b may be formed to be bent at a predetermined angle between the hinge shaft 554b of the inner through-hole and the hinge shaft 534b of the central through-hole. In FIG. 18, a configuration in which the first variable length lever link member 531a and the second variable length lever link member 531b are bent twice at an angle of 90 degrees is shown. With this configuration, even in a vehicle having a narrow width, it is possible to increase the distance between the hinge shaft 554a of the inner through-hole of the first variable length lever link member 531a and the hinge shaft 534a of the central through-hole and the distance between the hinge shaft 554b of the inner through-hole of the second variable length lever link member 531b and the hinge shaft 534b of the central through-hole, whereby greater lever force can be used around the hinge shaft 534a of the central through-hole of the first variable length lever link member 531a and the hinge shaft 534b of the central through-hole of the second variable length lever link member 531b, which are lever fulcrum.

In addition, since the first variable length lever link member 531a and the second variable length lever link member 531b are bent and extend upward, the height of the rotation center axis 542 is increased, whereby as the length of the third extension member 551c becomes longer, the leverage effect of the third extension member 551c using the rotation center axis 542 as a fulcrum of the lever becomes larger.

Figure 19:
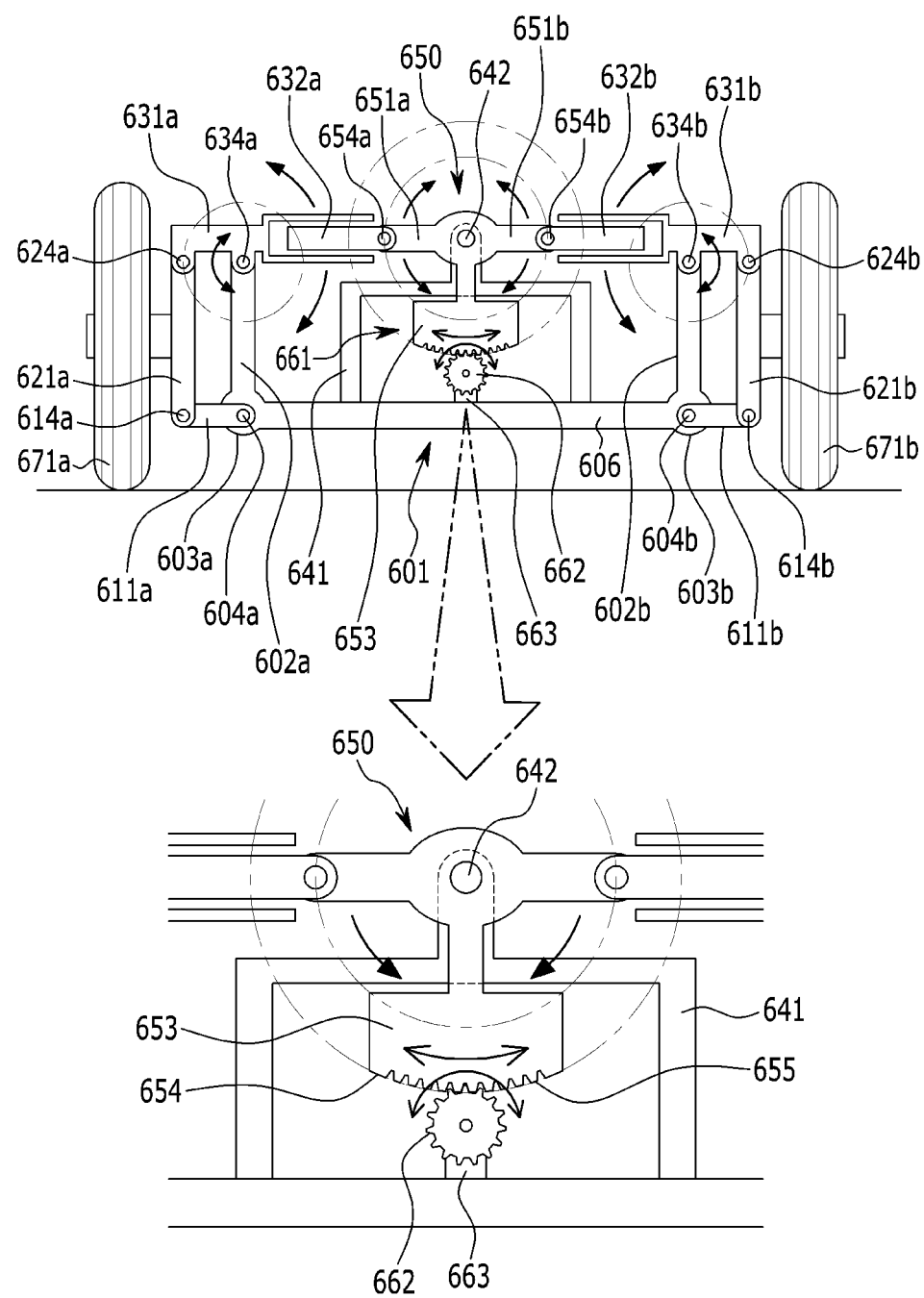
FIG. 19 is a schematic diagram of a tilting car frame according to a ninth embodiment of the technology disclosed in the present specification.

FIG. 19 is a schematic diagram of a tilting car frame according to a ninth embodiment of the technology disclosed in the present specification.

A tilting car frame according to the ninth embodiment may include a lower center frame 601, a first horizontal link member 611a, a second horizontal link member 611b, a first vertical link member 621a, a second vertical link member 621b, a first variable length lever link member 631a, a second variable length lever link member 631b, a rotation center axis support member 641, a rotating member 650 and a rotating shaft driving device 661.

The lower center frame 601 may include a first end 603a located on the left and a second end 603b located on the right with reference to FIG. 19, and may include a horizontal member 606 that is elongated in the left and right direction. A first support member 602a extending upward from the first end 603a may be formed at the first end 603a, and a second support member 602b extending upward from the second end 603b may be formed at the second end 603b.

The right end of the first horizontal link member 611a may be hinged to the first end 603a. A through-hole may be formed at the first end 603a, and a through-hole may also be formed at the right end of the first horizontal link member 611a, and the first end 603a and the first horizontal link member 611a may be hingedly connected by a hinge shaft 604a passing through the through-hole of the first end 603a and the through-hole of the first horizontal link member 611a. Accordingly, the first horizontal link member 611a and the lower center frame 601 can be rotated about the hinge shaft 604a.

The left end of the second horizontal link member 611b may be hinged to the second end 603b. A through-hole may be formed at the second end 603b, and a through-hole may also be formed at the left end of the second horizontal link member 611b, and the second end 603b and the second horizontal link member 611b may be hingedly connected by a hinge shaft 604b passing through the through-hole of the second end 603b and the through-hole of the second horizontal link member 611b. Accordingly, the second horizontal link member 611b and the lower center frame 601 can be rotated about the hinge shaft 604b.

The lower end of the first vertical link member 621a may be hinged to the left end of the first horizontal link member 611a. A through-hole may be formed at the left end of the first horizontal link member 611a, and a through-hole may also be formed at the lower end of the first vertical link member 621a, and the first horizontal link member 611a and the first vertical link member 621a may be hingedly connected by the hinge shaft 614a passing through the through-hole of the first horizontal link member 611a and the through-hole of the first vertical link member 621a. Accordingly, the first vertical link member 621a and the first horizontal link member 611a can rotate around the hinge shaft 614a.

A first wheel 671a may be connected to the first vertical link member 621a, and the first wheel 671a and the first vertical link member 621a may be directly connected, and an intermediate configuration may exist between the first wheel 671a and the first vertical link member 621a.

A first shock absorbing device may be hingedly connected between the first vertical link member 621a and the first support member 602a to absorb vibration or shock transmitted from the ground.

The lower end of the second vertical link member 621b may be hinged to the right end of the second horizontal link member 611b. A through-hole may be formed at the right end of the second horizontal link member 611b, and a through-hole may also be formed at the lower end of the second vertical link member 621b, and the second horizontal link member 611b and the second vertical link member 621b may be hingedly connected by the hinge shaft 614b passing through the through-hole of the second horizontal link member 611b and the through-hole of the second vertical link member 621b. Accordingly, the second vertical link member 621b and the second horizontal link member 611b can rotate around the hinge shaft 614b.

A second wheel 671b may be connected to the second vertical link member 621b, and the second wheel 671b and the second vertical link member 621b may be directly connected, and an intermediate configuration may exist between the second wheel 671b and the second vertical link member 621b.

A second shock absorbing device may be hingedly connected between the second vertical link member 621b and the second support member 602b to absorb vibration or shock transmitted from the ground.

The rotation center axis support member 641 may be a member extending upward from the center of the lower center frame 601. A rotating member 650 may be rotatably connected to the upper end of the rotation center axis support member 641.

The first variable length link member 632a may be connected to the right end of the first variable length lever link member 631a to be slidable along the length direction of the first variable length lever link member 631a. An outer through-hole may be formed at the left end of the first variable length lever link member 631a, and an inner through-hole may be formed at the right end of the first variable length link member 632a slidably connected to the first variable length lever link member 631a, and a central through-hole may be formed between the outer through-hole and the inner through-hole. The distance between the outer through-hole and the center through-hole may be the same as the distance between the hinge shaft 604a and the hinge shaft 614a.

The first variable length lever link member 631a may be hinged to the upper end of the first vertical link member 621a and the upper end of the first support member 602a. Through-holes may be formed at the upper end of the first vertical link member 621a and the upper end of the first support member 602a, respectively. the first variable length lever link member 631a and the first vertical link member 621a may be hingedly connected by the hinge shaft 624a passing through the outer through-hole of the first variable length lever link member 631a and the through-hole formed at the upper end of the first vertical link member 621a. In addition, the first variable length lever link member 631a and the first support member 602a may be hingedly connected by the hinge shaft 634a passing through the central through-hole of the first variable length lever link member 631a and the through-hole formed at an upper end of the first support member 602a. Accordingly, the first variable length lever link member 631a and the first vertical link member 621a can be rotated around the hinge shaft 624a, and the first variable length lever link member 631a and the first support member 602a can be rotated around the hinge shaft 634a.

The second variable length link member 632b may be connected to the left end of the second variable length lever link member 631b to be slidable along the length direction of the second variable length lever link member 631b. An outer through-hole may be formed at the right end of the second variable length lever link member 631b, and an inner through-hole may be formed at the left end of the second variable length link member 632b slidably connected to the second variable length lever link member 631b, and a central through-hole may be formed between the outer through-hole and the inner through-hole. The distance between the outer through-hole and the center through-hole may be the same as the distance between the hinge shaft 604b and the hinge shaft 614b.

The second variable length lever link member 631b may be hinged to the upper end of the second vertical link member 621b and the upper end of the second support member 602b. Through-holes may be formed at the upper end of the second vertical link member 621b and the upper end of the second support member 602b, respectively. the second variable length lever link member 631b and the second vertical link member 621b may be hingedly connected by the hinge shaft 624b passing through the outer through-hole of the second variable length lever link member 631b and the through-hole formed at the upper end of the second vertical link member 621b. In addition, the second variable length lever link member 631b and the second support member 602b may be hingedly connected by the hinge shaft 634b passing through the central through-hole of the second variable length lever link member 631b and the through-hole formed at an upper end of the second support member 602b. Accordingly, the second variable length lever link member 631b and the second vertical link member 621b can be rotated around the hinge shaft 624b, and the second variable length lever link member 631b and the second support member 602b can be rotated around the hinge shaft 634b.

The rotating member 650 may be connected to be rotatable about the rotation center axis 642 of the rotation center axis support member 641. The rotation center axis 642 may be fixedly coupled to the rotation center axis support member 641 and the rotating member 650 may be rotatably connected to the rotation center axis 642, and alternatively, the rotation center axis 642 may be fixedly coupled to the central portion of the rotating member 650 to rotate together with the rotating member 650.

The rotating member 650 may include a first extension member 651a extending to the left and a second extension member 651b extending to the right. The first extension member 651a may be hinged to the end of the first variable length link member 632a, and the second extension member 651b may be hinged to the end of the second variable length link member 632b. In addition, the rotating member 650 may include a third extension member 653 extending downward, and the third extension member 653 may have a curved surface having a predetermined curvature in its longitudinal section 654, on which teeth 655 may be formed.

A through-hole may be formed at the end of the first extension member 651a, and the first variable length link member 632a and the first extension member 651a may be hingedly connected by the hinge shaft 654a passing through the inner through-hole of the first variable length link member 632a and the through-hole formed at the end of the first extension member 651a. Accordingly, the first variable length link member 632a and the first extension member 651a can be rotated around the hinge shaft 654a.

A through-hole may be formed at the end of the second extension member 651b, and the second variable length link member 632b and the second extension member 651b may be hingedly connected by the hinge shaft 654b passing through the inner through-hole of the second variable length link member 632b and the through-hole formed at the end of the second extension member 651b. Accordingly, the second variable length link member 632b and the second extension member 651b can be rotated around the hinge shaft 654b.

The rotating shaft driving device 661 may be installed on the lower center frame 601 and is a device that rotates the rotating member 650 rotatably coupled to the rotation center axis 642. The rotating shaft driving device 661 may include a circular gear 662 and a lower drive motor 663.

The circular gear 662 may be rotatably connected to the horizontal member 606, and the lower drive motor 663 may rotate the circular gear 662. The circular gear 662 may be engaged with the teeth 655 of the third extension member 653. When the lower drive motor 663 rotates the circular gear 662, the rotating member 650 connected to the third extension member 653 engaged with the circular gear 662 rotates around the rotation center axis 642.

When the tilting car is turning, the rotating shaft driving device 661 may rotate the rotating member 650 so that the longitudinal section 654 of the third extension member 653 of the rotating member 650 faces the outside of the turning radius.

For example, in case of rotating the rotating member 650 counterclockwise, the first variable length link member 632a is pulled in the lower right direction, whereby the first variable length lever link member 631a is also inclined so that its right end faces downward to the right, and then the first variable length link member 632a slides out from the first variable length lever link member 631a. In addition, the second variable length link member 632b is pulled in the upper left direction, whereby the second variable length lever link member 631b is also inclined so that its left end faces upward to the left, and then the second variable length link member 632b slides out from the second variable length lever link member 631b.

The first variable length lever link member 631a performs a lever motion around the hinge shaft 634a to which the first variable length lever link member 631a and the first support member 602a are connected, and the second variable length lever link member 631b performs a lever motion around the hinge shaft 634b to which the second variable length lever link member 631b and the second support member 602b are connected.

By such a lever motion, the first vertical link member 621a rises, and the second vertical link member 621b descends. Since the first wheel 671a connected to the first vertical link member 621a and the second wheel 671b connected to the second vertical link member 621b remain in contact with the ground, eventually the first end 603a of the lower center frame 601 is inclined downward, and the second end 603b of the lower center frame 601 is raised upward, and the vehicle body is inclined toward the center of the turning radius.

In particular, as the first variable length link member 632a slides out from the first variable length lever link member 631a, the distance between the hinge shaft 654a of the inner through-hole and the hinge shaft 634a of the central through-hole increases than the distance between the hinge shaft 624a of the outer through-hole and the hinge shaft 634a of the central through-hole, thereby obtaining the effect of increasing the length from the fulcrum of the lever to the force point of the lever and raising the first vertical link member 621a with a small force. Likewise, as the second variable length link member 632b slides out from the second variable length lever link member 631b, the distance between the hinge shaft 654b of the inner through-hole and the hinge shaft 634b of the central through-hole increases than the distance between the hinge shaft 624b of the outer through-hole and the hinge shaft 634b of the central through-hole, thereby obtaining the effect of increasing the length from the fulcrum of the lever to the force point of the lever and lowering the second vertical link member 621b with a small force.

In addition, the third extension member 653 is extended to the lower side of the rotating member 650 and the third extension member 653 is moved to rotate the rotating member 650, whereby a leverage effect is generated where the rotation center axis 642 becomes the fulcrum of the lever. Accordingly, it is possible to control the rotation of the rotating member 650 with a small force.

Figure 20:
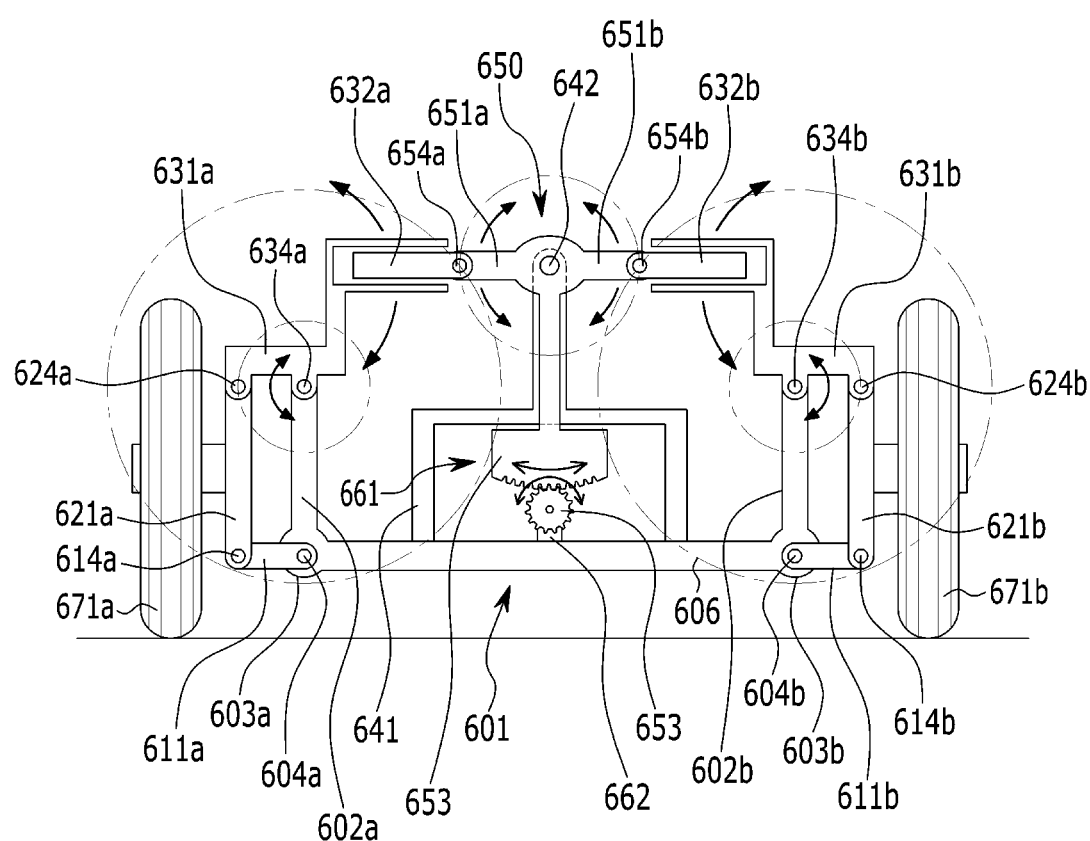
FIG. 20 shows a configuration in which a bent variable length lever link member is used in the tilting car frame according to the ninth embodiment of the technology disclosed in the present specification.

FIG. 20 shows a configuration in which a bent variable length lever link member is used in the tilting car frame according to the ninth embodiment of the technology disclosed in the present specification.

The first variable length lever link member 631a may be formed to be bent at a predetermined angle between the hinge shaft 654a of the inner through-hole and the hinge shaft 634a of the central through-hole. The second variable length lever link member 631b may be formed to be bent at a predetermined angle between the hinge shaft 654b of the inner through-hole and the hinge shaft 634b of the central through-hole. In FIG. 20, a configuration in which the first variable length lever link member 631a and the second variable length lever link member 631b are bent twice at an angle of 90 degrees is shown. With this configuration, even in a vehicle having a narrow width, it is possible to increase the distance between the hinge shaft 654a of the inner through-hole of the first variable length lever link member 631a and the hinge shaft 634a of the central through-hole and the distance between the hinge shaft 654b of the inner through-hole of the second variable length lever link member 631b and the hinge shaft 634b of the central through-hole, whereby greater lever force can be used around the hinge shaft 634a of the central through-hole of the first variable length lever link member 631a and the hinge shaft 634b of the central through-hole of the second variable length lever link member 631b, which are lever fulcrum.

In addition, since the first variable length lever link member 631a and the second variable length lever link member 631b are bent and extend upward, the height of the rotation center axis 642 is increased, whereby as the length of the third extension member 653 becomes longer, the leverage effect of the third extension member 653 using the rotation center axis 642 as a fulcrum of the lever becomes larger.

Figure 21:
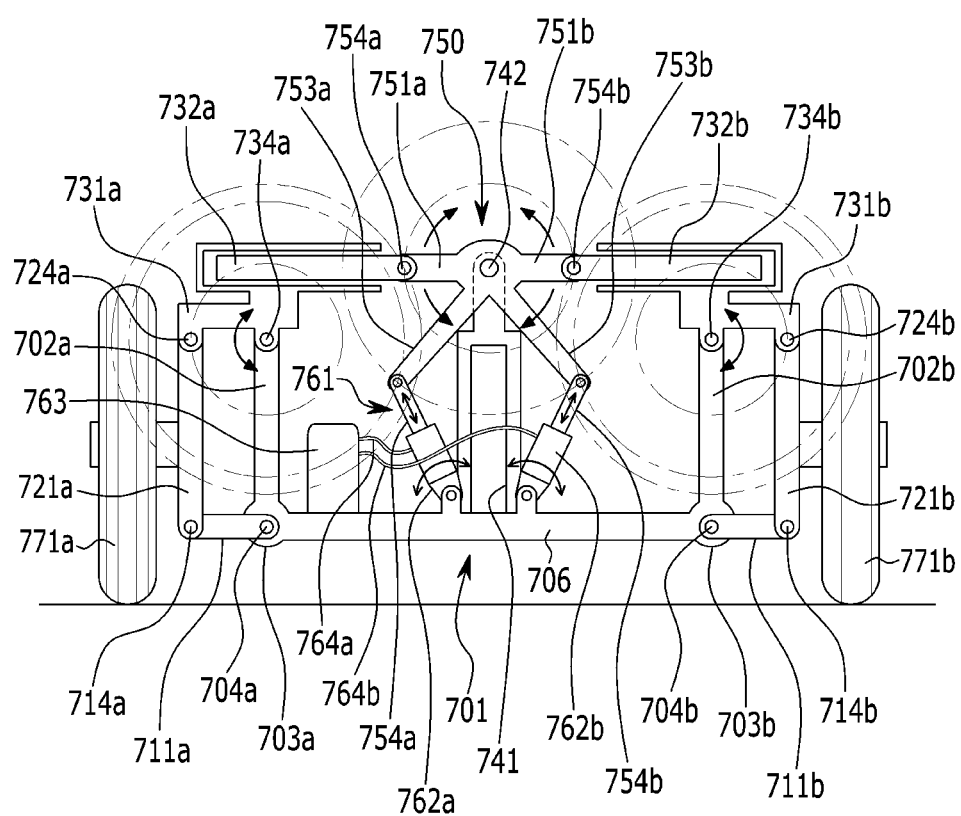
FIG. 21 is a schematic diagram of a tilting car frame according to a tenth embodiment of the technology disclosed in the present specification.

FIG. 21 is a schematic diagram of a tilting car frame according to a tenth embodiment of the technology disclosed in the present specification.

A tilting car frame according to the tenth embodiment may include a lower center frame 701, a first horizontal link member 711a, a second horizontal link member 711b, a first vertical link member 721a, a second vertical link member 721b, a first variable length lever link member 731a, a second variable length lever link member 731b, a rotation center axis support member 741, a rotating member 750 and a rotating shaft driving device 761.

The lower center frame 701 may include a first end 703a located on the left and a second end 703b located on the right with reference to FIG. 21, and may include a horizontal member 706 that is elongated in the left and right direction. A first support member 702a extending upward from the first end 703a may be formed at the first end 703a, and a second support member 702b extending upward from the second end 703b may be formed at the second end 703b.

The right end of the first horizontal link member 711a may be hinged to the first end 703a. A through-hole may be formed at the first end 703a, and a through-hole may also be formed at the right end of the first horizontal link member 711a, and the first end 703a and the first horizontal link member 711a may be hingedly connected by a hinge shaft 704a passing through the through-hole of the first end 703a and the through-hole of the first horizontal link member 711a. Accordingly, the first horizontal link member 711a and the lower center frame 701 can be rotated about the hinge shaft 704a.

The left end of the second horizontal link member 711b may be hinged to the second end 703b. A through-hole may be formed at the second end 703b, and a through-hole may also be formed at the left end of the second horizontal link member 711b, and the second end 703b and the second horizontal link member 711b may be hingedly connected by a hinge shaft 704b passing through the through-hole of the second end 703b and the through-hole of the second horizontal link member 711b. Accordingly, the second horizontal link member 711b and the lower center frame 701 can be rotated about the hinge shaft 704b.

The lower end of the first vertical link member 721a may be hinged to the left end of the first horizontal link member 711a. A through-hole may be formed at the left end of the first horizontal link member 711a, and a through-hole may also be formed at the lower end of the first vertical link member 721a, and the first horizontal link member 711a and the first vertical link member 721a may be hingedly connected by the hinge shaft 714a passing through the through-hole of the first horizontal link member 711a and the through-hole of the first vertical link member 721a. Accordingly, the first vertical link member 721a and the first horizontal link member 711a can rotate around the hinge shaft 714a.

A first wheel 771a may be connected to the first vertical link member 721a, and the first wheel 771a and the first vertical link member 721a may be directly connected, and an intermediate configuration may exist between the first wheel 771a and the first vertical link member 721a.

A first shock absorbing device may be hingedly connected between the first vertical link member 721a and the first support member 702a to absorb vibration or shock transmitted from the ground.

The lower end of the second vertical link member 721b may be hinged to the right end of the second horizontal link member 711b. A through-hole may be formed at the right end of the second horizontal link member 711b, and a through-hole may also be formed at the lower end of the second vertical link member 721b, and the second horizontal link member 711b and the second vertical link member 721b may be hingedly connected by the hinge shaft 714b passing through the through-hole of the second horizontal link member 711b and the through-hole of the second vertical link member 721b. Accordingly, the second vertical link member 721b and the second horizontal link member 711b can rotate around the hinge shaft 714b.

A second wheel 771b may be connected to the second vertical link member 721b, and the second wheel 771b and the second vertical link member 721b may be directly connected, and an intermediate configuration may exist between the second wheel 771b and the second vertical link member 721b.

A second shock absorbing device may be hingedly connected between the second vertical link member 721b and the second support member 702b to absorb vibration or shock transmitted from the ground.

The rotation center axis support member 741 may be a member extending upward from the center of the lower center frame 701. A rotating member 750 may be rotatably connected to the upper end of the rotation center axis support member 741.

The first variable length link member 732a may be connected to the right end of the first variable length lever link member 731a to be slidable along the length direction of the first variable length lever link member 731a. An outer through-hole may be formed at the left end of the first variable length lever link member 731a, and an inner through-hole may be formed at the right end of the first variable length link member 732a slidably connected to the first variable length lever link member 731a, and a central through-hole may be formed between the outer through-hole and the inner through-hole. The distance between the outer through-hole and the center through-hole may be the same as the distance between the hinge shaft 704a and the hinge shaft 714a.

The first variable length lever link member 731a may be hinged to the upper end of the first vertical link member 721a and the upper end of the first support member 702a. Through-holes may be formed at the upper end of the first vertical link member 721a and the upper end of the first support member 702a, respectively. the first variable length lever link member 731a and the first vertical link member 721a may be hingedly connected by the hinge shaft 724a passing through the outer through-hole of the first variable length lever link member 731a and the through-hole formed at the upper end of the first vertical link member 721a. In addition, the first variable length lever link member 731a and the first support member 702a may be hingedly connected by the hinge shaft 734a passing through the central through-hole of the first variable length lever link member 731a and the through-hole formed at an upper end of the first support member 702a. Accordingly, the first variable length lever link member 731a and the first vertical link member 721a can be rotated around the hinge shaft 724a, and the first variable length lever link member 731a and the first support member 702a can be rotated around the hinge shaft 734a.

The second variable length link member 732b may be connected to the left end of the second variable length lever link member 731b to be slidable along the length direction of the second variable length lever link member 731b. An outer through-hole may be formed at the right end of the second variable length lever link member 731b, and an inner through-hole may be formed at the left end of the second variable length link member 732b slidably connected to the second variable length lever link member 731b, and a central through-hole may be formed between the outer through-hole and the inner through-hole. The distance between the outer through-hole and the center through-hole may be the same as the distance between the hinge shaft 704b and the hinge shaft 714b.

The second variable length lever link member 731b may be hinged to the upper end of the second vertical link member 721b and the upper end of the second support member 702b. Through-holes may be formed at the upper end of the second vertical link member 721b and the upper end of the second support member 702b, respectively. the second variable length lever link member 731b and the second vertical link member 721b may be hingedly connected by the hinge shaft 724b passing through the outer through-hole of the second variable length lever link member 731b and the through-hole formed at the upper end of the second vertical link member 721b. In addition, the second variable length lever link member 731b and the second support member 702b may be hingedly connected by the hinge shaft 734b passing through the central through-hole of the second variable length lever link member 731b and the through-hole formed at an upper end of the second support member 702b. Accordingly, the second variable length lever link member 731b and the second vertical link member 721b can be rotated around the hinge shaft 724b, and the second variable length lever link member 731b and the second support member 702b can be rotated around the hinge shaft 734b.

The rotating member 750 may be connected to be rotatable about the rotation center axis 742 of the rotation center axis support member 741. The rotation center axis 742 may be fixedly coupled to the rotation center axis support member 741 and the rotating member 750 may be rotatably connected to the rotation center axis 742, and alternatively, the rotation center axis 742 may be fixedly coupled to the central portion of the rotating member 750 to rotate together with the rotating member 750.

The rotating member 750 may include a first extension member 751a extending to the left and a second extension member 751b extending to the right. The first extension member 751a may be hinged to the end of the first variable length link member 732a, and the second extension member 751b may be hinged to the end of the second variable length link member 732b. In addition, the rotating member 750 may include a third extension member 753a extending in a lower left direction and a fourth extension member 753b extending in a lower right direction, and the third variable length link member 754a may be hinged to an end of the third extension member 753a, and a fourth variable length link member 754b may be hinged to an end of the fourth extension member 753b.

A through-hole may be formed at the end of the first extension member 751a, and the first variable length link member 732a and the first extension member 751a may be hingedly connected by the hinge shaft 754a passing through the inner through-hole of the first variable length link member 732a and the through-hole formed at the end of the first extension member 751a. Accordingly, the first variable length link member 732a and the first extension member 751a can be rotated around the hinge shaft 754a.

A through-hole may be formed at the end of the second extension member 751b, and the second variable length link member 732b and the second extension member 751b may be hingedly connected by the hinge shaft 754b passing through the inner through-hole of the second variable length link member 732b and the through-hole formed at the end of the second extension member 751b. Accordingly, the second variable length link member 732b and the second extension member 751b can be rotated around the hinge shaft 754b.

The rotating shaft driving device 761 may be installed on the lower center frame 701 and is a device that rotates the rotating member 750 rotatably coupled to the rotation center axis 742. The rotating shaft driving device 761 may include a third variable length link member 754a, a third extension member driving device 762a, a fourth variable length link member 754b, a fourth extension member driving device 762b and an extension member driving part 763.

The third variable length link member 754a is hinged to the third extension member 753a, and the third extension member driving device 762a is hinged to the horizontal member 706. The third variable length link member 754a may be inserted into the third extension member driving device 762a, and may perform linear reciprocating motion along the longitudinal direction of the third extension member driving device 762a.

The fourth variable length link member 754b is hinged to the fourth extension member 753b, and the fourth extension member driving device 762b is hinged to the horizontal member 706. The fourth variable length link member 754b may be inserted into the fourth extension member driving device 762b, and may perform linear reciprocating motion along the longitudinal direction of the fourth extension member driving device 762b.

The third extension member driving device 762a may be hingedly connected to the horizontal member 706 in the direction of the first end 703a, and the fourth extension member driving device 762b may be hingedly connected to the horizontal member 706 in the direction of the second end 703b. The third extension member driving device 762a and the fourth extension member driving device 762b do not cross each other.

The extension member driving part 763 may be located in the lower center frame 701 and may operate the third extension member driving device 762a and the fourth extension member driving device 762b. The third extension member driving device 762a and the fourth extension member driving device 762b may be hydraulic cylinders, and the extension member driving part 763 may be a hydraulic pump that drives a hydraulic cylinder by supplying and discharging fluid to the third extension member driving device 762a and the fourth extension member driving device 762b.

When the extension member driving part 763 discharges the fluid from the third extension member driving device 762a, the third variable length link member 754a enters the inside of the third extension member driving device 762a, and when the extension member driving part 763 supplies the fluid to the fourth extension member driving device 762b, the fourth variable length link member 754b comes out from the inside of the fourth extension member driving device 762b, whereby the rotating member 750 rotates in a counterclockwise direction.

When the extension member driving part 763 supplies the fluid to the third extension member driving device 762a, the third variable length link member 754a comes out from the inside of the third extension member driving device 762a, and when the extension member driving part 763 discharges the fluid from the fourth extension member driving device 762b, the fourth variable length link member 754b enters the inside of the fourth extension member driving device 762b, whereby the rotating member 750 rotates in a clockwise direction.

The extension member driving part 763 may make the discharge amount and supply amount of the fluid the same so that the linear motion displacements of the third variable length link member 754a and the fourth variable length link member 754b are the same.

When the tilting car is turning, the rotating shaft driving device 761 may rotate the rotating member 750 so that ends of the third extension member 753a and fourth extension member 753b of the rotating member 750 faces the outside of the turning radius.

For example, in case of rotating the rotating member 750 counterclockwise, the first variable length link member 732a is pulled in the lower right direction, whereby the first variable length lever link member 731a is also inclined so that its right end faces downward to the right, and then the first variable length link member 732a slides out from the first variable length lever link member 731a. In addition, the second variable length link member 732b is pulled in the upper left direction, whereby the second variable length lever link member 731b is also inclined so that its left end faces upward to the left, and then the second variable length link member 732b slides out from the second variable length lever link member 731b.

The first variable length lever link member 731a performs a lever motion around the hinge shaft 734a to which the first variable length lever link member 731a and the first support member 702a are connected, and the second variable length lever link member 731b performs a lever motion around the hinge shaft 734b to which the second variable length lever link member 731b and the second support member 702b are connected.

By such a lever motion, the first vertical link member 721a rises, and the second vertical link member 721b descends. Since the first wheel 771a connected to the first vertical link member 721a and the second wheel 771b connected to the second vertical link member 721b remain in contact with the ground, eventually the first end 703a of the lower center frame 701 is inclined downward, and the second end 703b of the lower center frame 701 is raised upward, and the vehicle body is inclined toward the center of the turning radius.

In particular, as the first variable length link member 732a slides out from the first variable length lever link member 731a, the distance between the hinge shaft 754a of the inner through-hole and the hinge shaft 734a of the central through-hole increases than the distance between the hinge shaft 724a of the outer through-hole and the hinge shaft 734a of the central through-hole, thereby obtaining the effect of increasing the length from the fulcrum of the lever to the force point of the lever and raising the first vertical link member 721a with a small force. Likewise, as the second variable length link member 732b slides out from the second variable length lever link member 731b, the distance between the hinge shaft 754b of the inner through-hole and the hinge shaft 734b of the central through-hole increases than the distance between the hinge shaft 724b of the outer through-hole and the hinge shaft 734b of the central through-hole, thereby obtaining the effect of increasing the length from the fulcrum of the lever to the force point of the lever and lowering the second vertical link member 721b with a small force.

In addition, the third extension member 753a and the fourth extension member 753b are extended to the lower side of the rotating member 750, and the third extension member 753a and the fourth extension member 753b are moved to rotate the rotating member 750, whereby a leverage effect is generated where the rotation center axis 742 becomes the fulcrum of the lever. Accordingly, it is possible to control the rotation of the rotating member 750 with a small force.

As shown in FIG. 21, the first variable length lever link member 731a may have a shape in which a portion accommodating the first variable length link member 732a extends toward the first wheel 771a, whereby a longer path through which the first variable length link member 732a can linearly reciprocate within the first variable length lever link member 731a can be secured. This can increase the area in which the first variable length lever link member 731a supports the first variable length link member 732a, and can prevent the first variable length link member 732a from being separated from the first variable length lever link member 731a.

As shown in FIG. 21, the second variable length lever link member 731b may have a shape in which a portion accommodating the second variable length link member 732b extends toward the second wheel 771b, whereby a longer path through which the second variable length link member 732b can linearly reciprocate within the second variable length lever link member 731b can be secured. This can increase the area in which the second variable length lever link member 731b supports the second variable length link member 732b, and can prevent the second variable length link member 732b from being separated from the second variable length lever link member 731b.

The shapes of the first variable length lever link member 731a and the second variable length lever link member 731b shown in FIG. 21 can be applied to the first variable length lever link member and the second variable length lever link member of the first to ninth embodiments.

Figure 22:
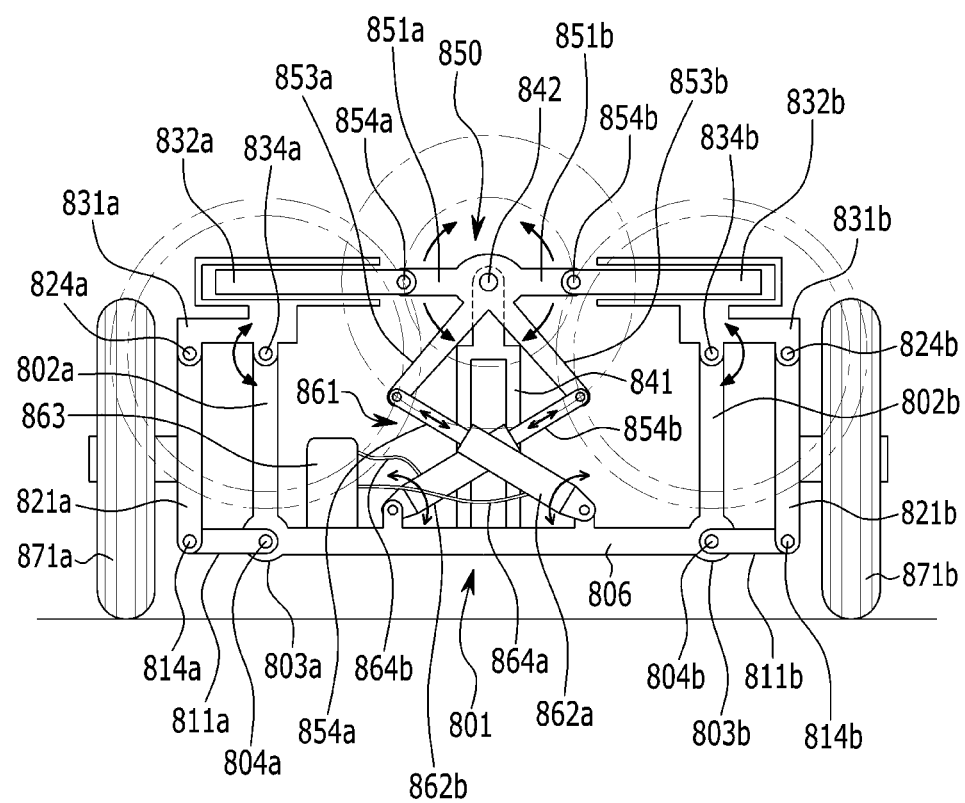
FIG. 22 is a schematic diagram of a tilting car frame according to an eleventh embodiment of the technology disclosed in the present specification.

FIG. 22 is a schematic diagram of a tilting car frame according to an eleventh embodiment of the technology disclosed in the present specification.

A tilting car frame according to the eleventh embodiment may include a lower center frame 801, a first horizontal link member 811a, a second horizontal link member 811b, a first vertical link member 821a, a second vertical link member 821b, a first variable length lever link member 831a, a second variable length lever link member 831b, a rotation center axis support member 841, a rotating member 850 and a rotating shaft driving device 861.

The lower center frame 801 may include a first end 803a located on the left and a second end 803b located on the right with reference to FIG. 22, and may include a horizontal member 806 that is elongated in the left and right direction. A first support member 802a extending upward from the first end 803a may be formed at the first end 803a, and a second support member 802b extending upward from the second end 803b may be formed at the second end 803b.

The right end of the first horizontal link member 811a may be hinged to the first end 803a. A through-hole may be formed at the first end 803a, and a through-hole may also be formed at the right end of the first horizontal link member 811a, and the first end 803a and the first horizontal link member 811a may be hingedly connected by a hinge shaft 804a passing through the through-hole of the first end 803a and the through-hole of the first horizontal link member 811a. Accordingly, the first horizontal link member 811a and the lower center frame 801 can be rotated about the hinge shaft 804a.

The left end of the second horizontal link member 811b may be hinged to the second end 803b. A through-hole may be formed at the second end 803b, and a through-hole may also be formed at the left end of the second horizontal link member 811b, and the second end 803b and the second horizontal link member 811b may be hingedly connected by a hinge shaft 804b passing through the through-hole of the second end 803b and the through-hole of the second horizontal link member 811b. Accordingly, the second horizontal link member 811b and the lower center frame 801 can be rotated about the hinge shaft 804b.

The lower end of the first vertical link member 821a may be hinged to the left end of the first horizontal link member 811a. A through-hole may be formed at the left end of the first horizontal link member 811a, and a through-hole may also be formed at the lower end of the first vertical link member 821a, and the first horizontal link member 811a and the first vertical link member 821a may be hingedly connected by the hinge shaft 814a passing through the through-hole of the first horizontal link member 811a and the through-hole of the first vertical link member 821a. Accordingly, the first vertical link member 821a and the first horizontal link member 811a can rotate around the hinge shaft 814a.

A first wheel 871a may be connected to the first vertical link member 821a, and the first wheel 871a and the first vertical link member 821a may be directly connected, and an intermediate configuration may exist between the first wheel 871a and the first vertical link member 821a.

A first shock absorbing device may be hingedly connected between the first vertical link member 821a and the first support member 802a to absorb vibration or shock transmitted from the ground.

The lower end of the second vertical link member 821b may be hinged to the right end of the second horizontal link member 811b. A through-hole may be formed at the right end of the second horizontal link member 811b, and a through-hole may also be formed at the lower end of the second vertical link member 821b, and the second horizontal link member 811b and the second vertical link member 821b may be hingedly connected by the hinge shaft 814b passing through the through-hole of the second horizontal link member 811b and the through-hole of the second vertical link member 821b. Accordingly, the second vertical link member 821b and the second horizontal link member 811b can rotate around the hinge shaft 814b.

A second wheel 871b may be connected to the second vertical link member 821b, and the second wheel 871b and the second vertical link member 821b may be directly connected, and an intermediate configuration may exist between the second wheel 871b and the second vertical link member 821b.

A second shock absorbing device may be hingedly connected between the second vertical link member 821b and the second support member 802b to absorb vibration or shock transmitted from the ground.

The rotation center axis support member 841 may be a member extending upward from the center of the lower center frame 801. A rotating member 850 may be rotatably connected to the upper end of the rotation center axis support member 841.

The first variable length link member 832a may be connected to the right end of the first variable length lever link member 831a to be slidable along the length direction of the first variable length lever link member 831a. An outer through-hole may be formed at the left end of the first variable length lever link member 831a, and an inner through-hole may be formed at the right end of the first variable length link member 832a slidably connected to the first variable length lever link member 831a, and a central through-hole may be formed between the outer through-hole and the inner through-hole. The distance between the outer through-hole and the center through-hole may be the same as the distance between the hinge shaft 804a and the hinge shaft 814a.

The first variable length lever link member 831a may be hinged to the upper end of the first vertical link member 821a and the upper end of the first support member 802a. Through-holes may be formed at the upper end of the first vertical link member 821a and the upper end of the first support member 802a, respectively. the first variable length lever link member 831a and the first vertical link member 821a may be hingedly connected by the hinge shaft 824a passing through the outer through-hole of the first variable length lever link member 831a and the through-hole formed at the upper end of the first vertical link member 821a. In addition, the first variable length lever link member 831a and the first support member 802a may be hingedly connected by the hinge shaft 834a passing through the central through-hole of the first variable length lever link member 831a and the through-hole formed at an upper end of the first support member 802a. Accordingly, the first variable length lever link member 831a and the first vertical link member 821a can be rotated around the hinge shaft 824a, and the first variable length lever link member 831a and the first support member 802a can be rotated around the hinge shaft 834a.

The second variable length link member 832b may be connected to the left end of the second variable length lever link member 831b to be slidable along the length direction of the second variable length lever link member 831b. An outer through-hole may be formed at the right end of the second variable length lever link member 831b, and an inner through-hole may be formed at the left end of the second variable length link member 832b slidably connected to the second variable length lever link member 831b, and a central through-hole may be formed between the outer through-hole and the inner through-hole. The distance between the outer through-hole and the center through-hole may be the same as the distance between the hinge shaft 804b and the hinge shaft 814b.

The second variable length lever link member 831b may be hinged to the upper end of the second vertical link member 821b and the upper end of the second support member 802b. Through-holes may be formed at the upper end of the second vertical link member 821b and the upper end of the second support member 802b, respectively. the second variable length lever link member 831b and the second vertical link member 821b may be hingedly connected by the hinge shaft 824b passing through the outer through-hole of the second variable length lever link member 831b and the through-hole formed at the upper end of the second vertical link member 821b. In addition, the second variable length lever link member 831b and the second support member 802b may be hingedly connected by the hinge shaft 834b passing through the central through-hole of the second variable length lever link member 831b and the through-hole formed at an upper end of the second support member 802b. Accordingly, the second variable length lever link member 831b and the second vertical link member 821b can be rotated around the hinge shaft 824b, and the second variable length lever link member 831b and the second support member 802b can be rotated around the hinge shaft 834b.

The rotating member 850 may be connected to be rotatable about the rotation center axis 842 of the rotation center axis support member 841. The rotation center axis 842 may be fixedly coupled to the rotation center axis support member 841 and the rotating member 850 may be rotatably connected to the rotation center axis 842, and alternatively, the rotation center axis 842 may be fixedly coupled to the central portion of the rotating member 850 to rotate together with the rotating member 850.

The rotating member 850 may include a first extension member 851a extending to the left and a second extension member 851b extending to the right. The first extension member 851a may be hinged to the end of the first variable length link member 832a, and the second extension member 851b may be hinged to the end of the second variable length link member 832b. In addition, the rotating member 850 may include a third extension member 853*a* extending in a lower left direction and a fourth extension member 853*b* extending in a lower right direction, and the third variable length link member 854*a* may be hinged to an end of the third extension member 853*a*, and a fourth variable length link member 854*b* may be hinged to an end of the fourth extension member 853*b*.

A through-hole may be formed at the end of the first extension member 851*a*, and the first variable length link member 832*a* and the first extension member 851*a* may be hingedly connected by the hinge shaft 854*a* passing through the inner through-hole of the first variable length link member 832*a* and the through-hole formed at the end of the first extension member 851*a*. Accordingly, the first variable length link member 832*a* and the first extension member 851*a* can be rotated around the hinge shaft 854*a*.

A through-hole may be formed at the end of the second extension member 851*b*, and the second variable length link member 832*b* and the second extension member 851*b* may be hingedly connected by the hinge shaft 854*b* passing through the inner through-hole of the second variable length link member 832*b* and the through-hole formed at the end of the second extension member 851*b*. Accordingly, the second variable length link member 832*b* and the second extension member 851*b* can be rotated around the hinge shaft 854*b*.

The rotating shaft driving device 861 may be installed on the lower center frame 801 and is a device that rotates the rotating member 850 rotatably coupled to the rotation center axis 842. The rotating shaft driving device 861 may include a third variable length link member 854*a*, a third extension member driving device 862*a*, a fourth variable length link member 854*b*, a fourth extension member driving device 862*b* and an extension member driving part 863.

The third variable length link member 854*a* is hinged to the third extension member 853*a*, and the third extension member driving device 862*a* is hinged to the horizontal member 806. The third variable length link member 854*a* may be inserted into the third extension member driving device 862*a*, and may perform linear reciprocating motion along the longitudinal direction of the third extension member driving device 862*a*.

The fourth variable length link member 854*b* is hinged to the fourth extension member 853*b*, and the fourth extension member driving device 862*b* is hinged to the horizontal member 806. The fourth variable length link member 854*b* may be inserted into the fourth extension member driving device 862*b*, and may perform linear reciprocating motion along the longitudinal direction of the fourth extension member driving device 862*b*.

The third extension member driving device 862*b* may be hingedly connected to the horizontal member 806 in the direction of the second end 803*b*, and the fourth extension member driving device 862*b* may be hingedly connected to the horizontal member 806 in the direction of the first end 803*a*. The third extension member driving device 862*a* and the fourth extension member driving device 862*b* cross each other, whereby the rotation angle of the rotating member 850 can be further increased.

The extension member driving part 863 may be located in the lower center frame 801 and may operate the third extension member driving device 862*a* and the fourth extension member driving device 862*b*. The third extension member driving device 862*a* and the fourth extension member driving device 862*b* may be hydraulic cylinders, and the extension member driving part 863 may be a hydraulic pump that drives a hydraulic cylinder by supplying and discharging fluid to the third extension member driving device 862*a* and the fourth extension member driving device 862*b*.

When the extension member driving part 863 discharges the fluid from the third extension member driving device 862*a*, the third variable length link member 854*a* enters the inside of the third extension member driving device 862*a*, and when the extension member driving part 863 supplies the fluid to the fourth extension member driving device 862*b*, the fourth variable length link member 854*b* comes out from the inside of the fourth extension member driving device 862*b*, whereby the rotating member 850 rotates in a counterclockwise direction.

When the extension member driving part 863 supplies the fluid to the third extension member driving device 862*a*, the third variable length link member 854*a* comes out from the inside of the third extension member driving device 862*a*, and when the extension member driving part 863 discharges the fluid from the fourth extension member driving device 862*b*, the fourth variable length link member 854*b* enters the inside of the fourth extension member driving device 862*b*, whereby the rotating member 850 rotates in a clockwise direction.

The extension member driving part 863 may make the discharge amount and supply amount of the fluid the same so that the linear motion displacements of the third variable length link member 854*a* and the fourth variable length link member 854*b* are the same.

When the tilting car is turning, the rotating shaft driving device 861 may rotate the rotating member 850 so that ends of the third extension member 853*a* and fourth extension member 853*b* of the rotating member 850 faces the outside of the turning radius.

For example, in case of rotating the rotating member 850 counterclockwise, the first variable length link member 832*a* is pulled in the lower right direction, whereby the first variable length lever link member 831*a* is also inclined so that its right end faces downward to the right, and then the first variable length link member 832*a* slides out from the first variable length lever link member 831*a*. In addition, the second variable length link member 832*b* is pulled in the upper left direction, whereby the second variable length lever link member 831*b* is also inclined so that its left end faces upward to the left, and then the second variable length link member 832*b* slides out from the second variable length lever link member 831*b*.

The first variable length lever link member 831*a* performs a lever motion around the hinge shaft 834*a* to which the first variable length lever link member 831*a* and the first support member 802*a* are connected, and the second variable length lever link member 831*b* performs a lever motion around the hinge shaft 834*b* to which the second variable length lever link member 831*b* and the second support member 802*b* are connected.

By such a lever motion, the first vertical link member 821*a* rises, and the second vertical link member 821*b* descends. Since the first wheel 871*a* connected to the first vertical link member 821*a* and the second wheel 871*b* connected to the second vertical link member 821*b* remain in contact with the ground, eventually the first end 803*a* of the lower center frame 801 is inclined downward, and the second end 803*b* of the lower center frame 801 is raised upward, and the vehicle body is inclined toward the center of the turning radius.

In particular, as the first variable length link member 832*a* slides out from the first variable length lever link member 831*a*, the distance between the hinge shaft 854*a* of the inner through-hole and the hinge shaft 834*a* of the central through-hole increases than the distance between the hinge shaft 824*a* of the outer through-hole and the hinge shaft 834*a* of the central through-hole, thereby obtaining the effect of increasing the length from the fulcrum of the lever to the force point of the lever and raising the first vertical link member 821*a* with a small force. Likewise, as the second variable length link member 832*b* slides out from the second variable length lever link member 831*b*, the distance between the hinge shaft 854*b* of the inner through-hole and the hinge shaft 834*b* of the central through-hole increases than the distance between the hinge shaft 824*b* of the outer through-hole and the hinge shaft 834*b* of the central through-hole, thereby obtaining the effect of increasing the length from the fulcrum of the lever to the force point of the lever and lowering the second vertical link member 821*b* with a small force.

In addition, the third extension member 853*a* and the fourth extension member 853*b* are extended to the lower side of the rotating member 850, and the third extension member 853*a* and the fourth extension member 853*b* are moved to rotate the rotating member 850, whereby a leverage effect is generated where the rotation center axis 842 becomes the fulcrum of the lever. Accordingly, it is possible to control the rotation of the rotating member 850 with a small force.

As shown in FIG. 22, the first variable length lever link member 831*a* may have a shape in which a portion accommodating the first variable length link member 832*a* extends toward the first wheel 871*a*, whereby a longer path through which the first variable length link member 832*a* can linearly reciprocate within the first variable length lever link member 831*a* can be secured. This can increase the area in which the first variable length lever link member 831*a* supports the first variable length link member 832*a*, and can prevent the first variable length link member 832*a* from being separated from the first variable length lever link member 831*a*.

As shown in FIG. 22, the second variable length lever link member 831*b* may have a shape in which a portion accommodating the second variable length link member 832*b* extends toward the second wheel 871*b*, whereby a longer path through which the second variable length link member 832*b* can linearly reciprocate within the second variable length lever link member 831*b* can be secured. This can increase the area in which the second variable length lever link member 831*b* supports the second variable length link member 832*b*, and can prevent the second variable length link member 832*b* from being separated from the second variable length lever link member 831*b*.

Figure 23:
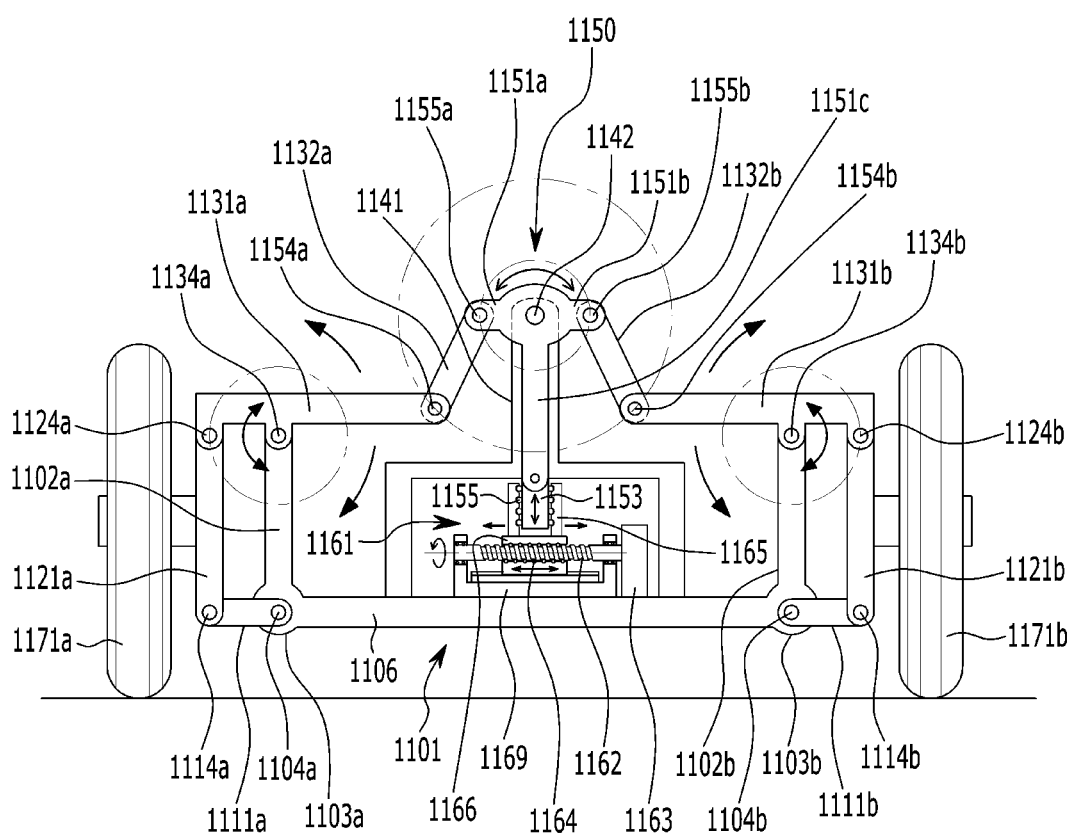
FIG. 23 is a schematic diagram of a tilting car frame according to a twelfth embodiment of the technology disclosed in the present specification.

FIG. 23 is a schematic diagram of a tilting car frame according to a twelfth embodiment of the technology disclosed in the present specification.

In the first to eleventh embodiments, a variable length lever link member whose length changes as the rotating member rotates is used, but in the twelfth embodiment, a fixed length lever link member having a fixed length may be used.

A tilting car frame according to the twelfth embodiment may include a lower center frame 1101, a first horizontal link member 1111*a*, a second horizontal link member 1111*b*, a first vertical link member 1121*a*, a second vertical link member 1121*b*, a first fixed length lever link member 1131*a*, a second fixed length lever link member 1131*b*, a first additional connecting link member 1132*a*, a second additional connecting link member 1132*b*, a rotation center axis support member 1141, a rotating member 1150 and a rotating shaft driving device 1161.

The lower center frame 1101 may include a first end 1103*a* located on the left and a second end 1103*b* located on the right with reference to FIG. 23, and may include a horizontal member 1106 that is elongated in the left and right direction. A first support member 1102*a* extending upward from the first end 1103*a* may be formed at the first end 1103*a*, and a second support member 1102*b* extending upward from the second end 1103*b* may be formed at the second end 1103*b*.

The right end of the first horizontal link member 1111*a* may be hinged to the first end 1103*a*. A through-hole may be formed at the first end 1103*a*, and a through-hole may also be formed at the right end of the first horizontal link member 1111*a*, and the first end 1103*a* and the first horizontal link member 1111*a* may be hingedly connected by a hinge shaft 1104*a* passing through the through-hole of the first end 1103*a* and the through-hole of the first horizontal link member 1111*a*. Accordingly, the first horizontal link member 1111*a* and the lower center frame 1101 can be rotated about the hinge shaft 1104*a*.

The left end of the second horizontal link member 1111*b* may be hinged to the second end 1103*b*. A through-hole may be formed at the second end 1103*b*, and a through-hole may also be formed at the left end of the second horizontal link member 1111*b*, and the second end 1103*b* and the second horizontal link member 1111*b* may be hingedly connected by a hinge shaft 1104*b* passing through the through-hole of the second end 1103*b* and the through-hole of the second horizontal link member 1111*b*. Accordingly, the second horizontal link member 1111*b* and the lower center frame 1101 can be rotated about the hinge shaft 1104*b*.

The lower end of the first vertical link member 1121*a* may be hinged to the left end of the first horizontal link member 1111*a*. A through-hole may be formed at the left end of the first horizontal link member 1111*a*, and a through-hole may also be formed at the lower end of the first vertical link member 1121*a*, and the first horizontal link member 1111*a* and the first vertical link member 1121*a* may be hingedly connected by the hinge shaft 1114*a* passing through the through-hole of the first horizontal link member 1111*a* and the through-hole of the first vertical link member 1121*a*. Accordingly, the first vertical link member 1121*a* and the first horizontal link member 1111*a* can rotate around the hinge shaft 1114*a*.

A first wheel 1171*a* may be connected to the first vertical link member 1121*a*, and the first wheel 1171*a* and the first vertical link member 1121*a* may be directly connected, and an intermediate configuration may exist between the first wheel 1171*a* and the first vertical link member 1121*a*.

A first shock absorbing device may be hingedly connected between the first vertical link member 1121*a* and the first support member 1102*a* to absorb vibration or shock transmitted from the ground.

The lower end of the second vertical link member 1121*b* may be hinged to the right end of the second horizontal link member 1111*b*. A through-hole may be formed at the right end of the second horizontal link member 1111*b*, and a through-hole may also be formed at the lower end of the second vertical link member 1121*b*, and the second horizontal link member 1111*b* and the second vertical link member 1121*b* may be hingedly connected by the hinge shaft 1114*b* passing through the through-hole of the second horizontal link member 1111*b* and the through-hole of the second vertical link member 1121*b*. Accordingly, the second vertical link member 1121b and the second horizontal link member 1111b can rotate around the hinge shaft 1114b.

A second wheel 1171b may be connected to the second vertical link member 1121b, and the second wheel 1171b and the second vertical link member 1121b may be directly connected, and an intermediate configuration may exist between the second wheel 1171b and the second vertical link member 1121b.

A second shock absorbing device may be hingedly connected between the second vertical link member 1121b and the second support member 1102b to absorb vibration or shock transmitted from the ground.

The rotation center axis support member 1141 may be a member extending upward from the center of the lower center frame 1101. A rotating member 1150 may be rotatably connected to the upper end of the rotation center axis support member 1141.

The first additional connecting link member 1132a may be hingedly connected to the right end of the first fixed length lever link member 1131a. An outer through-hole may be formed at the left end of the first fixed length lever link member 1131a, and a central through-hole may be formed at a location spaced a predetermined distance from the outer through-hole to the right, and an inner through-hole may be formed at the right end of the first additional connecting link member 1132a hingedly connected to the first fixed length lever link member 1131a. The distance between the outer through-hole and the center through-hole may be the same as the distance between the hinge shaft 1104a and the hinge shaft 1114a.

The first fixed length lever link member 1131a may be hinged to the upper end of the first vertical link member 1121a and the upper end of the first support member 1102a. Through-holes may be formed at the upper end of the first vertical link member 1121a and the upper end of the first support member 1102a, respectively. The first fixed length lever link member 1131a and the first vertical link member 1121a may be hingedly connected by the hinge shaft 1124a passing through the outer through-hole of the first fixed length lever link member 1131a and the through-hole formed at the upper end of the first vertical link member 1121a. In addition, the first fixed length lever link member 1131a and the first support member 1102a may be hingedly connected by the hinge shaft 1134a passing through the central through-hole of the first fixed length lever link member 1131a and the through-hole formed at an upper end of the first support member 1102a. Accordingly, the first fixed length lever link member 1131a and the first vertical link member 1121a can be rotated around the hinge shaft 1124a, and the first fixed length lever link member 1131a and the first support member 1102a can be rotated around the hinge shaft 1134a.

The second additional connecting link member 1132b may be hingedly connected to the right end of the second fixed length lever link member 1131b. An outer through-hole may be formed at the left end of the second fixed length lever link member 1131b, and a central through-hole may be formed at a location spaced a predetermined distance from the outer through-hole to the right, and an inner through-hole may be formed at the right end of the second additional connecting link member 1132b hingedly connected to the second fixed length lever link member 1131b. The distance between the outer through-hole and the center through-hole may be the same as the distance between the hinge shaft 1104b and the hinge shaft 1114b.

The second fixed length lever link member 1131b may be hinged to the upper end of the second vertical link member 1121b and the upper end of the second support member 1102b. Through-holes may be formed at the upper end of the second vertical link member 1121b and the upper end of the second support member 1102b, respectively. The second fixed length lever link member 1131b and the second vertical link member 1121b may be hingedly connected by the hinge shaft 1124b passing through the outer through-hole of the second fixed length lever link member 1131b and the through-hole formed at the upper end of the second vertical link member 1121b. In addition, the second fixed length lever link member 1131b and the second support member 1102b may be hingedly connected by the hinge shaft 1134b passing through the central through-hole of the second fixed length lever link member 1131b and the through-hole formed at an upper end of the second support member 1102b. Accordingly, the second fixed length lever link member 1131b and the second vertical link member 1121b can be rotated around the hinge shaft 1124b, and the second fixed length lever link member 1131b and the second support member 1102b can be rotated around the hinge shaft 1134b.

The rotating member 1150 may be connected to be rotatable about the rotation center axis 1142 of the rotation center axis support member 1141. The rotation center axis 1142 may be fixedly coupled to the rotation center axis support member 1141, and the rotating member 1150 may be rotatably connected to the rotation center axis 1142, and alternatively, the rotation center axis 1142 may be fixedly coupled to the central portion of the rotating member 1150 to rotate together with the rotating member 1150.

The rotating member 1150 may include a first extension member 1151a extending to the left and a second extension member 1151b extending to the right. The first extension member 1151a may be hinged to the end of the first additional connecting link member 1132a, and the second extension member 1151b may be hinged to the end of the second additional connecting link member 1132b. In addition, the rotating member 1150 may include a third extension member 1151c extending downward, and a rotating member-auxiliary link member 1153 may be hingedly connected to an end of the third extension member 1151c.

A through-hole may be formed at the end of the first extension member 1151a, and the first additional connecting link member 1132a and the first extension member 1151a may be hingedly connected by the hinge shaft 1154a passing through the inner through-hole of the first additional connecting link member 1132a and the through-hole formed at the end of the first extension member 1151a. Accordingly, the first additional connecting link member 1132a and the first extension member 1151a can be rotated around the hinge shaft 1154a.

A through-hole may be formed at the end of the second extension member 1151b, and the second additional connecting link member 1132b and the second extension member 1151b may be hingedly connected by the hinge shaft 1154b passing through the inner through-hole of the second additional connecting link member 1132b and the through-hole formed at the end of the second extension member 1151b. Accordingly, the second additional connecting link member 1132b and the second extension member 1151b can be rotated around the hinge shaft 1154b.

The rotating shaft driving device 1161 may be installed on the lower center frame 101 and is a device that rotates the rotating member 1150 rotatably coupled to the rotation center axis 1142. The rotating shaft driving device 1161 may include a worm gear 1162, a worm gear support member

1169, a ball screw nut 1166, a rotating member-auxiliary link member insertion part 1165 and a lower drive motor 1163.

The worm gear 1162 is rotatably connected to the worm gear support member 1169 located on the horizontal member 1106. The ball screw nut 1166 surrounds the worm gear 1162 along the axial direction, and the balls 1164 are rotatably positioned on the inner circumferential surface. The balls 1164 are located between the teeth of the worm gear 1162 so that the ball screw nut 1166 moves linearly along the axial direction of the worm gear 1162 according to the rotation of the worm gear 1162. A rotating member-auxiliary link member insertion part 1165 is formed on the upper surface of the ball screw nut 1166, and the rotating member-auxiliary link member 1153 is inserted into the rotating member-auxiliary link member insertion part 1165. Balls 1155 are positioned to be rotatable on the inner surface of the rotating member-auxiliary link member insertion part 1165, whereby the rotating member-auxiliary link member 1153 contacts the balls 1155, and linear motion in the longitudinal direction of the rotating member-auxiliary link member insertion part 1165 is possible without friction.

When the lower drive motor 1163 rotates the worm gear 1162, the ball screw nut 1166 performs a linear motion by the rotation of the worm gear 1162, whereby the rotating member-auxiliary link member insertion part 1165 fixed to the ball screw nut 1166 also performs a linear motion. According to the linear motion of the rotating member-auxiliary link member insertion part 1165, the rotating member-auxiliary link member 1153 may come out of the rotating member-auxiliary link member insertion part 1165 or enter the rotating member-auxiliary link member insertion part 1165, and by the left-right linear motion of the ball screw nut 1166 and the up-down linear motion of the rotating member-auxiliary link member 1153, the rotating member 1150 hinged to the rotating member-auxiliary link member 1153 can rotate around the rotation center axis 1142.

In this embodiment, as a rotating shaft driving device 1161, a configuration including a worm gear 1162, a worm gear support member 1169, a ball screw nut 1166, a rotating member-auxiliary link member insertion part 1165 and a lower drive motor 1163 is taken as an example, and as a rotating member 1150a, a configuration including a third extension member 1151c and a rotating member-auxiliary link member 1153 is taken as an example, but they may be replaced by various configurations described in other embodiments.

As described in the first embodiment, a rotary shaft drive motor may be installed on the rotation center axis support member 1141 and rotate the rotation center axis 1142 fixedly coupled to the central portion of the rotating member 1150 to rotate the rotating member 1150.

As described in the fifth embodiment, the rotating member 1150 may include a third extension member extending downward of the rotating member 1150, and the third extension member may have a curved surface having a predetermined curvature in its longitudinal section, on which teeth may be formed. The worm gear 1162 may be rotatably connected to the worm gear support member 1169 located on the horizontal member 1106 and may be engaged with the teeth of the third extension member. When the lower drive motor 1163 may rotate the worm gear 1162, the rotating member 1150 connected to the third extension member engaged with the worm gear 1162 rotates around the rotation center axis 1142.

As described in the sixth embodiment, the rotating member 1150 may include a third extension member extending downward of the rotating member 1150, and the third extension member may have a curved surface having a predetermined curvature in its longitudinal section, on which teeth may be formed. The worm gear 1162 may be rotatably connected to the worm gear support member 1169 located on the horizontal member 1106 and the ball screw nut 1166 may moves linearly along the axial direction of the worm gear 1162 according to the rotation of the worm gear 1162. Teeth may be formed on the upper surface of the ball screw nut 1166 and may be engaged with the teeth of the third extension member, and when the lower drive motor 1163 rotates the worm gear 1162, the ball screw nut 1166 moves linearly by the rotation of the worm gear 1162, whereby the third extension member engaged with the ball screw nut 1166 rotates, and the rotating member 1150 connected to the third extension member rotates around the rotation center axis 1142.

As described in the eighth embodiment, the pinion gear may be rotatably connected on the horizontal member 1106, and the lower drive motor 1163 may rotate the pinion gear. The rack gear may be connected to the rack gear support member located on the horizontal member 1106 so that the rack gear moves linearly on the rack gear support member, and may be engaged with the pinion gear. A rotating member-auxiliary link member insertion part 1165 may be formed on the upper surface of the pinion gear, and the rotating member-auxiliary link member 1153 may be inserted into the rotating member-auxiliary link member insertion part 1165. Balls 1155 may be positioned to be rotatable on the inner surface of the rotating member-auxiliary link member insertion part 1165, whereby the rotating member-auxiliary link member 1153 may be in contact with the balls 1155 and perform linear motion in the longitudinal direction of the rotating member-auxiliary link member insertion part 1165 without friction. When the lower drive motor 1163 rotates the pinion gear, the rack gear performs a linear motion by the rotation of the pinion gear, whereby the rotating member-auxiliary link member insertion part 1165 fixed to the rack gear also performs a linear motion. According to the linear motion of the rotating member-auxiliary link member insertion part 1165, the rotating member-auxiliary link member 1153 may come out of the rotating member-auxiliary link member insertion part 1165 or enter the rotating member-auxiliary link member insertion part 1165, and by the left-right linear motion of the rack gear and the up-down linear motion of the rotating member-auxiliary link member 1153, the rotating member 1150 hinged to the rotating member-auxiliary link member 1153 can rotate around the rotation center axis 1142.

As described in the ninth embodiment, the rotating member 1150 may include a third extension member extending downward of the rotating member 1150, and the third extension member may have a curved surface having a predetermined curvature in its longitudinal section, on which teeth may be formed. The circular gear may be rotatably connected to the horizontal member 1106, and the lower drive motor 1163 may rotate the circular gear. The circular gear may be engaged with the teeth of the third extension member. When the lower drive motor 1163 rotates the circular gear, the rotating member 1150 connected to the third extension member engaged with the circular gear rotates around the rotation center axis 1142.

When the tilting car is turning, the rotating shaft driving device 1161 may rotate the rotating member 1150 so that the longitudinal section of the third extension member 1151c of the rotating member 1150, which is connected to the rotating member-auxiliary link member 1153, faces the outside of the turning radius.

For example, in case of rotating the rotating member 1150 counterclockwise, the first additional connecting link member 1132a is pulled downward, whereby the first fixed length lever link member 1131a is inclined so that its right end faces downward to the right. In addition, the second additional connecting link member 1132b is pulled upward, whereby the second fixed length lever link member 1131b is inclined so that its left end faces in the upper left direction.

The first fixed length lever link member 1131a performs a lever motion around the hinge shaft 1134a to which the first fixed length lever link member 1131a and the first support member 1102a are connected, and the second fixed length lever link member 1131b performs a lever motion around the hinge shaft 1134b to which the second fixed length lever link member 1131b and the second support member 1102b are connected.

By such a lever motion, the first vertical link member 1121a rises, and the second vertical link member 1121b descends. Since the first wheel 1171a connected to the first vertical link member 1121a and the second wheel 1171b connected to the second vertical link member 1121b remain in contact with the ground, eventually the first end 1103a of the lower center frame 1101 is inclined downward, and the second end 1103b of the lower center frame 1101 is raised upward, and the vehicle body is inclined toward the center of the turning radius.

Particularly, in the first additional connecting link member 1132a, since the distance between the hinge shaft 1155a of the inner through-hole and the hinge shaft 1134a of the central through-hole is larger than the distance between the hinge shaft 1124a of the outer through-hole and the hinge shaft 1134a of the central through-hole, the first vertical link member 1121a can be raised with a small force. Likewise, in the second additional connecting link member 1132b, since the distance between the hinge shaft 1155b of the inner through-hole and the hinge shaft 1134b of the central through-hole is larger than the distance between the hinge shaft 1124b of the outer through-hole and the hinge shaft 1134b of the central through-hole, the second vertical link member 1121b can be lowered with a small force.

In addition, the third extension member 1151c is extended to the lower side of the rotating member 1150 and the third extension member 1153 is moved to rotate the rotating member 1150, whereby a leverage effect is generated where the rotation center axis 1142 becomes the fulcrum of the lever. Accordingly, it is possible to control the rotation of the rotating member 1150 with a small force.

Figure 24:
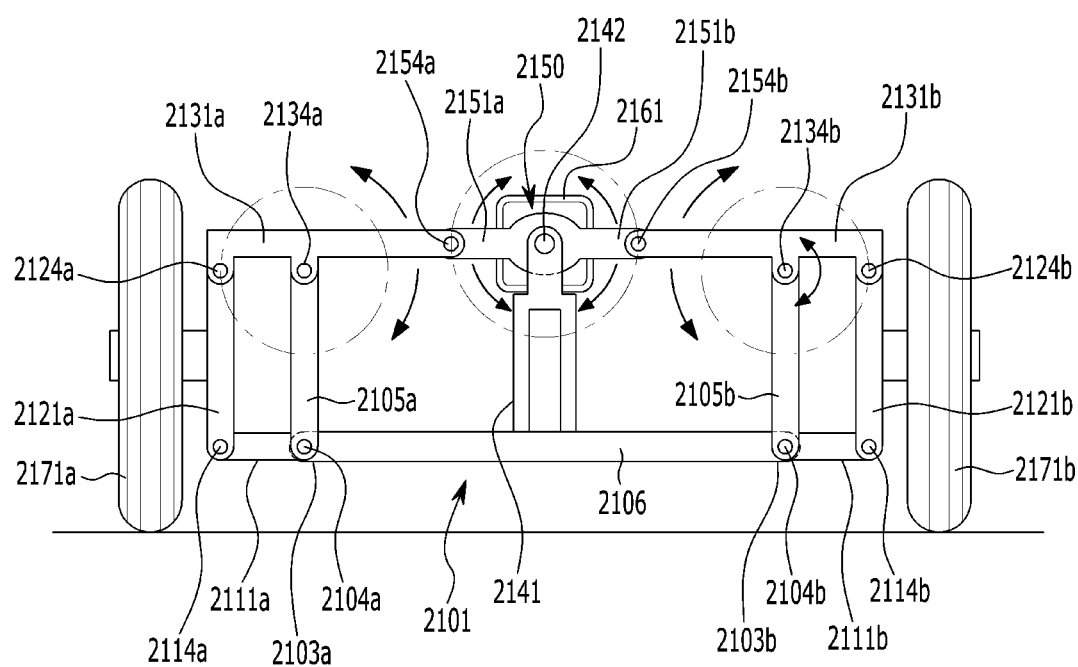
FIG. 24 is a schematic diagram of a tilting car frame according to a thirteenth embodiment of the technology disclosed in the present specification.

FIG. 24 is a schematic diagram of a tilting car frame according to a thirteenth embodiment of the technology disclosed in the present specification.

A tilting car frame according to the thirteenth embodiment may include a lower center frame 2101, a first support link member 2105a, a second support link member 2105b, a first horizontal link member 2111a, a second horizontal link member 2111b, a first vertical link member 2121a, a second vertical link member 2121b, a first fixed length lever link member 2131a, a second fixed length lever link member 2131b, a rotation center axis support member 2141, a rotating member 2150 and a rotary shaft drive motor 2161.

The lower center frame 2101 may include a first end 2103a located on the left and a second end 2103b located on the right with reference to FIG. 24, and may include a horizontal member 2106 that is elongated in the left and right direction.

The lower end of the first support link member 2105a may be hinged to the first end 2103a. A through-hole may be formed at the first end 2103a, and a through-hole may also be formed at the lower end of the first support link member 2105a, and the first end 2103a and the first support link member 2105a may be hingedly connected by a hinge shaft 2104a passing through the through-hole of the first end 2103a and the through-hole of the first support link member 2105a. Accordingly, the first support link member 2105a and the horizontal member 2106 can be rotated about the hinge shaft 2104a.

The lower end of the second support link member 2105b may be hinged to the second end 2103a. A through-hole may be formed at the second end 2103b, and a through-hole may also be formed at the lower end of the second support link member 2105b, and the second end 2103b and the second support link member 2105b may be hingedly connected by a hinge shaft 2104b passing through the through-hole of the second end 2103b and the through-hole of the second support link member 2105b. Accordingly, the second support link member 2105b and the horizontal member 2106 can be rotated about the hinge shaft 2104b.

The right end of the first horizontal link member 2111a may be hinged to the first end 2103a. A through-hole may be formed at the first end 2103a, and a through-hole may also be formed at the right end of the first horizontal link member 2111a, and the first end 2103a and the first horizontal link member 2111a may be hingedly connected by a hinge shaft 2104a passing through the through-hole of the first end 2103a and the through-hole of the first horizontal link member 2111a. Accordingly, the first horizontal link member 2111a and the lower center frame 2101 can be rotated about the hinge shaft 2104a.

The left end of the second horizontal link member 2111b may be hinged to the second end 2103b. A through-hole may be formed at the second end 2103b, and a through-hole may also be formed at the left end of the second horizontal link member 2111b, and the second end 2103b and the second horizontal link member 2111b may be hingedly connected by a hinge shaft 2104b passing through the through-hole of the second end 2103b and the through-hole of the second horizontal link member 2111b. Accordingly, the second horizontal link member 2111b and the lower center frame 2101 can be rotated about the hinge shaft 2104b.

The lower end of the first vertical link member 2121a may be hinged to the left end of the first horizontal link member 2111a. A through-hole may be formed at the left end of the first horizontal link member 2111a, and a through-hole may also be formed at the lower end of the first vertical link member 2121a, and the first horizontal link member 2111a and the first vertical link member 2121a may be hingedly connected by the hinge shaft 2114a passing through the through-hole of the first horizontal link member 2111a and the through-hole of the first vertical link member 2121a. Accordingly, the first vertical link member 2121a and the first horizontal link member 2111a can rotate around the hinge shaft 2114a.

A first wheel 2171a may be connected to the first vertical link member 2121a, and the first wheel 2171a and the first vertical link member 2121a may be directly connected, and an intermediate configuration may exist between the first wheel 2171a and the first vertical link member 2121a.

A first shock absorbing device may be hingedly connected between the first vertical link member 2121a and the first support link member 2105a to absorb vibration or shock transmitted from the ground.

The lower end of the second vertical link member 2121b may be hinged to the right end of the second horizontal link member 2111b. A through-hole may be formed at the right end of the second horizontal link member 2111b, and a through-hole may also be formed at the lower end of the second vertical link member 2121b, and the second horizontal link member 2111b and the second vertical link member 2121b may be hingedly connected by the hinge shaft 2114b passing through the through-hole of the second horizontal link member 2111b and the through-hole of the second vertical link member 2121b. Accordingly, the second vertical link member 2121b and the second horizontal link member 2111b can rotate around the hinge shaft 2114b.

A second wheel 2171b may be connected to the second vertical link member 2121b, and the second wheel 2171b and the second vertical link member 2121b may be directly connected, and an intermediate configuration may exist between the second wheel 2171b and the second vertical link member 2121b.

A second shock absorbing device may be hingedly connected between the second vertical link member 2121b and the second support link member 2105b to absorb vibration or shock transmitted from the ground.

The rotation center axis support member 2141 may be a member extending upward from the center of the lower center frame 2101. A rotating member 2150 may be rotatably connected to the upper end of the rotation center axis support member 2141.

An outer through-hole may be formed at the left end of the first fixed length lever link member 2131a, and an inner through-hole may be formed at the right end of the first fixed length lever link member 2131a, and a central through-hole may be formed between the outer through-hole and the inner through-hole. The distance between the outer through-hole and the center through-hole may be the same as the distance between the hinge shaft 2104a and the hinge shaft 2114a.

The first fixed length lever link member 2131a may be hinged to the upper end of the first vertical link member 2121a and the upper end of the first support link member 2105a. Through-holes may be formed at the upper end of the first vertical link member 2121a and the upper end of the first support link member 2105a, respectively. The first fixed length lever link member 2131a and the first vertical link member 2121a may be hingedly connected by the hinge shaft 2124a passing through the outer through-hole of the first fixed length lever link member 2131a and the through-hole formed at the upper end of the first vertical link member 2121a. In addition, the first fixed length lever link member 2131a and the first support link member 2105a may be hingedly connected by the hinge shaft 2134a passing through the central through-hole of the first fixed length lever link member 2131a and the through-hole formed at an upper end of the first support link member 2105a. Accordingly, the first fixed length lever link member 2131a and the first vertical link member 2121a can be rotated around the hinge shaft 2124a, and the first fixed length lever link member 2131a and the first support link member 2105a can be rotated around the hinge shaft 2134a.

An outer through-hole may be formed at the right end of the second fixed length lever link member 2131b, and an inner through-hole may be formed at the left end of the second fixed length lever link member 2131b, and a central through-hole may be formed between the outer through-hole and the inner through-hole. The distance between the outer through-hole and the center through-hole may be the same as the distance between the hinge shaft 2104b and the hinge shaft 2114b.

The second fixed length lever link member 2131b may be hinged to the upper end of the second vertical link member 2121b and the upper end of the second support link member 2105b. Through-holes may be formed at the upper end of the second vertical link member 2121b and the upper end of the second support link member 2105b, respectively. The second fixed length lever link member 2131b and the second vertical link member 2121b may be hingedly connected by the hinge shaft 2124b passing through the outer through-hole of the second fixed length lever link member 2131b and the through-hole formed at the upper end of the second vertical link member 2121b. In addition, the second fixed length lever link member 2131b and the second support link member 2105b may be hingedly connected by the hinge shaft 2134b passing through the central through-hole of the second fixed length lever link member 2131b and the through-hole formed at an upper end of the second support link member 2105b. Accordingly, the second fixed length lever link member 2131b and the second vertical link member 2121b can be rotated around the hinge shaft 2124b, and the second fixed length lever link member 2131b and the second support link member 2105b can be rotated around the hinge shaft 2134b.

The rotating member 2150 may be connected to be rotatable about the rotation center axis 2142 of the rotation center axis support member 2141. The rotation center axis 2142 may be fixedly coupled to the central portion of the rotating member 2150 to rotate together with the rotating member 2150, and alternatively, the rotation center axis 2142 may be fixedly coupled to the rotation center axis support member 2141, and the rotating member 2150 may be hinged to the rotation center axis 2142.

The rotating member 2150 may include a first extension member 2151a extending to the left and a second extension member 2151b extending to the right. The first extension member 2151a may be hinged to the end of first fixed length lever link member 2131a, and the second extension member 2151b may be hinged to the end of the second fixed length lever link member 2131b.

A through-hole may be formed at the end of the first extension member 2151a, and the first fixed length lever link member 2131a and the first extension member 2151a may be hingedly connected by the hinge shaft 2154a passing through the first fixed length lever link member 2131a and the through-hole formed at the end of the first extension member 2151a. Accordingly, the first fixed length lever link member 2131a and the first extension member 2151a can be rotated around the hinge shaft 2154a.

A through-hole may be formed at the end of the second extension member 2151b, and the second fixed length lever link member 2131b and the second extension member 2151b may be hingedly connected by the hinge shaft 2154b passing through the second fixed length lever link member 2131a and the through-hole formed at the end of the second extension member 2151b. Accordingly, the second fixed length lever link member 2131b and the second extension member 2151b can be rotated around the hinge shaft 2154b.

The rotary shaft drive motor 2161 may be installed on the rotation center axis support member 2141, and the rotating member 2150 may be rotated by rotating the rotation center axis 2142 fixedly coupled to the central portion of the rotating member 2150.

In this embodiment, a configuration in which the rotary shaft drive motor 2161 directly rotates the rotating member 2150 as the rotating shaft driving device 2161 is exemplified, but may be replaced with various configurations described in other embodiments.

As described in the fifth embodiment, the rotating member may include a third extension member extending downward of the rotating member, and the third extension member may have a curved surface having a predetermined curvature in its longitudinal section, on which teeth may be formed. The worm gear may be rotatably connected to the worm gear support member located on the horizontal member 2106 and may be engaged with the teeth of the third extension member. When the lower drive motor may rotate the worm gear, the rotating member connected to the third extension member engaged with the worm gear rotates around the rotation center axis.

As described in the sixth embodiment, the rotating member may include a third extension member extending downward of the rotating member, and the third extension member may have a curved surface having a predetermined curvature in its longitudinal section, on which teeth may be formed. The worm gear may be rotatably connected to the worm gear support member located on the horizontal member and the ball screw nut may moves linearly along the axial direction of the worm gear according to the rotation of the worm gear. Teeth may be formed on the upper surface of the ball screw nut and may be engaged with the teeth of the third extension member, and when the lower drive motor rotates the worm gear, the ball screw nut moves linearly by the rotation of the worm gear, whereby the third extension member engaged with the ball screw nut rotates, and the rotating member connected to the third extension member rotates around the rotation center axis.

As described in the seventh embodiment, the rotating member may include a third extension member extending downward, and a rotating member-auxiliary link member may be hingedly connected to an end of the third extension member. The worm gear may be rotatably connected to the worm gear support member located on the horizontal member, and the ball screw nut may surround the worm gear along the axial direction, and the balls may be rotatably positioned on the inner circumferential surface. The balls may be located between the teeth of the worm gear so that the ball screw nut moves linearly along the axial direction of the worm gear according to the rotation of the worm gear. The rotating member-auxiliary link member insertion part may be formed on the upper surface of the ball screw nut, and the rotating member-auxiliary link member may be inserted into the rotating member-auxiliary link member insertion part. Balls may be positioned to be rotatable on the inner surface of the rotating member-auxiliary link member insertion part, whereby the rotating member-auxiliary link member contacts the balls, and linear motion in the longitudinal direction of the rotating member-auxiliary link member insertion part is possible without friction. When the lower drive motor rotates the worm gear, the ball screw nut performs a linear motion by the rotation of the worm gear, whereby the rotating member-auxiliary link member insertion part fixed to the ball screw nut also performs a linear motion. According to the linear motion of the rotating member-auxiliary link member insertion part, the rotating member-auxiliary link member may come out of the rotating member-auxiliary link member insertion part or enter the rotating member-auxiliary link member insertion part, and by the left-right linear motion of the ball screw nut and the up-down linear motion of the rotating member-auxiliary link member, the rotating member hinged to the rotating member-auxiliary link member can rotate around the rotation center axis.

As described in the eighth embodiment, the pinion gear may be rotatably connected on the horizontal member, and the lower drive motor may rotate the pinion gear. The rack gear may be connected to the rack gear support member located on the horizontal member so that the rack gear moves linearly on the rack gear support member, and may be engaged with the pinion gear. A rotating member-auxiliary link member insertion part may be formed on the upper surface of the pinion gear, and the rotating member-auxiliary link member 1153 may be inserted into the rotating member-auxiliary link member insertion part. Balls may be positioned to be rotatable on the inner surface of the rotating member-auxiliary link member insertion part, whereby the rotating member-auxiliary link member may be in contact with the balls and perform linear motion in the longitudinal direction of the rotating member-auxiliary link member insertion part without friction. When the lower drive motor rotates the pinion gear, the rack gear performs a linear motion by the rotation of the pinion gear, whereby the rotating member-auxiliary link member insertion part fixed to the rack gear also performs a linear motion. According to the linear motion of the rotating member-auxiliary link member insertion part, the rotating member-auxiliary link member may come out of the rotating member-auxiliary link member insertion part or enter the rotating member-auxiliary link member insertion part, and by the left-right linear motion of the rack gear and the up-down linear motion of the rotating member-auxiliary link member, the rotating member hinged to the rotating member-auxiliary link member can rotate around the rotation center axis.

As described in the ninth embodiment, the rotating member may include a third extension member extending downward of the rotating member, and the third extension member may have a curved surface having a predetermined curvature in its longitudinal section, on which teeth may be formed. The circular gear may be rotatably connected to the horizontal member, and the lower drive motor may rotate the circular gear. The circular gear may be engaged with the teeth of the third extension member. When the lower drive motor rotates the circular gear, the rotating member connected to the third extension member engaged with the circular gear rotates around the rotation center axis.

In the above embodiments, the third extension member is extended to the lower side of the rotating member 2150, and the rotating member 2150 is rotated by moving the third extension member, whereby a leverage effect is generated with the rotation center axis 2142 as the fulcrum of the lever. Accordingly, it is possible to control the rotation of the rotating member 2150 with a small force.

When the tilting car is turning, the rotary shaft drive motor 2161 may rotate the rotating member 2150 counterclockwise. As the rotating member 2150 rotates counterclockwise, the first fixed length lever link member 2131*a* is pulled downward to the right and tilted. In addition, the second fixed length lever link member 2131*b* is pulled in the upper left direction and tilted.

The first fixed length lever link member 2131*a* performs a lever motion around the hinge shaft 2134*a* to which the first fixed length lever link member 2131*a* and the first support link member 2105*a* are connected, and the second fixed length lever link member 2131*b* performs a lever motion around the hinge shaft 2134*b* to which the second fixed length lever link member 2131*b* and the second support link member 2105*b* are connected.

By such a lever motion, the first vertical link member 2121*a* rises, and the second vertical link member 2121*b* descends. Since the first wheel 2171*a* connected to the first vertical link member 2121*a* and the second wheel 2171*b* connected to the second vertical link member 2121*b* remain in contact with the ground, eventually the first end 2103a of the lower center frame 2101 is inclined downward, and the second end 2103b of the lower center frame 2101 is raised upward, and the vehicle body is inclined toward the center of the turning radius.

Particularly, in the first fixed length lever link member 2131a, since the distance between the hinge shaft 2154a of the inner through-hole and the hinge shaft 2134a of the central through-hole is larger than the distance between the hinge shaft 2124a of the outer through-hole and the hinge shaft 2134a of the central through-hole, the first vertical link member 2121a can be raised with a small force. Likewise, in the second fixed length lever link member 2131b, since the distance between the hinge shaft 2154b of the inner through-hole and the hinge shaft 2134b of the central through-hole is larger than the distance between the hinge shaft 2124b of the outer through-hole and the hinge shaft 2134b of the central through-hole, the second vertical link member 2121b can be lowered with a small force.

Figure 25:
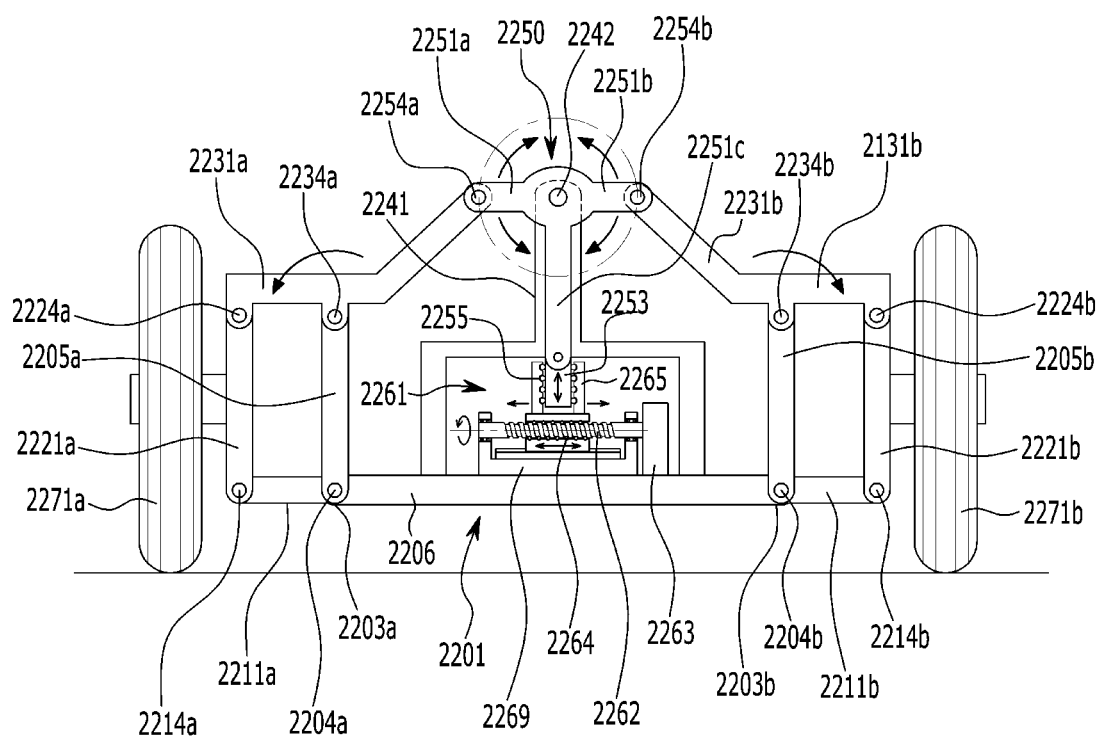
FIG. 25 shows a configuration in which a bent fixed length lever link member is used in the tilting car frame according to the thirteenth embodiment of the technology disclosed in the present specification.

FIG. 25 shows a configuration in which a bent fixed length lever link member is used in the tilting car frame according to the thirteenth embodiment of the technology disclosed in the present specification.

A tilting car frame according to the thirteenth embodiment may include a lower center frame 2201, a first support link member 2205a, a second support link member 2205b, a first horizontal link member 2211a, a second horizontal link member 2211b, a first vertical link member 2221a, a second vertical link member 2221b, a first fixed length lever link member 2231a, a second fixed length lever link member 2231b, a rotation center axis support member 2241, a rotating member 2250 and a rotating shaft driving device 2261.

The lower center frame 2201 may include a first end 2203a located on the left and a second end 2203b located on the right with reference to FIG. 25, and may include a horizontal member 2206 that is elongated in the left and right direction.

The lower end of the first support link member 2205a may be hinged to the first end 2203a. A through-hole may be formed at the first end 2203a, and a through-hole may also be formed at the lower end of the first support link member 2205a, and the first end 2203a and the first support link member 2205a may be hingedly connected by a hinge shaft 2204a passing through the through-hole of the first end 2203a and the through-hole of the first support link member 2205a. Accordingly, the first support link member 2205a and the horizontal member 2206 can be rotated about the hinge shaft 2204a.

The lower end of the second support link member 2205b may be hinged to the second end 2203a. A through-hole may be formed at the second end 2203b, and a through-hole may also be formed at the lower end of the second support link member 2205b, and the second end 2203b and the second support link member 2205b may be hingedly connected by a hinge shaft 2204b passing through the through-hole of the second end 2203b and the through-hole of the second support link member 2205b. Accordingly, the second support link member 2205b and the horizontal member 2206 can be rotated about the hinge shaft 2204b.

The right end of the first horizontal link member 2211a may be hinged to the first end 2203a. A through-hole may be formed at the first end 2203a, and a through-hole may also be formed at the right end of the first horizontal link member 2211a, and the first end 2203a and the first horizontal link member 2211a may be hingedly connected by a hinge shaft 2204a passing through the through-hole of the first end 2203a and the through-hole of the first horizontal link member 2211a. Accordingly, the first horizontal link member 2211a and the lower center frame 2201 can be rotated about the hinge shaft 2204a.

The left end of the second horizontal link member 2211b may be hinged to the second end 2203b. A through-hole may be formed at the second end 2203b, and a through-hole may also be formed at the left end of the second horizontal link member 2211b, and the second end 2203b and the second horizontal link member 2211b may be hingedly connected by a hinge shaft 2204b passing through the through-hole of the second end 2203b and the through-hole of the second horizontal link member 2211b. Accordingly, the second horizontal link member 2211b and the lower center frame 2201 can be rotated about the hinge shaft 2204b.

The lower end of the first vertical link member 2221a may be hinged to the left end of the first horizontal link member 2211a. A through-hole may be formed at the left end of the first horizontal link member 2211a, and a through-hole may also be formed at the lower end of the first vertical link member 2221a, and the first horizontal link member 2211a and the first vertical link member 2221a may be hingedly connected by the hinge shaft 2214a passing through the through-hole of the first horizontal link member 2211a and the through-hole of the first vertical link member 2221a. Accordingly, the first vertical link member 2221a and the first horizontal link member 2211a can rotate around the hinge shaft 2214a.

A first wheel 2271a may be connected to the first vertical link member 2221a, and the first wheel 2271a and the first vertical link member 2221a may be directly connected, and an intermediate configuration may exist between the first wheel 2271a and the first vertical link member 2221a.

A first shock absorbing device may be hingedly connected between the first vertical link member 2221a and the first support link member 2205a to absorb vibration or shock transmitted from the ground.

The lower end of the second vertical link member 2221b may be hinged to the right end of the second horizontal link member 2211b. A through-hole may be formed at the right end of the second horizontal link member 2211b, and a through-hole may also be formed at the lower end of the second vertical link member 2221b, and the second horizontal link member 2211b and the second vertical link member 2221b may be hingedly connected by the hinge shaft 2214b passing through the through-hole of the second horizontal link member 2211b and the through-hole of the second vertical link member 2221b. Accordingly, the second vertical link member 2221b and the second horizontal link member 2211b can rotate around the hinge shaft 2214b.

A second wheel 2271b may be connected to the second vertical link member 2221b, and the second wheel 2271b and the second vertical link member 2221b may be directly connected, and an intermediate configuration may exist between the second wheel 2271b and the second vertical link member 2221b.

A second shock absorbing device may be hingedly connected between the second vertical link member 2221b and the second support link member 2205b to absorb vibration or shock transmitted from the ground.

The rotation center axis support member 2241 may be a member extending upward from the center of the lower center frame 2201. A rotating member 2250 may be rotatably connected to the upper end of the rotation center axis support member 2241.

An outer through-hole may be formed at the left end of the first fixed length lever link member 2231a, and an inner through-hole may be formed at the right end of the first fixed length lever link member 2231a, and a central through-hole may be formed between the outer through-hole and the inner through-hole. The distance between the outer through-hole and the center through-hole may be the same as the distance between the hinge shaft 2204a and the hinge shaft 2214a.

The first fixed length lever link member 2231a may be hinged to the upper end of the first vertical link member 2221a and the upper end of the first support link member 2205a. Through-holes may be formed at the upper end of the first vertical link member 2221a and the upper end of the first support link member 2205a, respectively. The first fixed length lever link member 2231a and the first vertical link member 2221a may be hingedly connected by the hinge shaft 2224a passing through the outer through-hole of the first fixed length lever link member 2231a and the through-hole formed at the upper end of the first vertical link member 2221a. In addition, the first fixed length lever link member 2231a and the first support link member 2205a may be hingedly connected by the hinge shaft 2234a passing through the central through-hole of the first fixed length lever link member 2231a and the through-hole formed at an upper end of the first support link member 2205a. Accordingly, the first fixed length lever link member 2231a and the first vertical link member 2221a can be rotated around the hinge shaft 2224a, and the first fixed length lever link member 2231a and the first support link member 2205a can be rotated around the hinge shaft 2234a.

An outer through-hole may be formed at the right end of the second fixed length lever link member 2231b, and an inner through-hole may be formed at the left end of the second fixed length lever link member 2231b, and a central through-hole may be formed between the outer through-hole and the inner through-hole. The distance between the outer through-hole and the center through-hole may be the same as the distance between the hinge shaft 2204b and the hinge shaft 2214b.

The second fixed length lever link member 2231b may be hinged to the upper end of the second vertical link member 2221b and the upper end of the second support link member 2205b. Through-holes may be formed at the upper end of the second vertical link member 2221b and the upper end of the second support link member 2205b, respectively. The second fixed length lever link member 2231b and the second vertical link member 2221b may be hingedly connected by the hinge shaft 2224b passing through the outer through-hole of the second fixed length lever link member 2231b and the through-hole formed at the upper end of the second vertical link member 2221b. In addition, the second fixed length lever link member 2231b and the second support link member 2205b may be hingedly connected by the hinge shaft 2234b passing through the central through-hole of the second fixed length lever link member 2231b and the through-hole formed at an upper end of the second support link member 2205b. Accordingly, the second fixed length lever link member 2231b and the second vertical link member 2221b can be rotated around the hinge shaft 2224b, and the second fixed length lever link member 2231b and the second support link member 2205b can be rotated around the hinge shaft 2234b.

The rotating member 2250 may be connected to be rotatable about the rotation center axis 2242 of the rotation center axis support member 2241. The rotation center axis 2242 may be fixedly coupled to the central portion of the rotating member 2250 to rotate together with the rotating member 2250, and alternatively, the rotation center axis 2242 may be fixedly coupled to the rotation center axis support member 2241, and the rotating member 2250 may be hinged to the rotation center axis 2242.

The rotating member 2250 may include a first extension member 2251a extending to the left and a second extension member 2251b extending to the right. The first extension member 2251a may be hinged to the end of first fixed length lever link member 2231a, and the second extension member 2251b may be hinged to the end of the second fixed length lever link member 2231b. Further, the rotating member 2250 may include a third extension member 2251c extending downward, and a rotating member-auxiliary link member 2253 may be hingedly connected to an end of the third extension member 2251c.

A through-hole may be formed at the end of the first extension member 2251a, and the first fixed length lever link member 2231a and the first extension member 2251a may be hingedly connected by the hinge shaft 2254a passing through the first fixed length lever link member 2231a and the through-hole formed at the end of the first extension member 2251a. Accordingly, the first fixed length lever link member 2231a and the first extension member 2251a can be rotated around the hinge shaft 2254a.

A through-hole may be formed at the end of the second extension member 2251b, and the second fixed length lever link member 2231b and the second extension member 2251b may be hingedly connected by the hinge shaft 2254b passing through the second fixed length lever link member 2231a and the through-hole formed at the end of the second extension member 2251b. Accordingly, the second fixed length lever link member 2231b and the second extension member 2251b can be rotated around the hinge shaft 2254b.

The first fixed length lever link member 2231a may be formed to be bent at a predetermined angle between the hinge shaft 2254a of the inner through-hole and the hinge shaft 2234a of the central through-hole. In addition, the second fixed length lever link member 2231b may also be formed to be bent at a predetermined angle between the hinge shaft 2254b of the inner through-hole and the hinge shaft 2234b of the central through-hole. In FIG. 25, a configuration in which the first fixed length lever link member 2231a and the second fixed length lever link member 2231b are bent once is shown. This configuration makes it possible to increase The distance between the hinge shaft 2254a of the inner through-hole of the first fixed length lever link member 2231a and the hinge shaft 2234a of the central through-hole and the distance between the hinge shaft 2254b of the inner through-hole of second fixed length lever link member 2231b and the hinge shaft 2234b of the central through-hole even in a narrow tilting car frame, and the lever force can be used around the hinge shaft 2234a of the central through-hole of the first fixed length lever link member 2231a and hinge shaft 2234b of the central through-hole of the second fixed length lever link member 2231b, which are the lever fulcrum.

The rotating shaft driving device 2261 may be installed on the lower center frame 2201 and may be a device that rotates the rotating member 2250 rotatably coupled to the rotation center axis 2242. The rotating shaft driving device 2261 may include a worm gear 2262, a worm gear support member 2269, a ball screw nut 2266, a rotating member-auxiliary link member insertion part 2265 and a lower drive motor 2263.

The worm gear 2262 is rotatably connected to the worm gear support member 2269 located on the horizontal member 2206. The ball screw nut 2266 surrounds the worm gear 2262 along the axial direction, and the balls 2264 are rotatably positioned on the inner circumferential surface.

The balls 2264 are located between the teeth of the worm gear 2262 so that the ball screw nut 2266 moves linearly along the axial direction of the worm gear 2262 according to the rotation of the worm gear 2262. A rotating member-auxiliary link member insertion part 2265 is formed on the upper surface of the ball screw nut 2266, and the rotating member-auxiliary link member 2253 is inserted into the rotating member-auxiliary link member insertion part 2265. Balls 2255 are positioned to be rotatable on the inner surface of the rotating member-auxiliary link member insertion part 2265, whereby the rotating member-auxiliary link member 2253 contacts the balls 2255, and linear motion in the longitudinal direction of the rotating member-auxiliary link member insertion part 2265 is possible without friction.

When the lower drive motor 2263 rotates the worm gear 2262, the ball screw nut 2266 performs a linear motion by the rotation of the worm gear 2262, whereby the rotating member-auxiliary link member insertion part 2265 fixed to the ball screw nut 2266 also performs a linear motion. According to the linear motion of the rotating member-auxiliary link member insertion part 2265, the rotating member-auxiliary link member 2253 may come out of the rotating member-auxiliary link member insertion part 2265 or enter the rotating member-auxiliary link member insertion part 2265, and by the left-right linear motion of the ball screw nut 2266 and the up-down linear motion of the rotating member-auxiliary link member 2253, the rotating member 2250 hinged to the rotating member-auxiliary link member 2253 can rotate around the rotation center axis 2242.

In this embodiment, as a rotating shaft driving device 2261, a configuration including a worm gear 2262, a worm gear support member 2269, a ball screw nut 2266, a rotating member-auxiliary link member insertion part 2265 and a lower drive motor 2263 is taken as an example, and as a rotating member 2250, a configuration including a third extension member 2251*c* and a rotating member-auxiliary link member 2253 is taken as an example, but they may be replaced by various configurations described in other embodiments.

As described in the first embodiment, the rotary shaft drive motor is installed on the rotation center axis support member 2241, and may rotate the rotating member 2250 by rotating the rotation center axis 2242 fixedly coupled to the central portion of the rotating member 2250.

As described in the fifth embodiment, the rotating member 2250 may include a third extension member extending downward of the rotating member 2250, and the third extension member may have a curved surface having a predetermined curvature in its longitudinal section, on which teeth may be formed. The worm gear 2262 may be rotatably connected to the worm gear support member 2269 located on the horizontal member 2206 and may be engaged with the teeth of the third extension member. When the lower drive motor 2263 may rotate the worm gear 2262, the rotating member 2250 connected to the third extension member engaged with the worm gear 2262 rotates around the rotation center axis 2242.

As described in the sixth embodiment, the rotating member 2250 may include a third extension member extending downward of the rotating member 2250, and the third extension member may have a curved surface having a predetermined curvature in its longitudinal section, on which teeth may be formed. The worm gear 2262 may be rotatably connected to the worm gear support member 2269 located on the horizontal member 2206 and the ball screw nut 2266 may moves linearly along the axial direction of the worm gear 2262 according to the rotation of the worm gear 2262. Teeth may be formed on the upper surface of the ball screw nut 2266 and may be engaged with the teeth of the third extension member, and when the lower drive motor 2263 rotates the worm gear 2262, the ball screw nut 2266 moves linearly by the rotation of the worm gear 2262, whereby the third extension member engaged with the ball screw nut 2266 rotates, and the rotating member 2250 connected to the third extension member rotates around the rotation center axis 2242.

As described in the eighth embodiment, the pinion gear may be rotatably connected on the horizontal member 2206, and the lower drive motor 2263 may rotate the pinion gear. The rack gear may be connected to the rack gear support member located on the horizontal member 2206 so that the rack gear moves linearly on the rack gear support member, and may be engaged with the pinion gear. A rotating member-auxiliary link member insertion part 2265 may be formed on the upper surface of the pinion gear, and the rotating member-auxiliary link member 2253 may be inserted into the rotating member-auxiliary link member insertion part 2265. Balls 2255 may be positioned to be rotatable on the inner surface of the rotating member-auxiliary link member insertion part 2265, whereby the rotating member-auxiliary link member 2253 may be in contact with the balls 2255 and perform linear motion in the longitudinal direction of the rotating member-auxiliary link member insertion part 2265 without friction. When the lower drive motor 2263 rotates the pinion gear, the rack gear performs a linear motion by the rotation of the pinion gear, whereby the rotating member-auxiliary link member insertion part 2265 fixed to the rack gear also performs a linear motion. According to the linear motion of the rotating member-auxiliary link member insertion part 2265, the rotating member-auxiliary link member 2253 may come out of the rotating member-auxiliary link member insertion part 2265 or enter the rotating member-auxiliary link member insertion part 2265, and by the left-right linear motion of the rack gear and the up-down linear motion of the rotating member-auxiliary link member 2253, the rotating member 2250 hinged to the rotating member-auxiliary link member 2253 can rotate around the rotation center axis 2242.

As described in the ninth embodiment, the rotating member 2250 may include a third extension member extending downward of the rotating member 2250, and the third extension member may have a curved surface having a predetermined curvature in its longitudinal section, on which teeth may be formed. The circular gear may be rotatably connected to the horizontal member 2206, and the lower drive motor 2263 may rotate the circular gear. The circular gear may be engaged with the teeth of the third extension member. When the lower drive motor 2263 rotates the circular gear, the rotating member 2250 connected to the third extension member engaged with the circular gear rotates around the rotation center axis 2242.

When the tilting car is turning, the rotary shaft drive motor 2261 may rotate the rotating member 2250 counterclockwise. As the rotating member 2250 rotates counterclockwise, the first fixed length lever link member 2231*a* is pulled downward to the right and tilted. In addition, the second fixed length lever link member 2231*b* is pulled in the upper left direction and tilted.

The first fixed length lever link member 2231*a* performs a lever motion around the hinge shaft 2234*a* to which the first fixed length lever link member 2231*a* and the first support link member 2205*a* are connected, and the second fixed length lever link member 2231*b* performs a lever motion around the hinge shaft 2234b to which the second fixed length lever link member 2231b and the second support link member 2205b are connected.

By such a lever motion, the first vertical link member 2221a rises, and the second vertical link member 2221b descends. Since the first wheel 2271a connected to the first vertical link member 2221a and the second wheel 2271b connected to the second vertical link member 2221b remain in contact with the ground, eventually the first end 2203a of the lower center frame 2201 is inclined downward, and the second end 2203b of the lower center frame 2201 is raised upward, and the vehicle body is inclined toward the center of the turning radius.

Particularly, in the first fixed length lever link member 2231a, since the distance between the hinge shaft 2254a of the inner through-hole and the hinge shaft 2234a of the central through-hole is larger than the distance between the hinge shaft 2224a of the outer through-hole and the hinge shaft 2234a of the central through-hole, the first vertical link member 2221a can be raised with a small force. Likewise, in the second fixed length lever link member 2231b, since the distance between the hinge shaft 2254b of the inner through-hole and the hinge shaft 2234b of the central through-hole is larger than the distance between the hinge shaft 2224b of the outer through-hole and the hinge shaft 2234b of the central through-hole, the second vertical link member 2221b can be lowered with a small force.

the third extension member 2251c is extended to the lower side of the rotating member 2250, and the rotating member 2250 is rotated by moving the third extension member 2251c, whereby a leverage effect is generated with the rotation center axis 2242 as the fulcrum of the lever. Accordingly, it is possible to control the rotation of the rotating member 2250 with a small force.

The lever principle used in the technology disclosed in the present specification has the advantage of allowing a small and light drive motor to be used instead of a large and heavy drive motor, and the advantage of being able to precisely control the tilting angle when the vehicle is turning. The technology disclosed in this specification can be applied not only to small cars, but also to buses, freight cars, SUVs, and trains.

Since conventional tilting cars use a lot of tilting joints, there is a disadvantage in that it is vulnerable to external shocks that may occur when driving. However, the tilting car frame according to the technology disclosed in the present specification can be designed so that the entire frame structure is resistant to impact by using the lever principle.

In addition, the tilting car frame according to the technology disclosed in the present specification uses a variable length lever link member. Based on the fulcrum of the lever, as the inner lever length is made longer than the outer lever length, the leverage effect increases, which is effectively achieved by the variable length lever link member. When the tilting function starts to operate, the length of the inner lever automatically becomes longer and longer, so that the leverage effect can be further increased.

When the tilting car frame according to the technology disclosed in the present specification is applied to a vehicle having a narrow width, if the variable length lever link member is bent in an upward direction with respect to the fulcrum of the lever, the inner length of the lever is increased, whereby an effect of increasing the leverage effect can be obtained.

Furthermore, in order to increase the leverage effect, a third extension member extending downward is formed on the rotating member, and the end of the third extension member may be rotated. With this configuration, the leverage effect occurs once more.

In the case of using the variable length lever link member, if the variable length lever link member is bent upward and connected to the rotating member, and the end of the third extension member of the T-shaped rotating member is rotated, a multi-level leverage effect can be obtained, and this configuration makes it easier to manufacture a large tilting car.

A small tilting car can contribute a lot in overcoming the weaknesses of bicycles and motorcycles that are vulnerable to snow and rain, reducing urban pollution with high fuel efficiency, and solving parking difficulties. Furthermore, a small tilting car can contribute greatly to solving the global warming problem caused by the over-consumption of carbon fuel. In addition, the three-wheeled tilting car can be the most suitable frame structure for an electric vehicle because of its light weight.

An effect of a tilting car frame according to an embodiment of the technology disclosed in the present specification is to provide an efficient tilting car frame capable of operating with a small force using a lever principle.

However, the effects that can be achieved by the tilting car frame according to an embodiment of the technology disclosed in the present specification are not limited to those mentioned above, and other effects not mentioned will be clearly understood by those skilled in the art from the following description.

The technology disclosed in the present specification has been described in detail with reference to preferred embodiments, but the technical idea of the technology disclosed in the present specification is not limited to the above embodiments, and various modifications and changes may be made by those of ordinary skill in the art within the scope of the technical idea of the technology disclosed in the present specification.

The invention claimed is:

1. A tilting car frame comprising:
   a lower center frame having a first end and a second end, the lower center frame including a horizontal member, a first support member extending in one direction from the first end of the lower center frame, and a second support member extending in the one direction from the second end of the lower center frame;
   a first horizontal link member hinged to the first end of the lower center frame;
   a second horizontal link member hinged to the second end of the lower center frame;
   a first vertical link member hinged to an end of the first horizontal link member;
   a second vertical link member hinged to an end of the second horizontal link member;
   a rotation center axis support member extending in the one direction from a center of the horizontal member;
   a first variable length lever link member hinged to an end of the first vertical link member and an end of the first support member, wherein a first variable length link member is slidably connected to an end of the first variable length lever link member facing the rotation center axis support member;
   a second variable length lever link member hinged to an end of the second vertical link member and an end of the second support member of the lower center frame, wherein a second variable length link member is slidably connected to an end of the second variable length lever link member facing the rotation center axis support member; and a rotating member, wherein a central part of the rotating member is connected to the rotation center axis support member so as to be rotatable about a rotation center axis of the rotation center axis support member, wherein an end of a first extension member of the rotating member, extending in the direction of the first variable length link member, is hinged to an end of the first variable length link member, and an end of a second extension member of the rotating member, extending in the direction of the second variable length link member, is hinged to an end of the second variable length link member;

the first variable length lever link member comprises:
　a straight member connecting a first hinge axis connected to the first vertical link member and a second hinge axis connected to the first support member; and
　a member connecting a third hinge axis connected to the first support member and a fourth hinge axis of the first variable length link member, wherein the member has a shape bent at least once between the third hinge axis and the fourth hinge axis; and wherein the second variable length lever link member comprises:
　a straight member connecting a firth hinge axis connected to the second vertical link member and a sixth hinge axis connected to the second support member; and
　a member connecting a seventh hinge axis connected to the second support member and an eighth hinge axis of the second variable length link member, wherein the member has a shape bent at least once between the seventh hinge axis connected to the second support member and the eighth hinge axis.

2. A tilting car frame comprising:
a lower center frame having a first end and a second end, the lower center frame including a horizontal member, a first support member extending in one direction from the first end of the lower center frame, and a second support member extending in the one direction from the second end of the lower center frame;
a first horizontal link member hinged to the first end of the lower center frame;
a second horizontal link member hinged to the second end of the lower center frame;
a first vertical link member hinged to an end of the first horizontal link member;
a second vertical link member hinged to an end of the second horizontal link member;
a rotation center axis support member extending in the one direction from a center of the horizontal member;
a first variable length lever link member hinged to an end of the first vertical link member and an end of the first support member, wherein a first variable length link member is slidably connected to an end of the first variable length lever link member facing the rotation center axis support member;
a second variable length lever link member hinged to an end of the second vertical link member and an end of the second support member of the lower center frame, wherein a second variable length link member is slid-ably connected to an end of the second variable length lever link member facing the rotation center axis support member; and a rotating member, wherein a central part of the rotating member is connected to the rotation center axis support member so as to be rotatable about a rotation center axis of the rotation center axis support member, wherein an end of a first extension member of the rotating member, extending in the direction of the first variable length link member, is hinged to an end of the first variable length link member, and an end of a second extension member of the rotating member, extending in the direction of the second variable length link member, is hinged to an end of the second variable length link member;

wherein the rotating member comprises:
a third extension member extending in the direction of the horizontal member; and
a rotating member auxiliary link member hinged to the third extension member;
wherein the tilting car frame further comprises:
　a worm gear;
　a lower drive motor for rotating the worm gear; and
　a ball screw nut surrounding the worm gear along the axial direction of the worm gear, wherein a first set of balls are rotatably located on an inner circumferential surface of the ball screw nut are located between teeth of the worm gear, so that the ball screw nut moves linearly along the axial direction of the worm gear according to rotation of the worm gear; and
　a rotating member auxiliary link member insertion part formed on one surface of the ball screw nut, wherein the rotating member auxiliary link member is inserted into the rotating member auxiliary link member insertion part, and a second set of balls are rotatably positioned on an inner surface of the rotating member auxiliary link member insertion part so that the rotating member auxiliary link member in contact with the second set of balls is capable of performing linear motion in the longitudinal direction;
　wherein when the lower drive motor rotates the worm gear, the rotating member auxiliary link member insertion part makes a linear motion by the ball screw nut that performs a linear motion by rotation of the worm gear, and according to the linear motion of the rotating member auxiliary link member insertion part, the rotating member auxiliary link member comes out of the rotating member auxiliary link member insertion part or enters the rotating member auxiliary link member insertion part, and the rotating member rotates about the rotation center axis.

3. A tilting car frame comprising:
a lower center frame having a first end and a second end, the lower center frame including a horizontal member, a first support member extending in one direction from the first end of the lower center frame, and a second support member extending in the one direction from the second end of the lower center frame;
a first horizontal link member hinged to the first end of the lower center frame;
a second horizontal link member hinged to the second end of the lower center frame;
a first vertical link member hinged to an end of the first horizontal link member;

a second vertical link member hinged to an end of the second horizontal link member;

a rotation center axis support member extending in the one direction from a center of the horizontal member;

a first variable length lever link member hinged to an end of the first vertical link member and an end of the first support member, wherein a first variable length link member is slidably connected to an end of the first variable length lever link member facing the rotation center axis support member;

a second variable length lever link member hinged to an end of the second vertical link member and an end of the second support member of the lower center frame, wherein a second variable length link member is slidably connected to an end of the second variable length lever link member facing the rotation center axis support member; and a rotating member, wherein a central part of the rotating member is connected to the rotation center axis support member so as to be rotatable about a rotation center axis of the rotation center axis support member, wherein an end of a first extension member of the rotating member, extending in the direction of the first variable length link member, is hinged to an end of the first variable length link member, and an end of a second extension member of the rotating member, extending in the direction of the second variable length link member, is hinged to an end of the second variable length link member;

wherein the rotating member comprises:

a third extension member extending in the direction of the horizontal member; and a rotating member auxiliary link member hinged to the third extension member;

wherein the tilting car frame further comprises:
 a pinion gear;
 a lower drive motor for rotating the pinion gear;
 a rack gear that engages with the pinion gear and performs linear motion in the left and right directions; and
 a rotating member auxiliary link member insertion part formed on one surface of the rack gear, wherein the rotating member auxiliary link member is inserted into the rotating member auxiliary link member insertion part, and balls are rotatably positioned on an inner surface of the rotating member auxiliary link member insertion part so that the rotating member auxiliary link member in contact with the balls is capable of performing linear motion in the longitudinal direction;
 wherein when the lower drive motor rotates the pinion gear, the rotating member auxiliary link member insertion part moves linearly by the rack gear that moves linearly by rotation of the pinion gear, and according to the linear motion of the rotating member auxiliary link member insertion part, the rotating member auxiliary link member comes out of the rotating member auxiliary link member insertion part or enters the rotating member auxiliary link member insertion part, and the rotating member rotates about the rotation center axis.

4. A tilting car frame comprising:

a lower center frame including a horizontal member having a first end and a second end, and including a first support member extending in one direction from the first end and a second support member extending in the one direction from the second end;

a first horizontal link member hinged to the first end of the lower center frame;

a second horizontal link member hinged to the second end of the lower center frame;

a first vertical link member hinged to an end of the first horizontal link member;

a second vertical link member hinged to an end of the second horizontal link member;

a rotation center axis support member extending in the one direction from a center of the horizontal member;

a first variable length lever link member hinged to an end of the first vertical link member and an end of the first support member, wherein a first variable length link member is slidably connected to an end of the first variable length lever link member facing the rotation center axis support member;

a second variable length lever link member hinged to an end of the second vertical link member and an end of the second support member, wherein a second variable length link member is slidably connected to an end of the second variable length lever link member facing the rotation center axis support member;

a rotating member, wherein a central part of the rotating member is connected to the rotation center axis support member so as to be rotatable about a rotation center axis of the rotation center axis support member, wherein an end of a first extension member of the rotating member, extending in the direction of the first variable length link member, is hinged to an end of the first variable length link member, and an end of a second extension member of the rotating member, extending in the direction of the second variable length link member, is hinged to an end of the second variable length link member, and wherein the rotating member includes a third extension member extending from the central part in the direction of the first end and a fourth extension member extending from the central part in the direction of the second end;

a third extension member driving device hinged to the horizontal member, wherein a third variable length link member hinged to the third extension member is inserted into the third extension member driving device, and the third extension member driving device is capable of linearly reciprocating the third variable length link member along the length direction of the third variable length link member;

a fourth extension member driving device hinged to the horizontal member, wherein a fourth variable length link member hinged to the fourth extension member is inserted into the fourth extension member driving device, and the fourth extension member driving device is capable of linearly reciprocating the fourth variable length link member along the length direction of the fourth variable length link member; and an extension member driving part located in the lower center frame to operate the third extension member driving device and the fourth extension member driving device.

5. The tilting car frame of claim 4, wherein:

the third extension member driving device and the fourth extension member driving device are hydraulic cylinders; and the extension member driving part is a hydraulic pump that supplies fluid to the third extension member driving device and the fourth extension member driving device and discharges fluid therefrom.

6. The tilting car frame of claim 4 further comprising:
a first wheel connected to the first vertical link member; and
a second wheel connected to the second vertical link member.

7. The tilting car frame of claim 4, wherein when the third variable length link member enters the inside of the third extension member driving device and the fourth variable length link member comes out from the inside of the fourth extension member driving device, the rotating member rotates in one direction; and
as the rotating member rotates in the one direction, the first variable length link member come out of the insides of the first variable length lever link member and the second variable length link member come out of the insides of the second variable length lever link member.

8. A tilting car frame comprising:
a lower center frame including a first support member extending in one direction from a first end and a second support member extending in the one direction from a second end;
a first horizontal link member hinged to the first end of the lower center frame;
a second horizontal link member hinged to the second end of the lower center frame;
a first vertical link member hinged to an end of the first horizontal link member;
a second vertical link member hinged to an end of the second horizontal link member;
a first fixed length lever link member hinged to an end of the first vertical link member and an end of the first support member of the lower center frame;
a second fixed length lever link member hinged to an end of the second vertical link member and an end of the second support member of the lower center frame;
a first additional connecting link member hinged to an end of the first fixed length lever link member;
a second additional connecting link member hinged to an end of the second fixed length lever link member;
a rotation center axis support member extending in the one direction from a center of the lower center frame; and
a rotating member, wherein a central part of the rotating member is connected to a rotation center axis support member so as to be rotatable about a rotation center axis of the rotation center axis support member, wherein an end of a first extension member of the rotating member, extending in the direction of the first additional connecting link member, is hinged to an end of the first additional connecting link member, and an end of a second extension member of the rotating member, extending in the direction of the second additional connecting link member, is hinged to an end of the second additional connecting link member;
wherein the rotating member comprises:
a third extension member extending in the direction of a third horizontal member; and
a rotating member auxiliary link member hinged to the third extension member;
wherein the tilting car frame further comprises:
a worm gear;
a lower drive motor for rotating the worm gear; and
a ball screw nut surrounding the worm gear along the axial direction of the worm gear, wherein a first set of balls rotatably located on an inner circumferential surface of the ball screw nut are located between teeth of the worm gear, so that the ball screw nut moves linearly along the axial direction of the worm gear according to rotation of the worm gear; and
a rotating member auxiliary link member insertion part formed on one surface of the ball screw nut, wherein the rotating member auxiliary link member is inserted into the rotating member auxiliary link member insertion part, and a second set of balls are rotatably positioned on an inner surface of the rotating member auxiliary link member insertion part so that the rotating member auxiliary link member in contact with the second set of balls is capable of performing linear motion in the longitudinal direction;
wherein when the lower drive motor rotates the worm gear, the rotating member auxiliary link member insertion part makes a linear motion by the ball screw nut that performs a linear motion by rotation of the worm gear, and according to the linear motion of the rotating member auxiliary link member insertion part, the rotating member auxiliary link member comes out of the rotating member auxiliary link member insertion part or enters the rotating member auxiliary link member insertion part, and the rotating member rotates about the rotation center axis.

9. A tilting car frame comprising:
a lower center frame including a first support member extending in one direction from a first end and a second support member extending in the one direction from a second end;
a first horizontal link member hinged to the first end of the lower center frame;
a second horizontal link member hinged to the second end of the lower center frame;
a first vertical link member hinged to an end of the first horizontal link member;
a second vertical link member hinged to an end of the second horizontal link member;
a first fixed length lever link member hinged to an end of the first vertical link member and an end of the first support member of the lower center frame;
a second fixed length lever link member hinged to an end of the second vertical link member and an end of the second support member of the lower center frame;
a first additional connecting link member hinged to an end of the first fixed length lever link member;
a second additional connecting link member hinged to an end of the second fixed length lever link member;
a rotation center axis support member extending in the one direction from a center of the lower center frame; and
a rotating member, wherein a central part of the rotating member is connected to a rotation center axis support member so as to be rotatable about a rotation center axis of the rotation center axis support member, wherein an end of a first extension member of the rotating member, extending in the direction of the first additional connecting link member, is hinged to an end of the first additional connecting link member, and an end of a second extension member of the rotating member, extending in the direction of the second additional connecting link member, is hinged to an end of the second additional connecting link member;
wherein the rotating member comprises:
a third extension member extending in the direction of a third horizontal member; and a rotating member auxiliary link member hinged to the third extension member;

wherein the tilting car frame further comprises:
a pinion gear;
a lower drive motor for rotating the pinion gear;
a rack gear that engages with the pinion gear and performs linear motion in the left and right directions; and
a rotating member auxiliary link member insertion part formed on one surface of the rack gear, wherein the rotating member auxiliary link member is inserted into the rotating member auxiliary link member insertion part, and balls are rotatably positioned on an inner surface of the rotating member auxiliary link member insertion part so that the rotating member auxiliary link member in contact with the balls is capable of performing linear motion in the longitudinal direction;
wherein when the lower drive motor rotates the pinion gear, the rotating member auxiliary link member insertion part moves linearly by the rack gear that moves linearly by rotation of the pinion gear, and according to the linear motion of the rotating member auxiliary link member insertion part, the rotating member auxiliary link member comes out of the rotating member auxiliary link member insertion part or enters the rotating member auxiliary link member insertion part, and the rotating member rotates about the rotation center axis.

10. A tilting car frame comprising:
a lower center frame;
a first support link member hinged to a first end of the lower center frame;
a second support link member hinged to a second end of the lower center frame;
a first horizontal link member hinged to the first end of the lower center frame;
a second horizontal link member hinged to the second end of the lower center frame;
a first vertical link member hinged to an end of the first horizontal link member;
a second vertical link member hinged to an end of the second horizontal link member;
a first fixed length lever link member hinged to an end of the first vertical link member and an end of the first support link member;
a second fixed length lever link member hinged to an end of the second vertical link member and an end of the second support link member;
a rotation center axis support member extending in one direction from the center of the lower center frame; and
a rotating member, wherein a central part of the rotating member is connected to the rotation center axis support member so as to be rotatable about a rotation center axis of the rotation center axis support member, wherein an end of a first extension member of the rotating member, extending in the direction of the first fixed length lever link member, is hinged to an end of the first fixed length lever link member, and an end of a second extension member of the rotating member, extending in the direction of the second fixed length lever link member, is hinged to an end of the second fixed length lever link member;

wherein:
the first fixed length lever link member comprises:
a straight member connecting a hinge axis connected to the first vertical link member and a hinge axis connected to the first support link member; and
a member connecting a first hinge axis connected to the first support link member and a second hinge axis connected to the first extension member, wherein the member has a shape bent at least once between the first hinge axis and the second hinge axis;
wherein the second fixed length lever link member comprises:
a straight member connecting a third hinge axis connected to the second vertical link member and a fourth hinge axis connected to the second support link member; and
a member connecting a fifth hinge axis connected to the second support link member and a sixth hinge axis connected to the second extension member, wherein the member has a shape bent at least once between the fifth hinge axis and the sixth hinge axis.

11. A tilting car frame comprising:
a lower center frame;
a first support link member hinged to a first end of the lower center frame;
a second support link member hinged to a second end of the lower center frame;
a first horizontal link member hinged to the first end of the lower center frame;
a second horizontal link member hinged to the second end of the lower center frame;
a first vertical link member hinged to an end of the first horizontal link member;
a second vertical link member hinged to an end of the second horizontal link member;
a first fixed length lever link member hinged to an end of the first vertical link member and an end of the first support link member;
a second fixed length lever link member hinged to an end of the second vertical link member and an end of the second support link member;
a rotation center axis support member extending in one direction from the center of the lower center frame; and
a rotating member, wherein a central part of the rotating member is connected to the rotation center axis support member so as to be rotatable about a rotation center axis of the rotation center axis support member, wherein an end of a first extension member of the rotating member, extending in the direction of the first fixed length lever link member, is hinged to an end of the first fixed length lever link member, and an end of a second extension member of the rotating member, extending in the direction of the second fixed length lever link member, is hinged to an end of the second fixed length lever link member;
wherein the rotating member comprises:
a third extension member extending in the direction of a third horizontal member; and
a rotating member auxiliary link member hinged to the third extension member;
wherein the tilting car frame further comprises:
a worm gear;
a lower drive motor for rotating the worm gear; and
a ball screw nut surrounding the worm gear along the axial direction of the worm gear, wherein a first set of balls rotatably located on an inner circumferential surface of the ball screw nut are located between teeth of the worm gear, so that the ball screw nut moves linearly along the axial direction of the worm gear according to rotation of the worm gear; and a rotating member auxiliary link member insertion part formed on one surface of the ball screw nut, wherein the rotating member auxiliary link member is inserted into the rotating member auxiliary link member insertion part, and a second set of balls are rotatably positioned on an inner surface of the rotating member auxiliary link member insertion part so that the rotating member auxiliary link member in contact with the second set of balls is capable of performing linear motion in the longitudinal direction;

wherein when the lower drive motor rotates the worm gear, the rotating member auxiliary link member insertion part makes a linear motion by the ball screw nut that performs a linear motion by rotation of the worm gear, and according to the linear motion of the rotating member auxiliary link member insertion part, the rotating member auxiliary link member comes out of the rotating member auxiliary link member insertion part or enters the rotating member auxiliary link member insertion part, and the rotating member rotates about the rotation center axis.

12. A tilting car frame comprising:

a lower center frame;

a first support link member hinged to a first end of the lower center frame;

a second support link member hinged to a second end of the lower center frame;

a first horizontal link member hinged to the first end of the lower center frame;

a second horizontal link member hinged to the second end of the lower center frame;

a first vertical link member hinged to an end of the first horizontal link member;

a second vertical link member hinged to an end of the second horizontal link member;

a first fixed length lever link member hinged to an end of the first vertical link member and an end of the first support link member;

a second fixed length lever link member hinged to an end of the second vertical link member and an end of the second support link member;

a rotation center axis support member extending in one direction from the center of the lower center frame; and a rotating member, wherein a central part of the rotating member is connected to the rotation center axis support member so as to be rotatable about a rotation center axis of the rotation center axis support member, wherein an end of a first extension member of the rotating member, extending in the direction of the first fixed length lever link member, is hinged to an end of the first fixed length lever link member, and an end of a second extension member of the rotating member, extending in the direction of the second fixed length lever link member, is hinged to an end of the second fixed length lever link member;

wherein the rotating member comprises:

a third extension member extending in the direction of a third horizontal member; and a rotating member auxiliary link member hinged to the third extension member;

wherein the tilting car frame further comprises:

a pinion gear;

a lower drive motor for rotating the pinion gear;

a rack gear that engages with the pinion gear and performs linear motion in the left and right directions; and a rotating member auxiliary link member insertion part formed on one surface of the rack gear, wherein the rotating member auxiliary link member is inserted into the rotating member auxiliary link member insertion part, and balls are rotatably positioned on an inner surface of the rotating member auxiliary link member insertion part so that the rotating member auxiliary link member in contact with the balls is capable of performing linear motion in the longitudinal direction;

wherein when the lower drive motor rotates the pinion gear, the rotating member auxiliary link member insertion part moves linearly by the rack gear that moves linearly by rotation of the pinion gear, and according to the linear motion of the rotating member auxiliary link member insertion part, the rotating member auxiliary link member comes out of the rotating member auxiliary link member insertion part or enters the rotating member auxiliary link member insertion part, and the rotating member rotates about the rotation center axis.

* * * * *